US011563952B2

(12) United States Patent
Alshina et al.

(10) Patent No.: US 11,563,952 B2
(45) Date of Patent: Jan. 24, 2023

(54) VIDEO DECODING METHOD AND DEVICE THEREFOR, AND VIDEO ENCODING METHOD AND DEVICE THEREFOR

(71) Applicant: SAMSUNG ELECTRONICS CO., LTD., Suwon-si (KR)

(72) Inventors: Elena Alshina, Seoul (KR); Alexander Alshin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 584 days.

(21) Appl. No.: 16/317,910

(22) PCT Filed: Jul. 14, 2017

(86) PCT No.: PCT/KR2017/007593
§ 371 (c)(1),
(2) Date: Jan. 15, 2019

(87) PCT Pub. No.: WO2018/012933
PCT Pub. Date: Jan. 18, 2018

(65) Prior Publication Data
US 2021/0281852 A1 Sep. 9, 2021

Related U.S. Application Data

(60) Provisional application No. 62/362,172, filed on Jul. 14, 2016.

(51) Int. Cl.
*H04N 19/159* (2014.01)
*H04N 19/573* (2014.01)
(Continued)

(52) U.S. Cl.
CPC ......... *H04N 19/159* (2014.11); *H04N 19/105* (2014.11); *H04N 19/176* (2014.11); *H04N 19/573* (2014.11)

(58) Field of Classification Search
None
See application file for complete search history.

(56) References Cited

U.S. PATENT DOCUMENTS 9,544,593 B2   1/2017 Park et al.
10,097,860 B2  10/2018 Alshin et al.
(Continued)

FOREIGN PATENT DOCUMENTS

CN   101695136 A   4/2010
CN   102763418 A   10/2012
(Continued)

OTHER PUBLICATIONS

Communication dated Aug. 29, 2020 by the Intellectual Property Office of India in counterpart Indian Patent Application No. 201927004230.
(Continued)

*Primary Examiner* — Christopher G Findley
(74) *Attorney, Agent, or Firm* — Sughrue Mion, PLLC

(57) ABSTRACT

Provided is a video decoding method including: obtaining a first motion vector indicating a first reference block of a current block in a first reference picture and a second motion vector indicating a second reference block of the current block in a second reference picture; obtaining a parameter related to pixel group unit motion compensation of the current block, based on at least one of information of the parameter related to the pixel group unit motion compensation and a parameter related to an image including the current picture; generating a prediction block by performing, with respect to the current block, block unit motion compensation based on the first motion vector and the second motion vector and performing the pixel group unit motion compensation based on the parameter related to the pixel group unit motion compensation; and reconstructing the current block. Here, a pixel group may include at least one pixel.

4 Claims, 36 Drawing Sheets

(51) Int. Cl.
*H04N 19/176* (2014.01)
*H04N 19/105* (2014.01)

(56) References Cited

U.S. PATENT DOCUMENTS

| | | |
|---|---|---|
| 2012/0236943 A1 | 9/2012 | Lee et al. |
| 2013/0083851 A1* | 4/2013 | Alshin .................. H04N 19/182 375/240.14 |
| 2015/0055701 A1 | 2/2015 | Yie et al. |
| 2015/0350671 A1 | 12/2015 | Alshin et al. |
| 2016/0156912 A1 | 6/2016 | Alshina et al. |
| 2018/0192072 A1* | 7/2018 | Chen .................. H04N 19/513 |

FOREIGN PATENT DOCUMENTS

| | | |
|---|---|---|
| EP | 3 413 563 A1 | 12/2018 |
| KR | 10-2009-0012926 A | 2/2009 |
| KR | 10-2009-0041562 A | 4/2009 |
| KR | 10-2011-0112240 A | 10/2011 |
| KR | 10-2012-0090740 A | 8/2012 |
| KR | 10-2014-0089486 A | 7/2014 |
| KR | 10-2015-0035943 A | 4/2015 |
| TW | 201309035 A1 | 2/2013 |
| TW | I502970 B | 10/2015 |
| WO | 2013/002579 A2 | 1/2013 |
| WO | 2013/002619 A3 | 1/2013 |

OTHER PUBLICATIONS

International Search Report dated Oct. 23, 2017 issued by the International Searching Authority in counterpart International Application No. PCT/KR2017/007593 (PCT/ISA/210).
Written Opinion dated Oct. 23, 2017 issued by the International Searching Authority in counterpart International Application No. PCT/KR2017/007593 (PCT/ISA/237).
Alshina et al., "Simplification and improvements for BIO design in JEM2.", May 2016, 5 total pages, JVET-C0027.
Jianle Chen et al., "Algorithm description of Joint Exploration Test Model 3 (JEM3)", Joint Video Exploration Team (JVET), ITU-T SG 16 WP 3 and ISO/IEC JTC 1 /SC 29/WG 11, JVET-C1001 v1, Geneva, Switzerland, XP030150223, Jul. 2, 2016, 35 pages.
Alshin Alexander et al., "Bi-directional Optical Flow for Future Video Codec", 2016 Data Compression Conference (DCC), IEEE, XP033027690, Mar. 30, 2016, pp. 83-90.
Alexander Alshin et al., "Bi-directional Optical Flow for Improving Motion Compensation", 28th Picture Coding Symposium (PCS2010), Nagoya Japan, XP030082019, Dec. 8, 2010, pp. 422-425.
Communication dated Oct. 9, 2019, issued by the European Patent Office in counterpart European Application No. 17828003.8.
Communication dated May 21, 2019, issued by the European Patent Office in counterpart European Application No. 17 828 003.8.
Qualcomm: "Harmonization and improvement for BIO", Sep. 30, 2015, ITU-T SG16 Meeting, Geneva, No. T13-SG16-C-1045, XP030100753, 4 pages total.
Communication dated Feb. 15, 2021 issued by the Korean Intellectual Property Office in counterpart English Korean Application No. 10-2019-7000532.
Communication dated Dec. 8, 2021 issued by the Korean Intellectual Property Office in counterpart Korean Application No. 10-2021-7038289.
Communication dated Jan. 4, 2022 issued by the State Intellectual Property Office of P.R. China in counterpart Chinese application No. 201780056738.1.
Communication dated Sep. 19, 2022 by the Korean Intellectual Property Office in counterpart Korean Patent Application No. 10-2022-7029194.

* cited by examiner

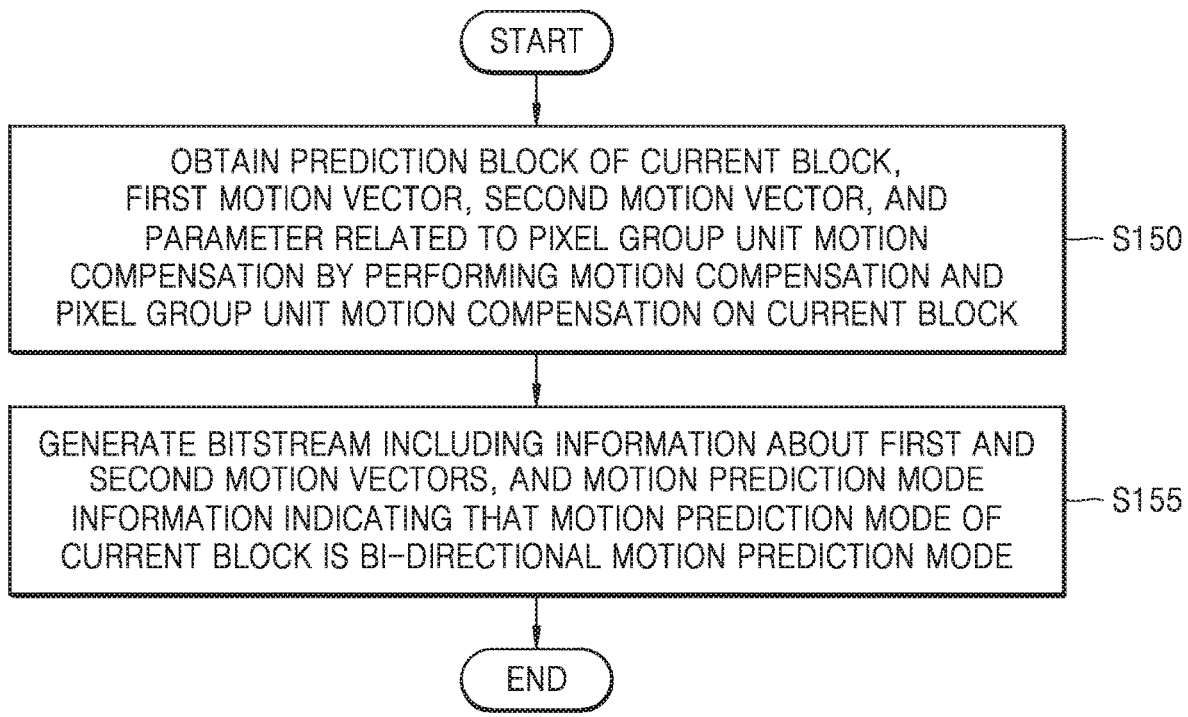

FIG. 7A

Mmin = −2, Mmax = 3

| α | gradFilter$_α$ |
|---|---|
| 0 | { 8, −39, −3, 46, −17, 5 } |
| 1/4 | { 4, −17, −36, 60, −15, 4 } |
| 1/2 | { −1, 4, −57, 57, −4, 1 } |
| 3/4 | { 4, −15, −60, 36, 17, −4 } |

FIG. 7B

Mmin = −2, Mmax = 3

| α | fracFilter$_α$ |
|---|---|
| 0 | { 0, 0, 64, 0, 0, 0 } |
| 1/4 | { 2, −9, 57, 19, −7, 2 } |
| 1/2 | { 1, −7, 38, 38, −7, 1 } |
| 3/4 | { 2, −7, 19, 57, −9, 2 } |

FIG. 7C

Mmin = −3, Mmax = 4

| α | fracFilter$_\alpha$ |
|---|---|
| 0 | { 0, 0, 0, 64, 0, 0, 0, 0 } |
| 1/4 | { −1, 4, −10, 58, 17, −5, 1, 0 } |
| 1/2 | { −1, 4, −11, 40, 40, −11, 4, −1 } |
| 3/4 | { 0, 1, −5, 17, 58, −10, 4, −1 } |

FIG. 7D

| α | gradFilter$_\alpha$ |
|---|---|
| 0 | { 8, −39, −3, 46, −17, 5 } |
| 1/16 | { 8, −32, −13, 50, −18, 5 } |
| 1/8 | { 7, −27, −20, 54, −19, 5 } |
| 3/16 | { 6, −21, −29, 57, −18, 5 } |
| 1/4 | { 4, −17, −36, 60, −15, 4 } |
| 5/16 | { 3, −9, −44, 61, −15, 4 } |
| 3/8 | { 1, −4, −48, 61, −13, 3 } |
| 7/16 | { 0, 1, −54, 60, −9, 2 } |
| 1/2 | { −1, 4, −57, 57, −4, 1 } |

FIG. 7E

| α | fracFilter $_\alpha$ |
|---|---|
| 0 | { 0, 0, 64, 0, 0, 0 } |
| 1/16 | { 1, -3, 64, 4, -2, 0 } |
| 1/8 | { 1, -6, 62, 9, -3, 1 } |
| 3/16 | { 2, -8, 60, 14, -5, 1 } |
| 1/4 | { 2, -9, 57, 19, -7, 2 } |
| 5/16 | { 3, -10, 53, 24, -8, 2 } |
| 3/8 | { 3, -11, 50, 29, -9, 2 } |
| 7/16 | { 3, -11, 44, 35, -10, 3 } |
| 1/2 | { 3, -10, 35, 44, -11, 3 } |

FIG. 11
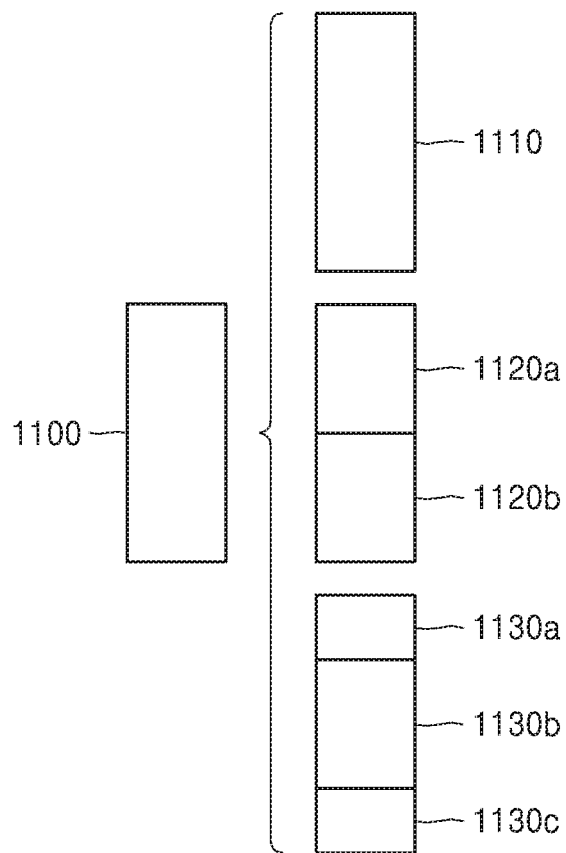
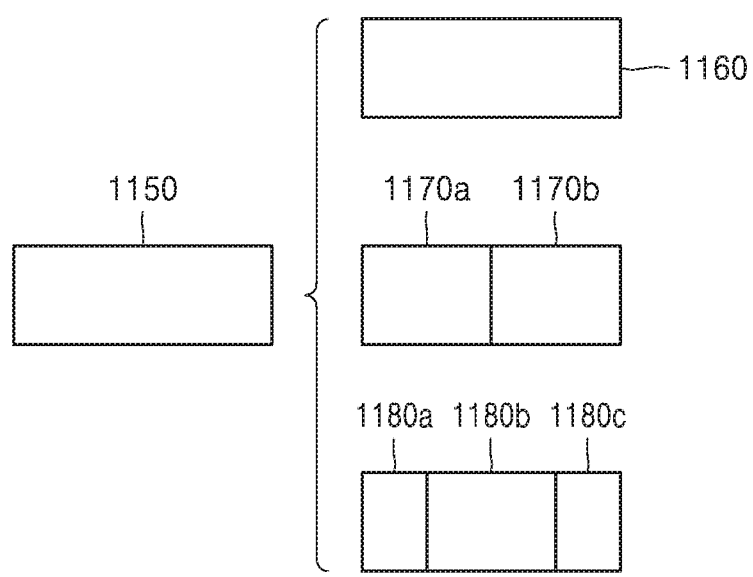

FIG. 20

| DEPTH \ BLOCK SHAPE | 0: SQUARE | 1: NS_VER | 2: NS_HOR |
|---|---|---|---|
| DEPTH D | 2000 | 2010 | 2020 |
| DEPTH D+1 | 2002 | 2012 | 2022 |
| DEPTH D+2 | 2004 | 2014 | 2024 |
| ... | ... | ... | ... |

VIDEO DECODING METHOD AND DEVICE THEREFOR, AND VIDEO ENCODING METHOD AND DEVICE THEREFOR

TECHNICAL FIELD

The present disclosure relates to a video decoding method and video encoding. More particularly, the present disclosure relates to video decoding and video encoding of performing inter prediction in a bi-directional motion prediction mode.

BACKGROUND ART

As hardware for reproducing and storing high-resolution or high-quality video content is being developed and distributed, a need for a video codec for effectively encoding or decoding high-resolution or high-quality video content has increased. In a conventional video codec, a video is encoded according to a limited encoding method based on coding units of a tree structure.

Image data of a spatial domain is transformed into coefficients of a frequency domain via frequency transformation. According to a video codec, an image is split into blocks having a predetermined size, discrete cosine transform (DCT) is performed on each block, and frequency coefficients are encoded in block units, for rapid calculation of frequency transformation. Compared with image data of a spatial domain, coefficients of a frequency domain are easily compressed. In particular, since an image pixel value of a spatial domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

DESCRIPTION OF EMBODIMENTS

Technical Problem

According to various embodiments, a prediction pixel value of a current block may be generated by not only using a pixel value of a first reference block of a first reference picture and a pixel value of a second reference block of a second reference picture, but also using a first gradient value of the first reference block and a second gradient value of the second reference block, in a bi-directional motion prediction mode. Accordingly, encoding and decoding efficiency may be increased since a prediction block similar to an original block may be generated.

The first gradient value of the first reference block and the second gradient value of the second reference block are used while motion compensation of a pixel group unit is performed, and a parameter used while the motion compensation of a pixel group unit is performed is signaled through a bitstream or obtained by using a parameter related to an image, and thus the motion compensation of a pixel group unit may be adaptively performed on the image.

Provided is a computer-readable recording medium having recorded thereon a program for executing a method according to various embodiments.

Here, aspects of various embodiments are not limited thereto, and additional aspects will be set forth in part in the description which follows and, in part, will be apparent from the description, or may be learned by practice of the presented embodiments.

Solution to Problem

Aspects of the present disclosure are not limited thereto, and additional aspects will be set forth in part in the description which follows and, in part, will be apparent from the description, or may be learned by practice of the presented embodiments.

According to an aspect of the present disclosure, a video decoding includes: obtaining, from a bitstream, motion prediction mode information regarding a current block in a current picture; when the obtained motion prediction mode information indicates a bi-directional motion prediction mode, obtaining, from the bitstream, a first motion vector and a second motion vector, wherein the first motion vector indicates a first reference block of the current block in a first reference picture, and the second motion vector indicates a second reference block of the current block in a second reference picture; obtaining a parameter related to pixel group unit motion compensation of the current block, based on at least one of information of the parameter related to the pixel group unit motion compensation obtained from the bitstream and a parameter related to an image including the current picture; generating a prediction block of the current block by performing, with respect to the current block, block unit motion compensation based on the first motion vector and the second motion vector and performing the pixel group unit motion compensation based on the parameter related to the pixel group unit motion compensation; obtaining a residual block of the current block from the bitstream; and reconstructing the current block based on the prediction block and the residual block, wherein a pixel group includes at least one pixel.

The video decoding method may further include determining whether to perform the pixel group unit motion compensation based on at least one of flag information which is obtained from the bitstream and is about whether to perform the pixel group unit motion compensation, a size of the current block, a prediction direction, a size of a motion vector, a picture order count (POC) difference between the reference picture and the current picture, and availability of a predetermined coding/decoding tool, wherein the generating of the prediction block may include generating the prediction block of the current block by performing the pixel group unit motion compensation based on the determining.

The obtaining of the parameter related to the pixel group unit motion compensation may include obtaining a shift value for de-scaling after an interpolation operation or a gradient operation, based on at least one of a bit depth of a sample, an input range of a filter used for the interpolation operation or the gradient operation, and a coefficient of the filter, and the generating of the prediction block of the current block may include performing the de-scaling after the interpolation operation or the gradient operation with respect to a pixel included in the first reference block and the second reference block by using the shift value for de-scaling.

The obtaining of the parameter related to the pixel group unit motion compensation may include obtaining a regularization parameter related to a displacement vector per unit time in a horizontal or vertical direction, based on at least one of information which is obtained from the bitstream and is about a parameter related to the displacement vector per unit time in the horizontal or vertical direction, a bit depth of a sample, a size of a group of picture (GOP), a motion vector, a parameter related to a temporal distance between a reference picture and the current picture, a frame rate, a setting parameter related to an encoding prediction structure, and a prediction direction, the generating of the prediction block of the current block may include determining, based on the regularization parameter related to the displacement vector per unit time in the horizontal or vertical direction, the displacement vector per unit time in the horizontal or vertical direction by using a gradient value of pixels in a first window having a certain size and including a first pixel group included in the first reference block, a gradient value of pixels in a second window having a certain size and including a second pixel group included in the second reference block, pixel values of the pixels in the first window, and pixel values of the pixels in the second window.

The obtaining of the parameter related to the pixel group unit motion compensation may include: obtaining a parameter related to a size of a window used to calculate a displacement vector per unit time, based on at least one of information about a window size obtained from the bitstream, a hierarchy depth of a picture, a size of a GOP, an image resolution, a parameter related to a temporal distance between a reference picture and the current picture, a frame rate, a motion vector, a setting parameter related to an encoding prediction structure, and a prediction direction, and the generating of the prediction block of the current block may include determining, based on the parameter related to the size of the window, a displacement vector per unit time in a horizontal or vertical direction by using a gradient value of pixels in a first window having a certain size and including a first pixel group included in the first reference block, a gradient value of pixels in a second window having a certain size and including a second pixel group included in the second reference block, pixel values of the pixels in the first window, and pixel values of the pixels in the second window.

The pixel group may include a plurality of pixels, the obtaining of the parameter related to the pixel group unit motion compensation may include obtaining a parameter related to a size of the pixel group based on at least one of information about the size of the pixel group obtained from the bitstream, an image resolution, and a frame rate, and the generating of the prediction block of the current block may include generating the prediction block of the current block by performing the block unit motion compensation based on the first motion vector and the second motion vector and performing the pixel group unit motion compensation based on the parameter related to the size of the pixel group.

According to another aspect of the present disclosure, a video decoding apparatus includes: an obtainer configured to obtain, from a bitstream, motion prediction mode information regarding a current block in a current picture, and when the obtained motion prediction mode information indicates a bi-directional motion prediction mode, obtain, from the bitstream, a first motion vector indicating a first reference block of the current block in a first reference picture and a second motion vector indicating a second reference block of the current block in a second reference picture, obtain a parameter related to pixel group unit motion compensation of the current block, based on at least one of information of the parameter related to the pixel group unit motion compensation, the information being obtained from the bitstream, and a parameter related to an image including the current picture, and obtain a residual block of the current block from the bitstream; an inter predictor configured to generate a prediction block of the current block by performing, with respect to the current block, block unit motion compensation based on the first motion vector and the second motion vector and the pixel group unit motion compensation based on the parameter related to the pixel group unit motion compensation; and a decoder configured to reconstruct the current block based on the prediction block and the residual block, wherein a pixel group includes at least one pixel.

The inter predictor may be further configured to determine whether to perform the pixel group unit motion compensation based on at least one of flag information which is obtained from the bitstream and is about whether to perform the pixel group unit motion compensation, a size of the current block, a prediction direction, a size of a motion vector, a picture order count (POC) difference between the reference picture and the current picture, and availability of a predetermined coding/decoding tool, and generate the prediction block of the current block by performing the pixel group unit motion compensation based on the determining.

The inter predictor may be further configured to obtain a shift value for de-scaling after an interpolation operation or a gradient operation, based on at least one of a bit depth of a sample, an input range of a filter used for the interpolation operation or the gradient operation, and a coefficient of the filter, and perform the de-scaling after the interpolation operation or the gradient operation with respect to a pixel included in the first reference block and the second reference block by using the shift value for de-scaling.

The inter predictor may be further configured to obtain a regularization parameter related to a displacement vector per unit time in a horizontal or vertical direction, based on at least one of information which is obtained from the bitstream and is about a parameter related to the displacement vector per unit time in the horizontal or vertical direction, a bit depth of a sample, a size of a group of pictures (GOP), a motion vector, a parameter related to a temporal distance between a reference picture and the current picture, a frame rate, a setting parameter related to an encoding prediction structure, and a prediction direction, and determine, based on the regularization parameter related to the displacement vector per unit time in the horizontal or vertical direction, the displacement vector per unit time in the horizontal or vertical direction by using a gradient value of pixels in a first window having a certain size and including a first pixel group included in the first reference block, a gradient value of pixels in a second window having a certain size and including a second pixel group included in the second reference block, pixel values of the pixels in the first window, and pixel values of the pixels in the second window.

The obtainer may be further configured to obtain a parameter related to a size of a window used to calculate a displacement vector per unit time, based on at least one of information about a window size and obtained from the bitstream, a hierarchy depth of a picture, a size of a GOP, an image resolution, a parameter related to a temporal distance between a reference picture and the current picture, a frame rate, a motion vector, a setting parameter related to an encoding prediction structure, and a prediction direction, and the inter predictor may be further configured to determine, based on the parameter related to the size of the window, a displacement vector per unit time in a horizontal or vertical direction by using a gradient value of pixels in a first window having a certain size and including a first pixel group included in the first reference block, a gradient value of pixels in a second window having a certain size and including a second pixel group included in the second reference block, pixel values of the pixels in the first window, and pixel values of the pixels in the second window.

The pixel group may include a plurality pixels, and the inter predictor may be further configured to obtain a parameter related to a size of the pixel group based on at least one of information about the size of the pixel group and obtained from the bitstream, an image resolution, and a frame rate, and generate the prediction block of the current block by performing the block unit motion compensation based on the first motion vector and the second motion vector and performing the pixel group unit motion compensation based on the parameter related to the size of the pixel group.

According to another aspect of the present disclosure, a video encoding method includes: obtaining a prediction block of a current block, a first motion vector, a second motion vector, and a parameter related to pixel group unit motion compensation by performing block unit motion compensation and the pixel group unit motion compensation on the current block; and generating a bitstream including information related to the first motion vector and the second motion vector and motion prediction mode information indicating that a motion prediction mode regarding the current block is a bi-directional motion prediction mode, wherein a pixel group includes at least one pixel, the first motion vector is a motion vector indicating a first reference block of a first reference picture corresponding to the current block in a current picture from the current block, the second motion vector is a motion vector indicating a second reference block of a second reference picture corresponding to the current block in a current picture from the current block, and a parameter related to the pixel group unit motion compensation of the current block is obtained from a parameter related to an image including the current picture while the pixel group unit motion compensation is performed on the current block or the parameter related to the pixel group unit motion compensation of the current block is determined while the pixel group unit motion compensation is performed on the current block and information about the determined parameter related to the pixel group unit motion compensation is included in the bitstream.

According to another aspect of the present disclosure, a video encoding apparatus includes: an inter predictor configured to obtain a prediction block of a current block, a first motion vector, a second motion vector, and a parameter related to pixel group unit motion compensation by performing block unit motion compensation and the pixel group unit motion compensation on the current block; and a bitstream generator configured to generate a bitstream including information related to the first motion vector and the second motion vector and motion prediction mode information indicating that a motion prediction mode regarding the current block is a bi-directional motion prediction mode, wherein a pixel group includes at least one pixel, the first motion vector is a motion vector indicating a first reference block of a first reference picture corresponding to the current block in a current picture from the current block, the second motion vector is a motion vector indicating a second reference block of a second reference picture corresponding to the current block in a current picture from the current block, and a parameter related to the pixel group unit motion compensation of the current block is obtained from a parameter related to an image including the current picture while the pixel group unit motion compensation is performed on the current block or the parameter related to the pixel group unit motion compensation of the current block is determined while the pixel group unit motion compensation is performed on the current block and information about the determined parameter related to the pixel group unit motion compensation is included in the bitstream.

According to another aspect of the present disclosure, a computer-readable recording medium has recorded thereon a program which performs the video decoding method.

Advantageous Effects of Disclosure

According to various embodiments, encoding and decoding efficiency may be increased by performing inter prediction on a current block by using a gradient value of a reference block of a reference picture in a bi-directional motion prediction mode to predict a value similar to that of an original block of the current block.

BRIEF DESCRIPTION OF DRAWINGS

FIG. 1D is a flowchart of a video encoding method according to various embodiments.

FIGS. 7A through 7E are tables showing filter coefficients of filters used to determine a pixel value at a fractional pixel position of a fractional pixel unit, and gradient values in horizontal and vertical directions, according to embodiments.

FIG. 11 illustrates processes of determining at least one coding unit when a coding unit having a non-square shape is split, according to an embodiment.

FIG. 20 illustrates processes of determining a depth of a coding unit as a shape and size of the coding unit are changed, when a plurality of coding units are determined when the coding unit is recursively split, according to an embodiment.

BEST MODE

Figure 1A:
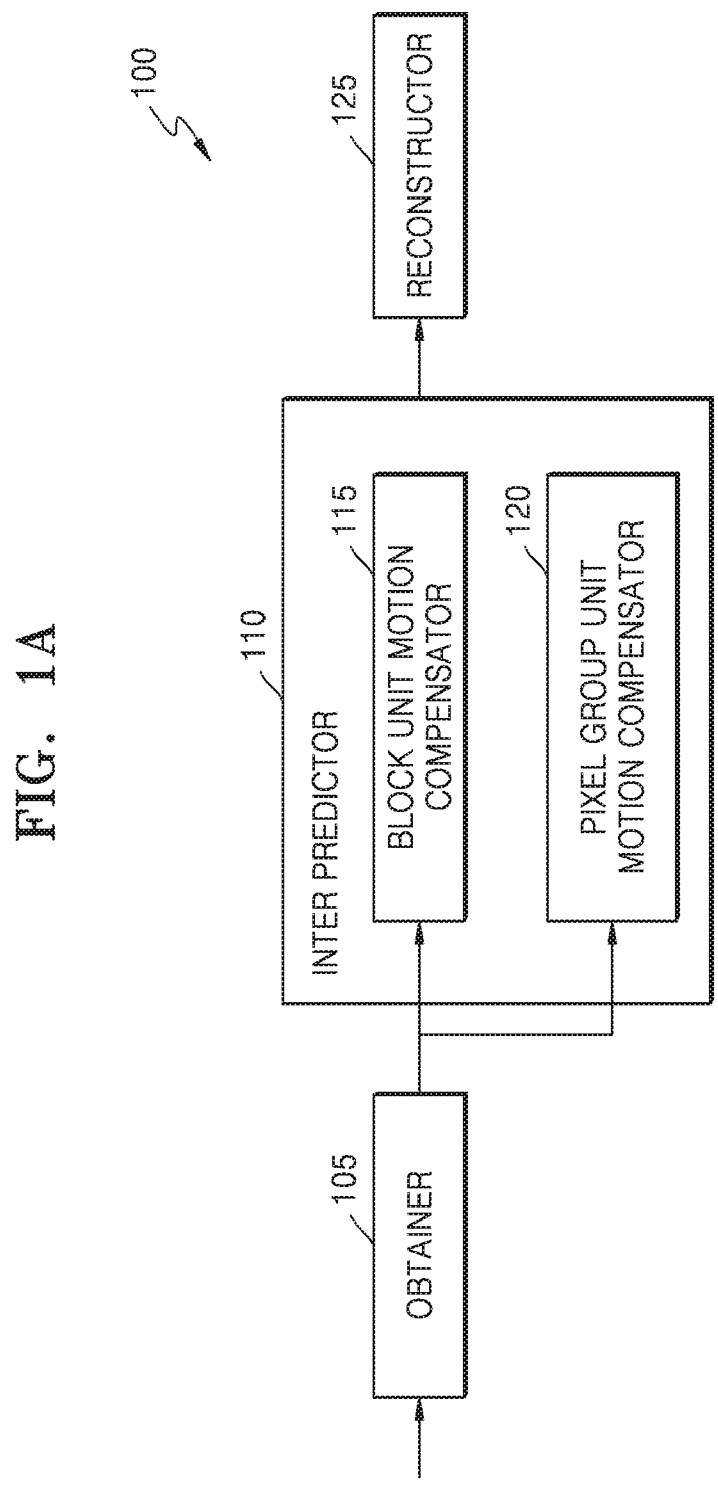
FIG. 1A is a block diagram of a video decoding apparatus according to various embodiments.

According to an aspect of the present disclosure, a video decoding includes: obtaining, from a bitstream, motion prediction mode information regarding a current block in a current picture; when the obtained motion prediction mode information indicates a bi-directional motion prediction mode, obtaining, from the bitstream, a first motion vector and a second motion vector, wherein the first motion vector indicates a first reference block of the current block in a first reference picture, and the second motion vector indicates a second reference block of the current block in a second reference picture; obtaining a parameter related to pixel group unit motion compensation of the current block, based on at least one of information of the parameter related to the pixel group unit motion compensation obtained from the bitstream and a parameter related to an image including the current picture; generating a prediction block of the current block by performing, with respect to the current block, block unit motion compensation based on the first motion vector and the second motion vector and performing the pixel group unit motion compensation based on the parameter related to the pixel group unit motion compensation; obtaining a residual block of the current block from the bitstream; and reconstructing the current block based on the prediction block and the residual block, wherein a pixel group includes at least one pixel.

According to another aspect of the present disclosure, a video decoding apparatus includes: an obtainer configured to obtain, from a bitstream, motion prediction mode information regarding a current block in a current picture, and when the obtained motion prediction mode information indicates a bi-directional motion prediction mode, obtain, from the bitstream, a first motion vector indicating a first reference block of the current block in a first reference picture and a second motion vector indicating a second reference block of the current block in a second reference picture, obtain a parameter related to pixel group unit motion compensation of the current block, based on at least one of information of the parameter related to the pixel group unit motion compensation, the information being obtained from the bitstream, and a parameter related to an image including the current picture, and obtain a residual block of the current block from the bitstream; an inter predictor configured to generate a prediction block of the current block by performing, with respect to the current block, block unit motion compensation based on the first motion vector and the second motion vector and the pixel group unit motion compensation based on the parameter related to the pixel group unit motion compensation; and a decoder configured to reconstruct the current block based on the prediction block and the residual block, wherein a pixel group includes at least one pixel.

According to another aspect of the present disclosure, a video encoding method includes: obtaining a prediction block of a current block, a first motion vector, a second motion vector, and a parameter related to pixel group unit motion compensation by performing block unit motion compensation and the pixel group unit motion compensation on the current block; and generating a bitstream including information related to the first motion vector and the second motion vector and motion prediction mode information indicating that a motion prediction mode regarding the current block is a bi-directional motion prediction mode, wherein a pixel group includes at least one pixel, the first motion vector is a motion vector indicating a first reference block of a first reference picture corresponding to the current block in a current picture from the current block, the second motion vector is a motion vector indicating a second reference block of a second reference picture corresponding to the current block in a current picture from the current block, and a parameter related to the pixel group unit motion compensation of the current block is obtained from a parameter related to an image including the current picture while the pixel group unit motion compensation is performed on the current block or the parameter related to the pixel group unit motion compensation of the current block is determined while the pixel group unit motion compensation is performed on the current block and information about the determined parameter related to the pixel group unit motion compensation is included in the bitstream.

According to another aspect of the present disclosure, a video encoding apparatus includes: an inter predictor configured to obtain a prediction block of a current block, a first motion vector, a second motion vector, and a parameter related to pixel group unit motion compensation by performing block unit motion compensation and the pixel group unit motion compensation on the current block; and a bitstream generator configured to generate a bitstream including information related to the first motion vector and the second motion vector and motion prediction mode information indicating that a motion prediction mode regarding the current block is a bi-directional motion prediction mode, wherein a pixel group includes at least one pixel, the first motion vector is a motion vector indicating a first reference block of a first reference picture corresponding to the current block in a current picture from the current block, the second motion vector is a motion vector indicating a second reference block of a second reference picture corresponding to the current block in a current picture from the current block, and a parameter related to the pixel group unit motion compensation of the current block is obtained from a parameter related to an image including the current picture while the pixel group unit motion compensation is performed on the current block or the parameter related to the pixel group unit motion compensation of the current block is determined while the pixel group unit motion compensation is performed on the current block and information about the determined parameter related to the pixel group unit motion compensation is included in the bitstream.

According to another aspect of the present disclosure, a computer-readable recording medium has recorded thereon a program which performs the video decoding method.

MODE OF DISCLOSURE

Hereinafter, an 'image' may denote a still image of a video, or a moving image, i.e., a video itself.

Hereinafter, a 'sample' denotes data that is assigned to a sampling location of an image and is to be processed. For example, pixels in an image of a spatial domain may be samples.

Hereinafter, a 'current block' may denote a block of an image to be encoded or decoded.

FIG. 1A is a block diagram of a video decoding apparatus according to various embodiments.

A video decoding apparatus 100 according to various embodiments includes an obtainer 105, an inter predictor 110, and a reconstructor 125.

The obtainer 105 receives a bitstream including information about a prediction mode of a current block, information indicating a motion prediction mode of the current block, and information about a motion vector.

The obtainer 105 may obtain, from the received bitstream, the information about the prediction mode of the current block, the information indicating the motion prediction mode of the current block, and the information about the motion vector. Also, the obtainer 105 may obtain, from the bitstream, a reference picture index indicating a reference picture from among previously decoded pictures.

When the prediction mode of the current block is an inter prediction mode, the inter predictor 110 performs inter prediction on the current block. In other words, the inter predictor 110 may generate a prediction pixel value of the current block by using at least one of pictures decoded before a current picture including the current block. For example, when the motion prediction mode of the current block is a bi-directional motion prediction mode, the inter predictor 110 may generate the prediction pixel value of the current block by using two pictures decoded before the current picture. In other words, when the information about the motion prediction mode obtained from the bitstream indicates the bi-directional motion prediction mode, the inter predictor 110 may generate the prediction pixel value of the current block by using the two pictures decoded before the current picture.

The inter predictor 110 may include a block unit motion compensator 115 and a pixel group unit motion compensator 120.

The block unit motion compensator 115 may perform motion compensation on the current block, in block units.

The block unit motion compensator 115 may determine at least one reference picture from the previously decoded pictures, by using a reference picture index obtained from the bitstream. Here, the reference picture index may denote a reference picture index with respect to each of prediction directions including an L0 direction and an L1 direction. Here, the reference picture index with respect to the L0 direction may denote an index indicating a reference picture among pictures included in an L0 reference picture list, and the reference picture index with respect to the L1 direction may denote an index indicating a reference picture among pictures included in an L1 reference picture list.

The block unit motion compensator 115 may determine a reference block of the current block, the reference block positioned in the at least one reference picture by using the information about the motion vector received from the bitstream. Here, a corresponding block in the reference picture, which corresponds to the current block in the current picture, may be the reference block. In other words, the block unit motion compensator 115 may determine the reference block of the current block by using the motion vector indicating the reference block from the current block. Here, the motion vector denotes a vector indicating displacement of reference coordinates of the current block in the current picture and reference coordinates of the reference block in the reference picture. For example, when upper left coordinates of the current block are (1, 1) and upper left coordinates of the reference block in the reference picture are (3, 3), the motion vector may be (2, 2).

Here, the information about the motion vector may include a differential value of the motion vector, and the block unit motion compensator 115 may reconstruct the motion vector by using a predictor of the motion vector and the differential value of the motion vector obtained from the bitstream, and determine the reference block of the current block positioned in the at least one reference picture by using the reconstructed motion vector. Here, the differential value of the motion vector may denote a differential value of a motion vector with respect to a reference picture related to each of the prediction directions including the L0 direction and the L1 direction. Here, the differential value of the motion vector with respect to the L0 direction may denote a differential value of a motion vector indicating the reference block in the reference picture included in the L0 reference picture list, and the differential value of the motion vector with respect to the L1 direction may denote a differential value of a motion vector indicating the reference block in the reference picture included in the L1 reference picture list.

The block unit motion compensator 115 may perform motion compensation on the current block in block units, by using a pixel value of the reference block. The block unit motion compensator 115 may perform motion compensation on the current block in block units, by using a pixel value of a reference pixel in the reference block corresponding to a current pixel in the current block. Here, the reference pixel may be a pixel included in the reference block, and a corresponding pixel that corresponds to the current pixel in the current block may be the reference pixel.

The block unit motion compensator 115 may perform motion compensation on the current block in block units, by using a plurality of reference blocks respectively included in a plurality of reference pictures. For example, when the motion prediction mode of the current block is the bi-directional motion prediction mode, the block unit motion compensator 115 may determine two reference pictures from among the previously encoded pictures, and determine two reference blocks included in the two reference pictures.

The block unit motion compensator 115 may perform motion compensation on the current block in block units, by using pixel values of two reference pixels in the two reference blocks. The block unit motion compensator 115 may generate a motion compensation value in block units by performing the motion compensation on the current block in block units, by using an average value or a weighted sum of the pixel values of the two reference pixels.

A reference position of the reference block may be a position of an integer pixel, but is not limited thereto, and may be a position of a fractional pixel. Here, the integer pixel may denote a pixel in which a position component is an integer, and may be a pixel at an integer pixel position. The fractional pixel may denote a pixel in which a position component is a fraction, and may be a pixel at a fractional pixel position.

For example, when the upper left coordinates of the current block are (1, 1) and the motion vector is (2.5, 2.5), the upper left coordinates of the reference block in the reference picture may be (3.5, 3.5). Here, the position of the fractional pixel may be determined in ¼ pel or 1/16 pel units, wherein pel denotes a pixel element. Alternatively, the position of the fractional pixel may be determined in various fractional pel units.

When the reference position of the reference block is the position of the fractional pixel, the block unit motion compensator 115 may generate a pixel value of a first pixel from among pixels of a first reference block indicated by a first motion vector and a pixel value of a second pixel from among pixels of a second reference block indicated by a second motion vector, by applying an interpolation filter to a first neighboring region including the first pixel and a second neighboring region including the second pixel.

In other words, the pixel value of the reference pixel in the reference block may be determined by using pixel values of neighboring pixels in which a component in a certain direction is an integer. Here, the certain direction may be a horizontal direction or a vertical direction.

For example, the block unit motion compensator 115 may determine, as the pixel value of the reference pixel, a value obtained by performing filtering on pixel values of pixels, in which a component in a certain direction is an integer, by using an interpolation filter, and determine a motion compensation value in block units with respect to the current block, by using the pixel value of the reference pixel. A motion compensation value in block units by using an average value or a weighted sum of reference pixels. Here, the interpolation filter may be a discrete cosine transform (DCT)-based M-tap interpolation filter. A coefficient of the DCT-based M-tap interpolation filter may be induced from DCT and inverse DCT (IDCT). Here, the coefficient of the interpolation filter may be a filter coefficient scaled to an integer coefficient so as to reduce real number operations during the filtering. Here, the interpolation filter may be a one-dimensional (1D) interpolation filter in a horizontal or vertical direction. For example, when a position of a pixel is expressed in x, y orthogonal coordinate components, the horizontal direction may be a direction parallel to an x-axis. The vertical direction may be a direction parallel to a y-axis. The block unit motion compensator 115 may first perform filtering with respect to pixel values of pixels at an integer position by using the 1D interpolation filter in the vertical direction, and then perform filtering with respect to a value generated via the filtering by using the 1D interpolation filter in the horizontal direction to determine the pixel value of the reference pixel at the fractional pixel position.

Meanwhile, the value generated via the filtering when a scaled filter coefficient is used may be higher than a value generated via filtering when an un-scaled filter is used. Accordingly, the block unit motion compensator 115 may perform de-scaling with respect to the value generated via the filtering.

The block unit motion compensator 115 may perform the de-scaling after performing filtering on the pixel values of the pixels at the integer position by using the 1D interpolation filter in the vertical direction. Here, the de-scaling may include bit-shifting to the right by a de-scaling bit number. The de-scaling bit number may be determined based on a bit depth of a sample of an input image. For example, the de-scaling bit number may be a value obtained by subtracting 8 from the bit depth of the sample.

Also, the block unit motion compensator 115 may perform the filtering with respect to the pixel values of the pixels at the integer position by using the 1D interpolation filter in the vertical direction, and perform the filtering with respect to the value generated via the filtering by using the 1D interpolation filter in the horizontal direction, and then perform the de-scaling. Here, the de-scaling may include bit-shifting to the right by a de-scaling bit number. The de-scaling bit number may be determined based on a scaling bit number of the 1D interpolation filter in the vertical direction, a scaling bit number of the 1D interpolation filter in the horizontal direction, and the bit depth of the sample. For example, when the scaling bit number p of the 1D interpolation filter in the vertical direction is 6, the scaling bit number q of the 1D interpolation filter in the horizontal direction is 6, and the bit depth of the sample is b, the de-scaling bit number may be p+q+8-b, i.e., 20-b.

When the block unit motion compensator 115 performs only bit-shifting to the right by a de-scaling bit number after performing filtering with respect to a pixel, in which a component in a certain direction is an integer, by using a 1 D interpolation filter, a round-off error may be generated, and thus the block unit motion compensator 115 may perform the de-scaling after performing the filtering with respect to the pixel, in which the component in the certain direction is the integer, by using the 1D interpolation filter, and then adding an offset value. Here, the offset value may be 2^(de-scaling bit number−1).

The pixel group unit motion compensator 120 may generate a pixel group unit motion compensation value by performing motion compensation on the current block in pixel group units. When the motion prediction mode of the current block is the bi-directional motion prediction mode, the pixel group unit motion compensator 120 may generate the pixel group unit motion compensation value by performing pixel group unit motion compensation on the current block.

The pixel group unit motion compensator 120 may generate the motion compensation value in pixel group units by performing the pixel group unit motion compensation on the current block, based on an optical flow of the pixel groups of the first reference picture and second reference picture. The optical flow will be described later with reference to FIG. 3A.

The pixel group unit motion compensator 120 may generate the motion compensation value in pixel units by performing the motion compensation in pixel group units with respect to pixel groups included in the reference block of the current block. The pixel group may include at least one pixel. For example, the pixel group may be one pixel. Alternatively, the pixel group may be a plurality of pixels including at least two pixels. The pixel group may be a plurality pixels included in a block having a size of K×K (K is an integer).

The pixel group unit motion compensator 120 may obtain a parameter related to a size of a pixel group, based on at least one of information about the size of the pixel group, which is obtained from the bitstream, image resolution, and a frame rate. The pixel group unit motion compensator 120 may determine the pixel group based on the parameter related to the size of the pixel group, and perform the pixel group unit motion compensation with respect to the current block, based on the determined pixel group.

The pixel group unit motion compensator 120 may determine the size of the pixel group based on the resolution of the image. For example, when the resolution of the image is higher than certain resolution, the size of the pixel group may be determined to be larger than the size of a pixel group corresponding to the certain resolution.

The pixel group unit motion compensator 120 may determine the size of the pixel group based on the frame rate. For example, when the frame rate is higher than a certain frame rate, the pixel group unit motion compensator 120 may determine the size of the pixel group to be larger than the size of a pixel group corresponding to the certain frame rate.

The pixel group unit motion compensator 120 may determine the size of the pixel group based on the resolution of the image and the frame rate of the image. For example, when the resolution of the image is higher than the certain resolution and the frame rate is higher than the certain frame rate, the pixel group unit motion compensator 120 may determine the size of the pixel group to be larger than the size of a pixel group corresponding to the certain resolution and the certain frame rate.

The pixel group unit motion compensator 120 may perform the motion compensation in the pixel group units including a plurality of pixels, thereby reducing complexity of encoding/decoding compared to when motion compensation is performed in pixel units at high image resolution. Also, the pixel group unit motion compensator 120 may perform the motion compensation in the pixel group units including a plurality of pixels, thereby reducing complexity of encoding/decoding compared to when motion compensation is performed in pixel units at a high frame rate.

The obtainer 105 may obtain information about the size of the pixel group included in the bitstream. The information about the size of the pixel group may be, when the size of the pixel group is K×K, information indicating a height or width K. The information about the size of the pixel group may be included in a high level syntax carrier.

The pixel group unit motion compensator 120 may determine at least one pixel group partition including pixels having similar pixel values from among the plurality of pixels included in the pixel group, and perform motion compensation on the pixel group partitions. Here, the pixel group partition including the pixels having similar pixel values is highly likely to be the same object, and is highly likely to have similar motion, the pixel group unit motion compensator 120 is capable of performing more precise motion compensation of pixel group units.

Meanwhile, the pixel group unit motion compensation is performed when motion prediction mode information indicates a bi-directional motion prediction mode, but the pixel group unit motion compensation is not always performed, but may be selectively performed.

The pixel group unit motion compensator 120 may determine whether to perform the motion compensation in pixel group units based on at least one of pixel group unit motion flag information obtained from the bitstream, the size of the current block, a prediction direction, the size of a motion vector, a picture order count (POC) difference between the reference picture and the current picture, and availability of a certain coding/decoding tool. The pixel group unit motion compensator 120 may perform the pixel group unit motion compensation on the current block based on the above determination.

The obtainer 105 may obtain, from the bitstream, information indicating whether to perform the pixel group unit motion compensation. Here, the information indicating whether to perform the pixel group unit motion compensation may be on/off information in a flag form. The information indicating whether to perform the pixel group unit motion compensation may be included in a syntax element of a block level. The pixel group unit motion compensator 120 may determine whether to perform the pixel group unit motion compensation on the current block based on the information indicating whether to perform the pixel group unit motion compensation, the information obtained from the bitstream.

Alternatively, the pixel group unit motion compensator 120 may determine whether to perform the pixel group unit motion compensation on the current block in the current picture, by using a parameter related to the image including the current picture.

The pixel group unit motion compensator 120 may determine whether to perform the pixel group unit motion compensation on the current block of the current picture, based on the availability of the certain coding/decoding tool. The pixel group unit motion compensator 120 may determine availability of coding/decoding tool different from coding/decoding tool related to the pixel group unit motion compensation with respect to the current block, and determine whether to perform the pixel group unit motion compensation on the current block in the current picture based on the availability of the certain coding/decoding tool.

For example, the pixel group unit motion compensator 120 may determine whether to perform the pixel group unit motion compensation on the current block in the current picture, when a coding/decoding tool related to overlapped block motion compensation (OBMC) is usable. The pixel group unit motion compensator 120 may determine that the pixel group unit motion compensation is not used with respect to the current block when the coding/decoding tool related to OBMC is usable.

OMBC is motion compensation in block units, which allows reference blocks in a reference picture corresponding to adjacent blocks in the current picture to overlap each other, and may prevent a blocking deterioration phenomenon. Unlike general block unit motion compensation, OBMC compensates for motion considering precise motion of a pixel in a block by allowing overlapping of reference blocks, and thus the pixel group unit motion compensator 120 may determine that the pixel group unit motion compensation is not used on the current block when the coding/decoding tool related to OBMC is usable. In other words, since two or more prediction directions are combined with respect to an overlapping region, the pixel group unit motion compensator 120 may determine that the motion compensation in the pixel group units considering two prediction directions is not generally used. However, an embodiment is not limited thereto, and when a region overlapped via OBMC is not large, the pixel group unit motion compensator 120 may determine that the pixel group unit motion compensation is used on the current block when the coding/decoding tool related to OBMC is usable.

Alternatively, since two or more prediction directions are combined with respect to the overlapping region, the pixel group unit motion compensator 120 may determine that the motion compensation in the pixel group units considering two prediction directions is not used limitedly to the overlapping region. Since only two prediction directions are used with respect to a region that does not overlap, the pixel group unit motion compensator 120 may determine that the motion compensation in the pixel group units considering two prediction directions is used limitedly to the region that does not overlap.

When a coding/decoding tool related to illumination compensation is usable, the pixel group unit motion compensator 120 may determine whether to perform the pixel group unit motion compensation on the current block. For example, when the coding/decoding tool related to illumination compensation is usable, the pixel group unit motion compensator 120 may determine to perform the pixel group unit motion compensation on the current block. The coding/decoding tool related to the pixel group unit motion compensation and the coding/decoding tool related to the illumination compensation do not contradict, and thus the pixel group unit motion compensator 120 may perform illumination compensation on the current block together with the motion compensation on the current block in pixel group units. Here, the illumination compensation denotes an operation in which a luminance pixel value is compensated for to be close to a luminance pixel value of an original image, by using a linear coefficient and offset in block units.

However, since the illumination compensation is performed when there is a luminance difference ΔI with respect to time, motion of an actual object may not be properly compensated for when motion compensation in pixel group units based on an optical flow (see Equation 1) is performed because a value of one side in the optical flow has a non-zero value. Accordingly, when the degree of the illumination compensation is large, i.e., when ΔI is sufficiently large, the pixel group unit motion compensator 120 may determine not to perform the pixel group unit motion compensation on the current block when the coding/decoding tool related to illumination compensation is usable.

The pixel group unit motion compensator 120 may determine whether to perform the pixel group unit motion compensation on the current block when a coding/decoding tool related to weighted prediction is usable. For example, when the pixel group unit motion compensator 120 may determine not to perform the pixel group unit motion compensation on the current block when the coding/decoding tool related to weighted compensation is usable. The coding/decoding tool related to the weighted compensation denotes, when bi-directional motion prediction is performed, a coding/decoding tool in which a weight is assigned to each reference block of each reference picture and offset is assigned thereto to generate a prediction block related to the current block.

The pixel group unit motion compensator 120 may determine whether to perform the pixel group unit motion compensation on the current block when the coding/decoding tool related to affine motion is usable. For example, the pixel group unit motion compensator 120 may determine not to perform the pixel group unit motion compensation on the current block when the coding/decoding tool related to the affine motion is usable. Since the coding/decoding tool related to the affine motion is a coding/decoding tool for compensating for precise motion like the coding/decoding tool related to the pixel group unit motion compensation, the coding/decoding tools contract and thus may not be used together on the same block.

The pixel group unit motion compensator 120 may determine whether to perform the pixel group unit motion compensation on the current block, based on the motion vector of the current block. For example, the pixel group unit motion compensator 120 may determine whether a ratio (Ratioreference1=MV1/POCreference1) between a first motion vector MV1 related to a first reference picture PICreference1 and a POC difference POCreference1 between the current picture and the first reference picture and a ratio (Ratioreference1=MV2/POCreference2) between a second motion vector MV2 related to a second reference picture PlCreference2 and a POC difference POCreference2 between the current picture and the second reference picture are within a certain range, and when the ratios are within the certain range, determine to perform the motion compensation on the current block in pixel group units.

When the size of the motion vector is a certain size, the pixel group unit motion compensator 120 may determine to perform the pixel group unit motion compensation on the current block. For example, the pixel group unit motion compensator 120 may determine to perform the motion compensation on the current block in pixel group units when the size of the motion vector is larger than the certain size. Here, the certain size may be 0.

The pixel group unit motion compensator 120 may determine whether to perform the motion compensation on the current block in the pixel group units according to a temporal direction of first and second prediction directions.

For example, the pixel group unit motion compensator 120 may determine not to perform the motion compensation on the current block in the pixel group units when the first prediction direction related to the first reference picture and the second prediction direction related to the second reference picture both face a reference picture temporally before the current picture or both face a reference picture temporally after the current picture. Here, a temporal order of pictures is related to a display order, and even when a picture is to be displayed temporally after the current picture, the picture may be pre-decoded and stored in a buffer and then displayed after the current picture.

When temporal directions of the first prediction direction and the second prediction direction are different from each other, i.e., when one of the prediction units faces the reference picture temporally before the current picture and the other one faces the reference picture temporally after the current picture, the pixel group unit motion compensator 120 may determine to perform the motion compensation on the current block in the pixel group units.

The pixel group unit motion compensator 120 may determine to perform the pixel group unit motion compensation on the current block when the size of the current block is a certain size. For example, the pixel group unit motion compensator 120 may determine to perform the pixel group unit motion compensation on the current block when the size of the current block is equal to or larger than the certain size.

The pixel group unit motion compensator 120 may determine availability of a certain coding/decoding tool, based on information about the availability of the certain coding/decoding tool, which is obtained from a high level syntax carrier, such as a slice header, a picture parameter, and a sequence parameter set. Also, the pixel group unit motion compensator 120 may determine the availability of the certain coding/decoding tool based on the information about the availability of the coding/decoding tool, which is obtained from a block level syntax element.

However, an embodiment is not limited thereto, and the pixel group unit motion compensator 120 may obtain the information about the availability of the certain coding/decoding tool with respect to the current block from the block level syntax element obtained from the bitstream, determine whether the certain coding/decoding tool is used on the current block based on the information, and determine whether to perform the pixel group unit motion compensation on the current block based on the determining of whether the certain coding/decoding tool is used.

The pixel group unit motion compensator 120 may determine a reference pixel group in the reference block corresponding to the current pixel group of the current block, and determine a gradient value of the reference pixel group.

The pixel group unit motion compensator 120 may generate the motion compensation value in pixel group units by performing the motion compensation in pixel group units with respect to the current block by using the gradient value of the reference pixel group.

The pixel group unit motion compensator 120 may generate a gradient value of the first pixel and a gradient value of the second pixel, by applying a filter to a first peripheral region of a first pixel group including the first pixel group from among pixel groups of the first reference block indicated by the first motion vector and a second peripheral region of a second pixel group including the second pixel group from among pixel groups of the second reference block indicated by the second motion vector.

The pixel group unit motion compensator 120 may determine pixel values and gradient values of pixels in a first window having a certain size and including the first pixel group around the first pixel group in the first reference picture, and determine pixel values and gradient values of pixels in a second window having a certain size and including the second reference pixels around the second reference pixel group in the second reference picture. The pixel group unit motion compensator 120 may obtain a parameter related to a size of a window used to calculate a displacement vector per unit time based on at least one of information about a window size, which is obtained from the bitstream, a hierarchy depth of a picture, a size of group of picture (GOP), image resolution, a parameter related to a temporal distance between the reference picture and the current picture, a frame rate, a motion vector, a setting parameter related to an encoding prediction structure, and a prediction direction, and perform the motion compensation on the current block in pixel group units based on the parameter related to the size of the window. For example, the size M×M of the window guarantees motion consistency and an error probability while calculating the displacement vector per unit time with respect to the current pixel group may be reduced. When there is a factor that may increase possibility of error generation, the pixel group unit motion compensator 120 may enlarge the size of the window to guarantee motion consistency and reduce error probability during calculation.

When the size of GOP is large, a distance between the current picture and the reference picture may be increased, and thus the possibility of error generation may be increased. Accordingly, the pixel group unit motion compensator 120 may perform the motion compensation on the current block in pixel group units by enlarging the size of the window.

Also, for example, when the size of the pixel group is K×K size, the motion consistency is guaranteed more compared to when the pixel group includes only one pixel, and thus the pixel group unit motion compensator 120 may determine the size of the window with respect to the pixel group of K×K size to be smaller than a size of a window with respect to a pixel group including only one pixel.

Information about the size of a window, such as a first window and a second window, may be explicitly signalled from a high level syntax carrier included in the bitstream and in a slice header, a picture parameter set, a sequence parameter set, or other various forms.

Alternatively, the size of the window may be induced by a parameter related to the image including the current picture. For example, the size of the window may be determined based on the hierarchy depth of the current picture. In other words, the error is accumulated as the hierarchy depth of the current picture is increased, and thus prediction accuracy is decreased. Accordingly, the size of the window may be determined to be large.

Here, the size of the hierarchy depth of the current picture may be larger than the size of the hierarchy depth of the image, which is referred to by the image. For example, a hierarchy depth of an intra picture may be 0, a hierarchy depth of a first picture referring to the intra picture may be 1, and a hierarchy depth of a second picture referring to the first picture may be 2.

Also, the pixel group unit motion compensator 120 may determine the size of the window based on the size of GOP.

Alternatively, the pixel group unit motion compensator 120 may determine the window size based on the resolution of the image.

The pixel group unit motion compensator 120 may determine the window size based on the frame rate. Also, the pixel group unit motion compensator 120 may determine the window size based on the motion vector of the current block. In particular, the pixel group unit motion compensator 120 may determine the window size based on at least one of the size and angle of the motion vector of the current block.

The pixel group unit motion compensator 120 may determine the window size based on a reference picture index indicating one of a plurality of pictures stored in a reference picture buffer.

The pixel group unit motion compensator 120 may determine the window size based on availability of bi-directional prediction from different temporal direction. Also, the pixel group unit motion compensator 120 may determine the window size based on a setting parameter related to an encoding prediction structure. Here, the setting parameter related to the encoding prediction structure may indicate low-delay or random access.

The pixel group unit motion compensator 120 may differently determine the window size based on whether the encoding prediction structure is low-delay or random access.

The pixel group unit motion compensator 120 may perform the motion compensation in pixel group units by using a gradient value and pixel values of pixels, wherein a difference between the pixel values and a value of a pixel included in the current pixel group among pixels included in the window is not greater than a certain threshold value. This is to guarantee consistent motion with respect to regions of the same object.

The pixel group unit motion compensator 120 may determine the displacement vector per unit time with respect to the current pixel group by using pixel values and gradient values of pixels in the first window, and pixel values and gradient values of pixels in the second window. Here, a value of the displacement vector per unit time with respect to the current pixel group may be adjusted by a regularization parameter. The regularization parameter is a parameter introduced to prevent error generation when the displacement vector per unit time with respect to an ill-posed current pixel group is determined to perform the motion compensation in pixel group units. The pixel group unit motion compensator 120 may obtain the regularization parameter related to the displacement vector per unit time in a horizontal or vertical direction, based on at least one of information about the regularization parameter related to the displacement vector per unit time in the horizontal or vertical direction, the information obtained from the bitstream, the bit depth of a sample, the size of GOP, the motion vector, the parameter related to the temporal distance between the reference picture and the current picture, the frame rate, the setting parameter related to the encoding prediction structure, and the prediction direction. The pixel group unit motion compensator 120 may perform the pixel group unit motion compensation on the current block based on the regularization parameter related to the displacement vector per unit time in the horizontal or vertical direction. The regularization parameter will be described later with reference to FIG. 8A.

The pixel group unit motion compensator 120 may determine the regularization parameter based on the information about the regularization parameter obtained from the bitstream. The information about the regularization parameter may be included in a high level syntax carrier in a slice header, a picture parameter set, a sequence parameter set, or other various forms.

However, an embodiment is not limited thereto, and the pixel group unit motion compensator 120 may determine the regularization parameter based on the parameter related to the image. For example, the pixel group unit motion compensator 120 may determine the regularization parameter based on the size of GOP. The pixel group unit motion compensator 120 may determine the regularization parameter based on the distance from the current picture to the reference picture. Here, the distance to the reference picture may be a POC difference between the current picture and the reference picture.

The pixel group unit motion compensator 120 may determine the regularization parameter based on the motion vector of the current block. The pixel group unit motion compensator 120 may determine the regularization parameter based on at least one of the size and angle of the motion vector of the current block.

The pixel group unit motion compensator 120 may determine the regularization parameter based on the reference picture index.

The pixel group unit motion compensator 120 may determine the regularization parameter based on the availability of the bi-direction prediction from different temporal direction. Also, the pixel group unit motion compensator 120 may determine the regularization parameter based on the setting parameter related to the encoding prediction structure. The setting parameter related to the encoding prediction structure may indicate low-delay or random access.

The pixel group unit motion compensator 120 may differently determine the regularization parameter based on low-delay or random access.

The pixel group unit motion compensator 120 may determine the regularization parameter based on the frame rate. The pixel group unit motion compensator 120 may determine the regularization parameter based on availability of bi-directional prediction having different temporal directions.

The pixel group unit motion compensator 120 may perform the motion compensation on the current block in pixel group units, by using the displacement vector per unit time with respect to the current pixel and the gradient value of the reference pixel.

A reference position of the reference block may be an integer pixel position, but alternatively, may be a fractional pixel position.

When the reference position of the reference block is the fractional pixel position, the gradient value of the reference pixel in the reference block may be determined by using pixel values of neighboring pixels, in which a component in a certain direction is an integer.

For example, the pixel group unit motion compensator 120 may determine, as the gradient value of the reference pixel, a result value obtained by performing filtering on the pixel values of the neighboring pixels, in which the component in the certain direction is an integer, by using a gradient filter. Here, a filter coefficient of the gradient filter may be determined by using a coefficient pre-determined with respect to a DCT-based interpolation filter. The filter coefficient of the gradient filter may be a filter coefficient scaled to an integer coefficient so as to reduce real number operations during the filtering.

Here, the gradient filter may be a 1D gradient filter in a horizontal or vertical direction.

The pixel group unit motion compensator 120 may perform filtering on a neighboring pixel, in which a component in a corresponding direction is an integer, by using the 1D gradient filter in the horizontal or vertical direction, so as to determine a gradient value of the reference pixel in the horizontal or vertical direction.

For example, the pixel group unit motion compensator 120 may determine the gradient value of the reference pixel in the horizontal direction by performing filtering on a pixel positioned in a horizontal direction from a pixel, in which a horizontal direction component is an integer, from among pixels adjacent to the reference pixel, by using the 1D gradient filter in the horizontal direction.

When the position of the reference pixel is $(x+\alpha, y+\beta)$, wherein x and y are each an integer and $\alpha$ and $\beta$ are each a fraction, the pixel group unit motion compensator 120 may determine, as a pixel value at a $(x, y+\beta)$ position, a result value obtained by performing filtering on a pixel at a $(x, y)$ position and a pixel, in which a vertical component is an integer, from among pixels positioned in the vertical direction from the pixel at the $(x, y)$ position, by using the 1D interpolation filter.

The pixel group unit motion compensator 120 may determine, as a gradient value at a $(x+\alpha, y+\beta)$ position in the horizontal direction, a result value obtained by performing filtering on the pixel value at the (x, y+β) position and pixel values of pixels, in which a horizontal component is an integer, from among pixels positioned in the horizontal direction from the pixel at the (x, y+β) position, by using the gradient filter in the horizontal direction.

An order of using the 1D gradient filter and the 1D interpolation filter is not limited. In the above description, an interpolation filtering value in a vertical direction is first generated by performing filtering on a pixel at an integer position by using an interpolation filter in the vertical direction, and then filtering is performed on the interpolation filtering value in the vertical direction by using a 1 D gradient filter in a horizontal direction, but alternatively, an interpolation filtering value in the horizontal direction may be generated first by performing filtering on the pixel at the integer position by using the 1D gradient filter in the horizontal direction, and then filtering may be performed on the interpolation filtering value in the horizontal direction by using the 1D interpolation filter in the vertical direction.

Hereinabove, the pixel group unit motion compensator 120 determining a gradient value in a horizontal direction at a (x+α, y+β) position has been described in detail. Since the pixel group unit motion compensator 120 determines a gradient value in a vertical direction at a (x+α, y+β) position in the similar manner as determining of a gradient value in a horizontal direction, details thereof are not provided again.

Hereinabove, the pixel group unit motion compensator 120 using a 1D gradient filter and a 1D interpolation filter so as to determine a gradient value at a fractional pixel position has been described in detail. However, alternatively, a gradient filter and an interpolation filter may be used to determine a gradient value at an integer pixel position. However, in case of an integer pixel, a pixel value may be determined without using an interpolation filter, but the pixel value of the integer pixel may be determined by performing filtering on the integer pixel and a neighboring pixel, in which a component in a certain direction is an integer, by using an interpolation filter, for processes consistent with processes in a fractional pixel. For example, an interpolation filter coefficient in an integer pixel may be {0, 0, 64, 0, 0}, and since an interpolation filter coefficient related to a neighboring integer pixel is 0, filtering may be performed by only using a pixel value of a current integer pixel, and as a result, filtering may be performed on the current integer pixel and a neighboring integer pixel by using an interpolation filter to determine the pixel value of the current integer pixel.

The pixel group unit motion compensator 120 may perform de-scaling after performing filtering on a pixel at an integer position by using a 1 D interpolation filter in a vertical direction. Here, the de-scaling may include bit-shifting to the right by a de-scaling bit number. The de-scaling bit number may be determined based on a bit depth of a sample. Also, the de-scaling bit number may be determined based on specific input data in the block.

For example, the de-scaling bit number may be a value obtained by subtracting 8 from the bit depth of the sample.

The pixel group unit motion compensator 120 may perform de-scaling after performing filtering on a value generated by performing the de-scaling by using a gradient filter in a horizontal direction. Likewise here, the de-scaling may include bit-shifting to the right by the de-scaling bit number. The de-scaling bit number may be determined based on a scaling bit number of a 1 D interpolation filter in a vertical direction, a scaling bit number of a 1 D gradient filter in a horizontal direction, and a bit depth of a sample. For example, when the scaling bit number p of the 1D interpolation filter in the vertical direction is 6, the scaling bit number q of the 1D gradient filter in the horizontal direction is 4, and the bit depth of the sample is b, the de-scaling bit number may be p+q+8-b, i.e., 18-b.

When the pixel group unit motion compensator 120 performs only bit-shifting to the right by a de-scaling bit number on a value generated via filtering after performing the filtering, a round-off error may be generated, and thus the pixel group unit motion compensator 120 may perform the de-scaling after adding an offset value to the value generated via the filtering. Here, the offset value may be $2^{(\text{de-scaling bit number}-1)}$.

The inter predictor 110 may generate the prediction pixel value of the current block by using the motion compensation value in block units and the motion compensation value in pixel group units with respect to the current block. For example, the inter predictor 110 may generate the prediction pixel value of the current block by adding the motion compensation value in block units and the motion compensation value in pixel group units with respect to the current block. Here, the motion compensation value in block units may denote a value generated by performing motion compensation in block units, and the motion compensation value in pixel group units denote a value generated by performing motion compensation in pixel group units, wherein the motion compensation value in block units may be an average value or weighted sum of the reference pixel, and the motion compensation value in pixel group units may be a value determined based on the displacement vector per unit time related to the current pixel and the gradient value of the reference pixel.

The pixel group unit motion compensator 120 may obtain a shift value for de-scaling after an interpolation operation or a gradient operation, based on at least one of the bit depth of the sample, a range of an input of a filter used for the interpolation operation or the gradient operation, and a coefficient of the filter. The pixel group unit motion compensator 120 may perform de-scaling after the interpolation operation or the gradient operation with respect to the pixels included in the first reference block and the second reference block, by using the shift value for de-scaling.

The inter predictor 110 may use a motion vector when performing the block unit motion compensation, and store the motion vector. Here, a motion vector unit may be a block having a 4×4 size. Meanwhile, when the motion vector is stored after the block unit motion compensation, a motion vector storage unit may be a block having various sizes other than the 4×4 size (for example, a block having a R×R size, wherein R is an integer). Here, the motion vector storage unit may be a block larger than the 4×4 size. For example, the motion vector storage unit may be a block having a 16×16 size. When the motion vector unit is a block having the 4×4 size and the motion vector storage unit is a block having the 16×16 size, the inter predictor 110 may store the motion vector according to an equation $(MVx, MVy) = f_{R \times R}(MVx, MVy)$. Here, MVx and MVy are respectively an x component and a y component of the motion vector used in the block unit motion compensation, $f_{R \times R}(MVx, MVy)$ may denote a function by the motion vector MVx,MVy considering the size of the motion vector storage unit of R×R. For example, $f_{R \times R}(MVx, MVy)$ may be a function in which an average value of x components MVx of motion vectors of a unit included in the motion vector storage unit of R×R is determined to be the x component MVx stored in the motion vector storage unit of R×R, and an average value of y components MVy of motion vectors of a unit included in the motion vector storage unit of R×R is determined to be the y component MVy stored in the motion vector storage unit of R×R.

In other words, the inter predictor 110 may perform memory compression by using a larger unit when storing the motion vector. The inter predictor 110 may perform not only the motion compensation in block units, but also the motion compensation in pixel group units, with respect to a block included in the current picture. Thus, the motion vector considering not only the block unit motion compensation, but also the motion compensation in pixel group units may be stored. Here, the stored motion vector may be determined based on the motion vector used in the motion compensation in block units, the displacement vector per unit time in the horizontal or vertical direction used in the motion compensation in pixel group units, and a weight with respect to the displacement vector per unit time in the horizontal or vertical direction.

Here, the weight may be determined based on the size of the motion vector storage unit, the size of the pixel group, and a scaling factor of the gradient filter or interpolation filter used in the motion compensation in pixel group units.

The inter predictor 110 may determine a motion vector predictor of a block in a picture decoded after the current picture, by using temporal motion vector predictor candidates. The temporal motion vector predictor candidate may be a motion vector of a collocated block included in a previously decoded picture, and accordingly, may be a motion vector stored with respect to the previously decoded picture. Here, when the stored motion vector is the motion vector considering the motion compensation in pixel group units, the temporal motion vector predictor candidate may be determined as a motion vector used in more precise motion compensation, and thus prediction encoding/decoding efficiency may be increased.

Meanwhile, when the pixel group unit motion compensation is performed, a size of a target block for performing the pixel group unit motion compensation may be enlarged based on the size of a window and a length of the interpolation filter, together with the size of the current block. The target block is enlarged than the current block based on the size of the window because, in a pixel positioned at an edge of the current block, the pixel group unit motion compensation is performed on the current block based on the pixel positioned at the edge of the current block and neighboring pixels.

Accordingly, the pixel group unit motion compensator 120 may adjust a position of a pixel outside the current block among pixels in the window to a position of a pixel adjacent to the inside of the current block and determine a pixel value and a gradient value at the adjusted position of the pixel during a process of performing the pixel group unit motion compensation by using the window so as to reduce memory access times and multiplication operation times, thereby reducing the memory access times and the multiplication operation times.

The reconstructor 125 may obtain a residual block of the current block from the bitstream, and reconstruct the current block by using the residual block and the prediction pixel value of the current block. For example, the reconstructor 125 may generate, from the bitstream, a pixel value of a reconstructed block by adding a pixel value of the residual block of the current block and the pixel value of the prediction block of the current block.

The video decoding apparatus 100 may include an image decoder (not shown), wherein the image decoder may include the obtainer 105, the inter predictor 110, and the reconstructor 125. The image decoder will be described below with reference to FIG. 1E.

Figure 1B:
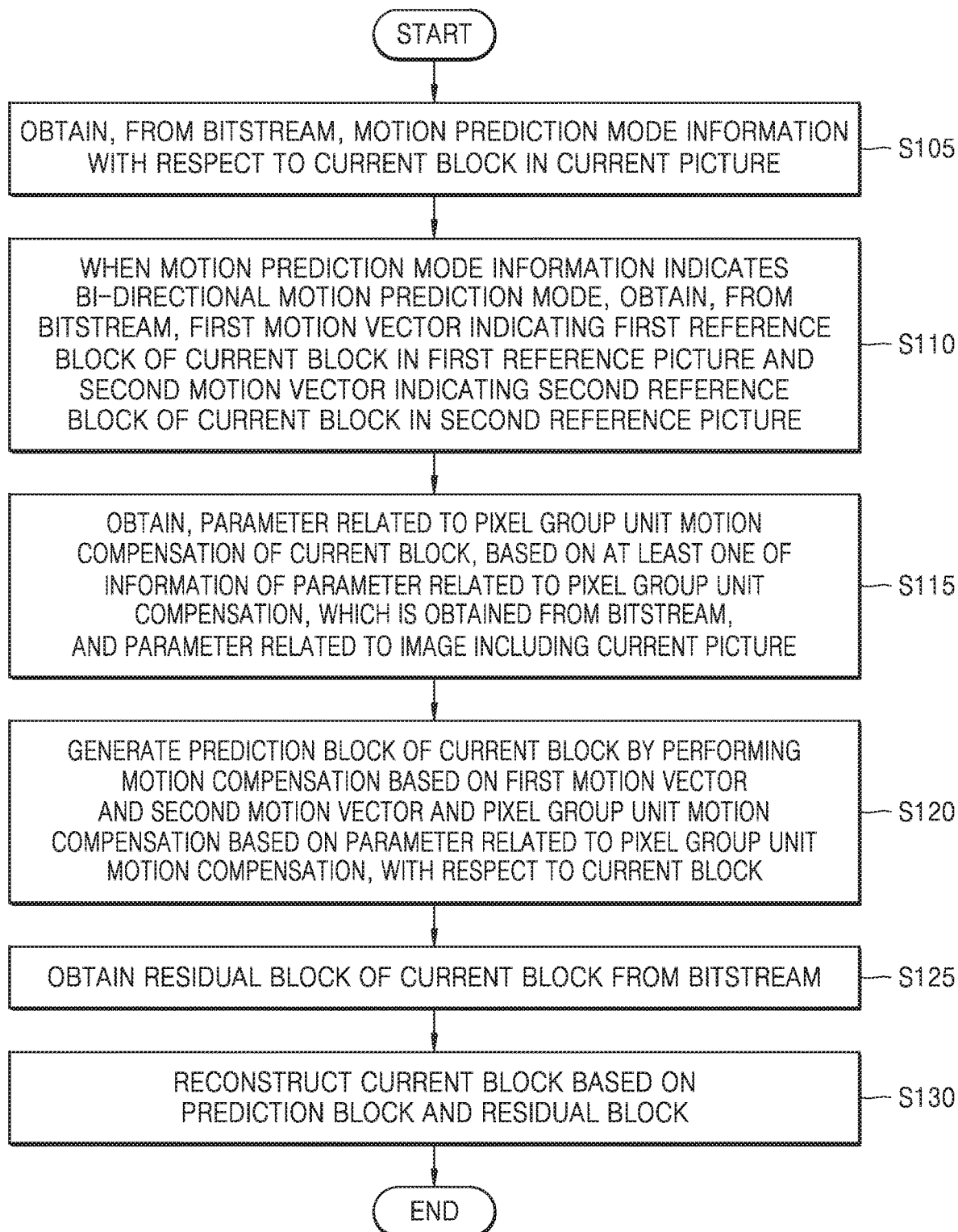
FIG. 1B is a flowchart of a video decoding method according to various embodiments.

FIG. 1B is a flowchart of a video decoding method according to various embodiments.

In operation S105, the video decoding apparatus 100 may obtain, from a bitstream, motion prediction mode information with respect to a current block in a current picture. The video decoding apparatus 100 may receive the bitstream including the motion prediction mode information with respect to the current block in the current picture, and obtain the motion prediction mode information with respect to the current block from the received bitstream.

The video decoding apparatus 100 may obtain, from the bitstream, information about a prediction mode of the current block, and determine the prediction mode of the current block based on the information about the prediction mode of the current block. Here, when the prediction mode of the current block is an inter prediction mode, the video decoding apparatus 100 may obtain the motion prediction mode information with respect to the current block.

For example, the video decoding apparatus 100 may determine the prediction mode of the current block to be the inter prediction mode, based on the information about the prediction mode of the current block. When the prediction mode of the current block is the inter prediction mode, the video decoding apparatus 100 may obtain the motion prediction mode information with respect to the current block from the bitstream.

In operation S110, when the motion prediction mode information indicates a bi-directional motion prediction mode, the video decoding apparatus 100 may obtain, from the bitstream, a first motion vector indicating a first reference block of the current block in a first reference picture and a second motion vector indicating a second reference block of the current block in a second reference picture.

In other words, the video decoding apparatus 100 may obtain the bitstream including information about the first and second motion vectors, and obtain the first and second motion vectors from the received bitstream. The video decoding apparatus 100 may obtain a reference picture index from the bitstream, and determine the first and second reference pictures from among previously decoded pictures based on the reference picture index.

In operation S115, the video decoding apparatus 100 may obtain a parameter related to pixel group unit motion compensation of the current block, based on at least one of information of a parameter related to the pixel group unit compensation, which is obtained from the bitstream, and a parameter of an image including the current picture. Here, a pixel group may include at least one pixel.

In operation S120, the video decoding apparatus 100 may generate a prediction block of the current block by performing the motion compensation based on the first motion vector and the second motion vector and the pixel group unit motion compensation based on the parameter related to the pixel group unit motion compensation, with respect to the current block.

In operation S125, the video decoding apparatus 100 may obtain a residual block of the current block from the bitstream.

In operation S130, the video decoding apparatus 100 may reconstruct the current block based on the prediction block and the residual block. In other words, the video decoding apparatus 100 may generate a pixel value of a reconstructed block of the current block by adding a prediction pixel value of the prediction block and a pixel value of the residual block indicated by the residual block related to the current block.

Figure 1C:
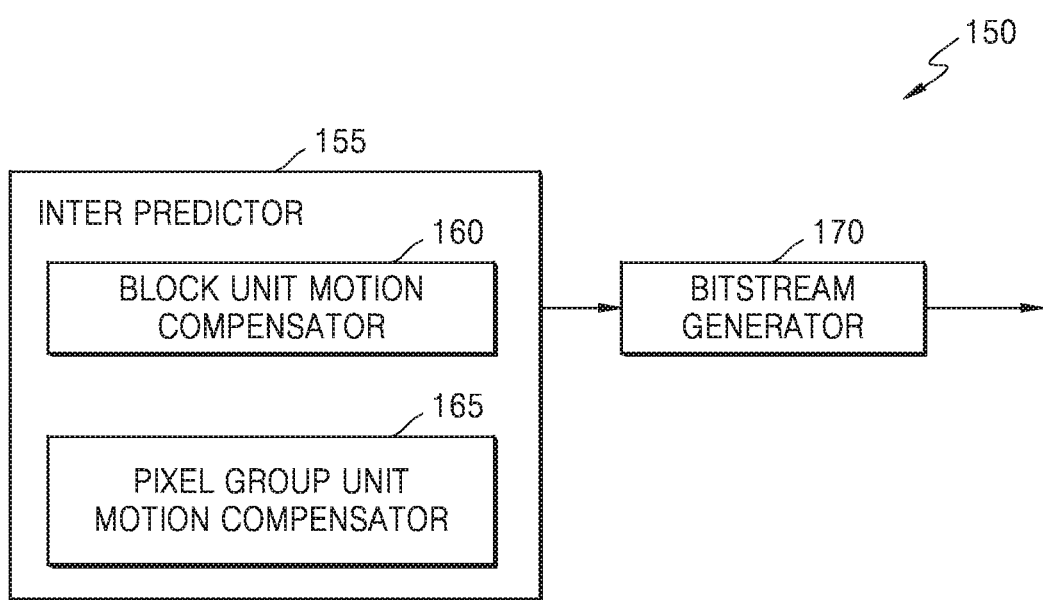
FIG. 1C is a block diagram of a video encoding apparatus according to various embodiments.

FIG. 1C is a block diagram of a video encoding apparatus according to various embodiments.

A video encoding apparatus 150 according to various embodiments includes an inter predictor 155 and a bitstream generator 170.

The inter predictor 155 performs inter prediction on a current block by referring to various blocks based on a rate and a distortion cost. In other words, the inter predictor 155 may generate a prediction pixel value of the current block by using at least one of pictures encoded before a current picture included in the current block.

The inter predictor 155 may include a block unit motion compensator 160 and a pixel group unit motion compensator 165.

The block unit motion compensator 160 may generate a motion compensation value in block units by performing motion compensation on the current block in block units.

The block unit motion compensator 160 may determine at least one reference picture from among previously encoded pictures, and determine a reference block of the current block positioned in the at least one reference picture.

The block unit motion compensator 160 may generate the motion compensation value in block units by performing the motion compensation on the current block in block units, by using a pixel value of the reference block. The block unit motion compensator 160 may generate the motion compensation value in block units by performing the motion compensation on the current block in block units by using a reference pixel value of the reference block, which corresponds to a current pixel of the current block.

The block unit motion compensator 160 may generate the motion compensation value in block units by performing the motion compensation on the current block in block units, by using a plurality of reference blocks respectively included in a plurality of reference pictures. For example, when a motion prediction mode of the current block is a bi-directional prediction mode, the block unit motion compensator 160 may determine two reference pictures from among the previously encoded pictures, and determine two reference blocks included in the two reference pictures. Here, bi-directional prediction does not only mean that inter prediction is performed by using a picture displayed before the current picture and a picture displayed after the current picture, but may also mean that inter prediction is performed by using two pictures encoded before the current picture regardless of an order of being displayed.

The block unit motion compensator 160 may generate the motion compensation value in block units by performing the motion compensation on the current block in block units by using pixel values of two reference pixels in the two reference blocks. The block unit motion compensator 160 may generate the motion compensation value in block units by performing the motion compensation on the current block in block units, by using an average pixel value or weighted sum of the two reference pixels.

The block unit motion compensator 160 may output a reference picture index indicating a reference picture for motion compensation of the current block, from among the previously encoded pictures.

The block unit motion compensator 160 may determine a motion vector having the current block as a start point and the reference block of the current block as an end point, and output the motion vector. The motion vector may denote a vector indicating displacement of reference coordinates of the current block in the current picture and reference coordinates of the reference block in the reference picture. For example, when coordinates of an upper left corner of the current block are (1, 1) and upper left coordinates of the reference block in the reference picture are (3, 3), the motion vector may be (2, 2).

A reference position of the reference block may be a position of an integer pixel, but alternatively, may be a position of a fractional pixel. Here, the position of the fractional pixel may be determined in ¼ pel or ⅙ pel units. Alternatively, the position of the fractional pixel may be determined in various fractional pel units.

For example, when the reference position of the reference block is (1.5, 1.5) and the coordinates of the upper left corner of the current block are (1, 1), the motion vector may be (0.5, 0.5). When the motion vector is determined in ¼ or ⅙ pel units to indicate the reference position of the reference block, which is a position of a fractional pixel, a motion vector of an integer is determined by scaling the motion vector, and the reference position of the reference block may be determined by using the up-scaled motion vector. When the reference position of the reference block is a position of a fractional pixel, a position of the reference pixel of the reference block may also be a position of a fractional pixel. Accordingly, a pixel value at a fractional pixel position in the reference block may be determined by using pixel values of neighboring pixels, in which a component in a certain direction is an integer.

For example, the block unit motion compensator 160 may determine, as the pixel value of the reference pixel at the fractional pixel position, a value obtained by performing filtering on pixel values of neighboring pixels, in which a component in a certain direction is an integer, by using an interpolation filter, and determine the motion compensation value in block units with respect to the current block, by using the pixel value of the reference pixel. Here, the interpolation filter may be a DCT-based M-tap interpolation filter. A coefficient of the DCT-based M-tap interpolation filter may be induced from DCT and IDCT. Here, the coefficient of the interpolation filter may be a filter coefficient scaled to an integer coefficient so as to reduce real number operations during the filtering.

Here, the interpolation filter may be a 1D interpolation filter in a horizontal or vertical direction.

The block unit motion compensator 160 may first perform filtering with respect to neighboring integer pixels by using a 1 D interpolation filter in a vertical direction, and then perform filtering with respect to a value on which the filtering is performed, by using a 1 D interpolation filter in a horizontal direction to determine the pixel value of the reference pixel at the fractional pixel position. When a scaled filter coefficient is used, the block unit motion compensator 160 may perform de-scaling on a value on which filtering is performed, after performing filtering on a pixel at an integer position by using the 1D interpolation filter in the vertical direction. Here, the de-scaling may include bit-shifting to the right by a de-scaling bit number. The de-scaling bit number may be determined based on a bit depth of a sample. For example, the de-scaling bit number may be a value obtained by subtracting 8 from the bit depth of the sample.

Also, the block unit motion compensator 160 may perform filtering on a pixel, in which a horizontal direction component is an integer, by using the 1D interpolation filter in the vertical direction, and then perform the bit-shifting to the right by the de-scaling bit number. The de-scaling bit number may be determined based on a scaling bit number of the 1D interpolation filter in the vertical direction, a scaling bit number of the 1D interpolation filter in the horizontal direction, and the bit depth of the sample.

When the block unit motion compensator 160 performs only bit-shifting to the right by a de-scaling bit number, a round-off error may be generated, and thus the block unit motion compensator 160 may perform filtering on a pixel, in which a component in a certain direction is an integer, by using a 1 D interpolation filter in the certain direction, add an offset value to a value on which the filtering is performed, and then perform de-scaling on a value to which the offset value is added. Here, the offset value may be 2^(de-scaling bit number−1).

Hereinabove, determining of a de-scaling bit number based on a bit depth of a sample after filtering using a 1 D interpolation filter in a vertical direction has been described, but alternatively, the de-scaling bit number may be determined not only the bit depth of the sample, but also a bit number scaled with respect to an interpolation filter coefficient. In other words, the de-scaling bit number may be determined based on the bit depth of the sample and the bit number scaled with respect to the interpolation coefficient, within a range that overflow does not occur, while considering a size of a register used during filtering and a size of a buffer storing a value generated during the filtering.

The pixel group unit motion compensator 165 may generate a motion compensation value in pixel group units by performing motion compensation on the current block in pixel group units. For example, when the motion prediction mode is a bi-directional motion prediction mode, the pixel group unit motion compensator 165 may generate the motion compensation value in pixel group units by performing the motion compensation on the current block in pixel group units.

The pixel group unit motion compensator 165 may generate the motion compensation value in pixel group units by performing the motion compensation on the current block in pixel group units, by using gradient values of pixels included in the reference block of the current block.

The pixel group unit motion compensator 165 may generate a gradient value of a first pixel from among pixels of a first reference block in a first reference picture and a gradient value of a second pixel from among pixels of a second reference block in a second reference picture by applying a filter to a first peripheral region of the first pixel and a second peripheral region of the second pixel.

The pixel group unit motion compensator 165 may determine pixel values and gradient values of pixels in a first window having a certain size and including the first reference pixel around the first reference pixel in the first reference picture, and determine pixel values and gradient values of pixels in a second window having a certain size and including the second reference pixel around the second reference pixel in the second reference picture. The pixel group unit motion compensator 165 may determine a displacement vector per unit time with respect to the current pixel by using the pixel values and gradient values of the pixels in the first window and the pixel values and gradient values of the pixels in the second window.

The pixel group unit motion compensator 165 may generate the motion compensation value in pixel group units by performing the motion compensation on the current block in pixel group units, by using the displacement vector per unit time and a gradient value of the reference pixel.

A position of the reference pixel may be a position of an integer pixel, but alternatively, may be a position of a fractional pixel.

When a reference position of the reference block is a position of a fractional pixel, the gradient value of the reference pixel in the reference block may be determined by using pixel values of neighboring pixels, in which a component in a certain direction is an integer.

For example, the pixel group unit motion compensator 165 may determine, as the gradient value of the reference pixel, a result value obtained by performing filtering on the pixel values of the neighboring pixels, in which a component in a certain direction is an integer, by using a gradient filter. Here, a filter coefficient of the gradient filter may be determined by using a coefficient pre-determined with respect to a DCT-based interpolation filter.

The filter coefficient of the gradient filter may be a filter coefficient scaled to an integer coefficient so as to reduce real number operations during the filtering. Here, the gradient filter may be a 1D gradient filter in a horizontal or vertical direction.

The pixel group unit motion compensator 165 may perform filtering on a neighboring pixel, in which a component in a corresponding direction is an integer, by using a 1 D gradient filter in a horizontal or vertical direction, so as to determine a gradient value of the reference pixel in the horizontal or vertical direction.

For example, the pixel group unit motion compensator 165 may determine a pixel value of a pixel, in which a vertical component is a fraction, by performing filtering on pixels, in which a vertical component is an integer, from among pixels in a vertical direction from an integer pixel adjacent to a reference pixel, by using a 1 D interpolation filter in the vertical direction.

With respect to a pixel positioned in another column adjacent to the integer pixel adjacent to the reference pixel, the pixel group unit motion compensator 165 may determine a pixel value of a fractional pixel position positioned in the other column by performing filtering on a neighboring integer pixel in the vertical direction, by using the 1D interpolation filter in the vertical direction. Here, a position of the pixel positioned in the other column may be a position of a fractional pixel in the vertical direction and a position of an integer pixel in the horizontal direction.

In other words, when the position of the reference pixel is $(x+\alpha, y+\beta)$, wherein x and y are each an integer and $\alpha$ and $\beta$ are each a fraction, the pixel group unit motion compensator 165 may determine a pixel value at a $(x, y+\beta)$ position by performing filtering on a neighboring integer pixel in the vertical direction from a $(x, y)$ position by using an interpolation filter in the vertical direction.

The pixel group unit motion compensator 165 may determine a gradient value at a $(x+\alpha, y+\beta)$ position in the horizontal direction by performing filtering on the pixel value at the $(x, y+\beta)$ position and a pixel value of a pixel, in which a horizontal component is an integer, from among pixels positioned in the horizontal direction from the pixel value at the $(x, y+\beta)$ position, by using a gradient filter in the horizontal direction.

An order of using the 1D gradient filter and the 1D interpolation filter is not limited. As described above, an interpolation filtering value in a vertical direction may be first generated by performing filtering on a pixel at an integer position by using an interpolation filter in the vertical direction, and then filtering may be performed on the interpolation filtering value in the vertical direction by using a 1 D gradient filter in a horizontal direction, but alternatively, a gradient filtering value in the horizontal direction may be generated first by performing filtering on the pixel at the integer position by using the 1D gradient filter in the horizontal direction, and then filtering may be performed on the gradient filtering value in the horizontal direction by using the 1D interpolation filter in the vertical direction.

Hereinabove, the pixel group unit motion compensator 165 determining a gradient value in a horizontal direction at a (x+α, y+β) position has been described in detail.

The pixel group unit motion compensator 165 may determine a gradient value in a vertical direction at a (x+α, y+β) position in the similar manner as determining of a gradient value in a horizontal direction.

The pixel group unit motion compensator 165 may determine a gradient value of a reference pixel in a vertical direction by performing filtering on a neighboring integer pixel in the vertical direction from integer pixels adjacent to the reference pixel, by using a 1D gradient filter in the vertical direction. Also with respect to a pixel adjacent to the reference pixel and positioned in another column, the pixel group unit motion compensator 165 may determine a gradient value in the vertical direction with respect to the pixel adjacent to the reference pixel and positioned in the other column by performing filtering on a neighboring integer pixel in the vertical direction, by using the 1D gradient filter in the vertical direction. Here, a position of the pixel may be a position of a fractional pixel in the vertical direction and a position of an integer pixel in a horizontal direction.

In other words, when a position of a reference pixel is (x+α, y+β), wherein x and y are each an integer, and α and β are each a fraction, the pixel group unit motion compensator 165 may determine a gradient value in a vertical direction at a (x, y+β) position by performing filtering on a neighboring integer pixel in the vertical direction from a (x, y) position, by using a gradient filter in the vertical direction.

The pixel group unit motion compensator 165 may determine a gradient value in a vertical direction at a (x+α, y+β) position by performing filtering on a gradient value at a (x, y+β) position and a gradient value of a neighboring integer pixel positioned in a horizontal direction from the (x, y+β) position, by using an interpolation filter in the horizontal direction.

An order of using the 1D gradient filter and the 1D interpolation filter is not limited. As described above, a gradient filtering value in a vertical direction may be first generated by performing filtering on pixels at an integer position by using an gradient filter in the vertical direction, and then filtering may be performed on the gradient filtering value in the vertical direction by using a 1D interpolation filter in a horizontal direction, but alternatively, an interpolation filtering value in the horizontal direction may be generated first by performing filtering on the pixel at the integer position by using the 1D interpolation filter in the horizontal direction, and then filtering may be performed on the interpolation filtering value in the horizontal direction by using the 1D gradient filter in the vertical direction.

Hereinabove, the pixel group unit motion compensator 165 using a gradient filter and an interpolation filter so as to determine a gradient value at a fractional pixel position has been described in detail. However, alternatively, a gradient filter and an interpolation filter may be used to determine a gradient value at an integer pixel position.

In case of an integer pixel, a pixel value may be determined without using an interpolation filter, but filtering may be performed on the integer pixel and a neighboring integer pixel by using an interpolation filter for processes consistent with processes in a fractional pixel. For example, an interpolation filter coefficient in an integer pixel may be {0, 0, 64, 0, 0}, and since an interpolation filter coefficient multiplied to the neighboring integer pixel is 0, filtering may be performed by only using a pixel value of a current integer pixel, and as a result, the pixel value of the current integer pixel may identically determined as a value generated by performing filtering on the current integer pixel and the neighboring integer pixel by using the interpolation filter.

Meanwhile, when a scaled filter coefficient is used, the pixel group unit motion compensator 165 may perform filtering on a pixel at an integer position by using a 1D gradient filter in a horizontal direction, and then perform de-scaling on a value on which the filtering is performed. Here, the de-scaling may include bit-shifting to the right by a de-scaling bit number. The de-scaling bit number may be determined based on a bit depth of a sample. For example, the de-scaling bit number may be a value obtained by subtracting 8 from the bit depth of the sample.

The pixel group unit motion compensator 165 may perform filtering on a pixel, in which a component in a vertical direction is an integer, by using an interpolation filter in the vertical direction, and then perform de-scaling. Here, the de-scaling may include bit-shifting to the right by a de-scaling bit number. The de-scaling bit number may be determined based on a scaling bit number of a 1D interpolation filter in the vertical direction, a scaling bit number of a 1D gradient filter in a horizontal direction, and the bit depth of the sample.

When the pixel group unit motion compensator 165 performs only bit-shifting to the right by a de-scaling bit number, a round-off error may be generated. Thus, the pixel group unit motion compensator 165 may perform filtering by using a 1D interpolation filter, add an offset value to a value on which the filtering is performed, and then perform de-scaling on a value to which the offset value is added. Here, the offset value may be 2^(de-scaling bit number−1).

The inter predictor 155 may generate the prediction pixel value of the current block by using the motion compensation value in block units and the motion compensation value in pixel group units with respect to the current block. For example, the inter predictor 155 may generate the prediction pixel value of the current block by adding the motion compensation value in block units and the motion compensation value in pixel group units with respect to the current block. In particular, when the motion prediction mode of the current block is a bi-directional motion prediction mode, the inter predictor 155 may generate the prediction pixel value of the current block by using the motion compensation value in block units and the motion compensation value in pixel group units with respect to the current block.

When the motion prediction mode of the current block is a uni-directional motion prediction mode, the inter predictor 155 may generate the prediction pixel value of the current block by using the motion compensation value in block units with respect to the current block. Here, a uni-direction denotes that one reference picture is used from among the previously encoded pictures. The one reference picture may be a picture displayed before the current picture, but alternatively, may be a picture displayed after the current picture.

The inter predictor 155 may determine the motion prediction mode of the current block, and output information indicating the motion prediction mode of the current block. For example, the inter predictor 155 may determine the motion prediction mode of the current block to be a bi-directional motion prediction mode, and output information indicating the bi-directional motion prediction mode. Here, the bi-directional motion prediction mode denotes a mode in which motion is predicted by using reference blocks in two decoded reference pictures.

The pixel group unit motion compensator 165 may determine a parameter related to pixel group unit motion compensation and perform the pixel group unit motion compensation on the current block based on the parameter related to the pixel group unit motion compensation. Here, the parameter related to the pixel group unit motion compensation may be obtained from a parameter related to the image including the current picture. Since processes of the pixel group unit motion compensator 165 obtaining the parameter related to the pixel group unit motion compensation from the parameter related to the image are the same as processes of the pixel group unit motion compensator 120 obtaining the parameter related to the pixel group unit motion compensation from the parameter related to the image, descriptions thereof are omitted.

Alternatively, the pixel group unit motion compensator 165 may determine the parameter related to the pixel group unit motion compensation while performing the pixel group unit motion compensation, and output the determined parameter related to the pixel group unit motion compensation. The bitstream generator 170 may generate the bitstream including information related to the pixel group unit motion compensation. Since processes of the pixel group unit motion compensator 165 outputting the parameter related to the pixel group unit motion compensation by performing the pixel group unit motion compensation on the current block and the bitstream generator 170 generating the bitstream including the information about the parameter related to the pixel group unit motion compensation are the reverse of processes of the obtainer 105 obtaining the parameter information related to the pixel group unit motion compensation from the bitstream and the pixel group unit motion compensator 120 determining the parameter related to the pixel group unit motion compensation from the obtained parameter information related to the pixel group unit motion compensation and performing the pixel group unit motion compensation on the current block, descriptions thereof are omitted.

The bitstream generator 170 may generate a bitstream including a motion vector indicating the reference block. The bitstream generator 170 may encode the motion vector indicating the reference block, and generate a bitstream including the encoded motion vector. The bitstream generator 170 may encode a differential value of the motion vector indicating the reference block, and generate a bitstream including the encoded differential value of the motion vector. Here, the differential value of the motion vector may denote a difference between the motion vector and a predictor of the motion vector. Here, the differential value of the motion vector may denote a differential value of a motion vector with respect to reference pictures respectively related to prediction directions including an L0 direction and an L1 direction. Here, the differential value of the motion vector with respect to the L0 direction may denote a differential value of a motion vector indicating a reference picture in a reference picture included in an L0 reference picture list, and the differential value of the motion vector with respect to the L1 direction may denote a differential value of a motion vector indicating a reference picture in a reference picture included in an L1 reference picture list.

Also, the bitstream generator 170 may generate the bitstream further including information indicating the motion prediction mode of the current block. The bitstream generator 170 may encode a reference picture index indicating the reference picture of the current block from among previously encoded pictures, and generate a bitstream including the encoded reference picture index. Here, the reference picture index may denote a reference picture index with respect to each of prediction directions including an L0 direction and an L1 direction. Here, the reference picture index with respect to the L0 direction may denote an index indicating a reference picture among pictures included in an L0 reference picture list, and the reference picture index with respect to the L1 direction may denote an index indicating a reference picture among pictures included in an L1 reference picture list.

The video encoding apparatus 150 may include an image encoder (not shown), and the image encoder may include the inter predictor 155 and the bitstream generator 170. The video encoder will be described later with reference to FIG. 1F.

FIG. 1D is a flowchart of a video encoding method according to various embodiments.

Referring to FIG. 1D, in operation S150, the video encoding apparatus 150 may obtain a prediction block of a current block, a first motion vector, a second motion vector, and a parameter related to pixel group unit motion compensation by performing motion compensation and pixel group unit motion compensation on the current block.

In operation S155, the video encoding apparatus 150 may generate a bitstream including information about the first and second motion vectors, and motion prediction mode information indicating that a motion prediction mode of the current block is a bi-directional motion prediction mode. Here, the first motion vector may be a motion vector indicating a first reference block of a first reference picture corresponding to the current block in the current picture from the current block, and the second motion vector may be a motion vector indicating a second reference block of a second reference picture corresponding to the current block in the current picture from the current block.

The parameter related to the pixel group unit motion compensation of the current block may be obtained from a parameter related to an image including the current picture, when the pixel group unit motion compensation is performed on the current block. However, an embodiment is not limited thereto, and the parameter related to the pixel group unit motion compensation of the current block may be determined when the pixel group unit motion compensation is performed, and the information about the parameter related to the determined pixel group unit motion compensation may be included in the bitstream.

The video encoding apparatus 150 may encode a residual block of the current block, the residual signal indicating a difference between a pixel of the prediction block of the current block and an original block of the current block, and generate the bitstream further including the encoded residual signal. The video encoding apparatus 150 may encode information about a prediction mode of the current block and a reference picture index, and generate the bitstream further including the encoded information about the prediction mode and the encoded reference picture index. For example, the video encoding apparatus 150 may encode information indicating that the prediction mode of the current block is an inter prediction mode and a reference picture index indicating at least one picture from among previously decoded pictures, and generate the bitstream further including the encoded information about the prediction mode and the encoded reference picture index.

Figure 1E:
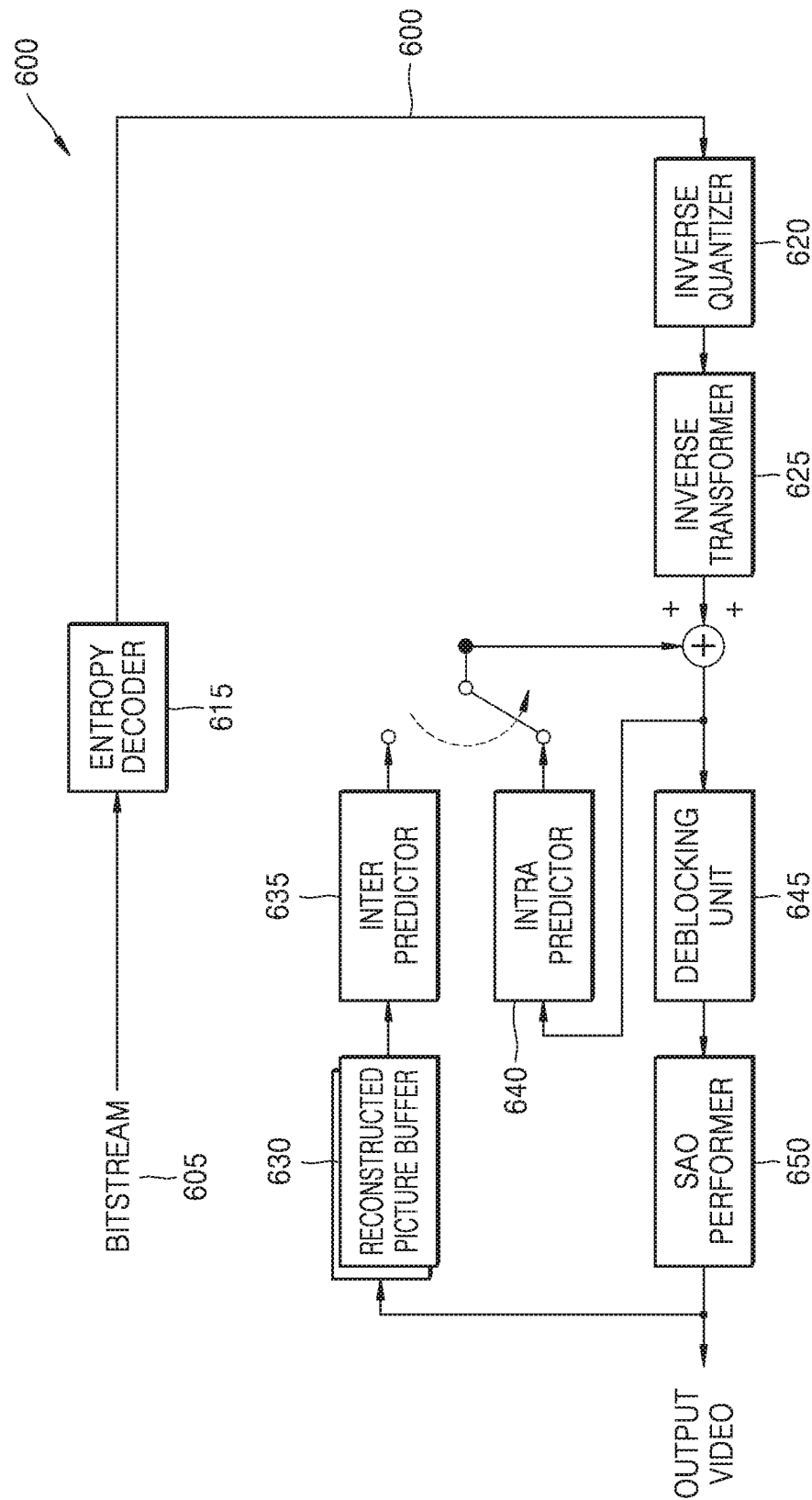
FIG. 1E is a block diagram of an image decoder according to various embodiments.

FIG. 1E is a block diagram of an image decoder 600 according to various embodiments.

The image decoder 600 according to various embodiments performs operations performed by the image decoder (not shown) of the video decoding apparatus 100 to decode image data.

Referring to FIG. 1E, an entropy decoder 615 parses encoded image data that is to be decoded, and encoding information required for decoding, from a bitstream 605. The encoded image data is a quantized transformation coefficient, and an inverse quantizer 620 and an inverse transformer 625 reconstructs residue data from the quantized transformation coefficient.

An intra predictor 640 performs intra prediction per block. An inter predictor 635 performs inter prediction by using a reference image obtained from a reconstructed picture buffer 630, per block. The inter predictor 635 of FIG. 1E may correspond to the inter predictor 110 of FIG. 1A.

Data in a spatial domain with respect to a block of a current image 605 may be reconstructed by adding prediction data and the residue data of each block generated by the intra predictor 640 or the inter predictor 635, and a deblocking unit 645 and an SAO performer 650 may output a filtered reconstructed image by performing loop filtering on the reconstructed data in the spatial domain. Also, reconstructed images stored in the reconstructed picture buffer 630 may be output as a reference image.

In order for a decoder (not shown) of the video decoding apparatus 100 to decode image data, stepwise operations of the image decoder 600 according to various embodiments may be performed per block.

Figure 1F:
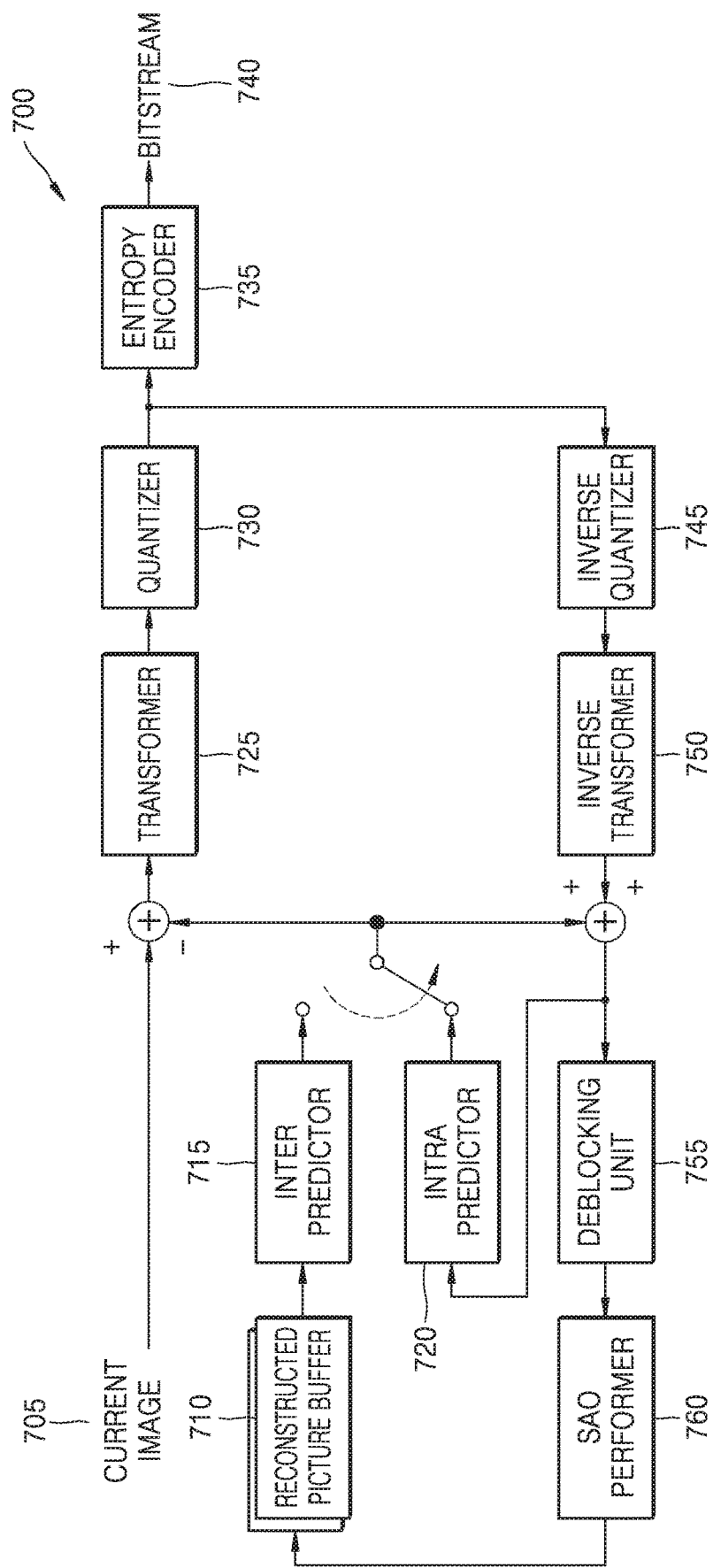
FIG. 1F is a block diagram of an image encoder according to various embodiments.

FIG. 1F is a block diagram of an image encoder according to various embodiments.

An image encoder 700 according to various embodiments performs operations performed by the image encoder (not shown) of the video encoding apparatus 150 to encode image data.

In other words, an intra predictor 720 performs intra prediction per block on a current image 705, and an inter predictor 715 performs inter prediction by using the current image 705 per block and a reference image obtained from a reconstructed picture buffer 710. Here, the inter predictor 715 of FIG. 1E may correspond to the inter predictor 155 of FIG. 1C.

Residue data may be generated by subtracting prediction data regarding each block output from the intra predictor 720 or the inter predictor 715 from data regarding an encoded block of the current image 705, and a transformer 725 and a quantizer 730 may output a transformation coefficient quantized per block by preforming transformation and quantization on the residue data. An inverse quantizer 745 and an inverse transformer 750 may reconstruct residue data in a spatial domain by performing inverse quantization and inverse transformation on the quantized transformation coefficient. The reconstructed residue data in the spatial domain may be added to the prediction data regarding each block output from the intra predictor 720 or the inter predictor 715 to be reconstructed as data in spatial domain regarding a block of the current image 705. A deblocking unit 755 and an SAO performer 760 generate a filtered reconstructed image by performing in-loop filtering on the reconstructed data in the spatial domain. The generated reconstructed image is stored in the reconstructed picture buffer 710. Reconstructed images stored in the reconstructed picture buffer 710 may be used as reference images for inter prediction of another image. An entropy encoder 735 may entropy-encode the quantized transformation coefficient, and the entropy-encoded coefficient may be output as a bitstream 740.

In order for the image encoder 700 according to various embodiments to be applied to the video encoding apparatus 150, stepwise operations of the image encoder 700 according to various embodiments may be performed per block.

Figure 2:
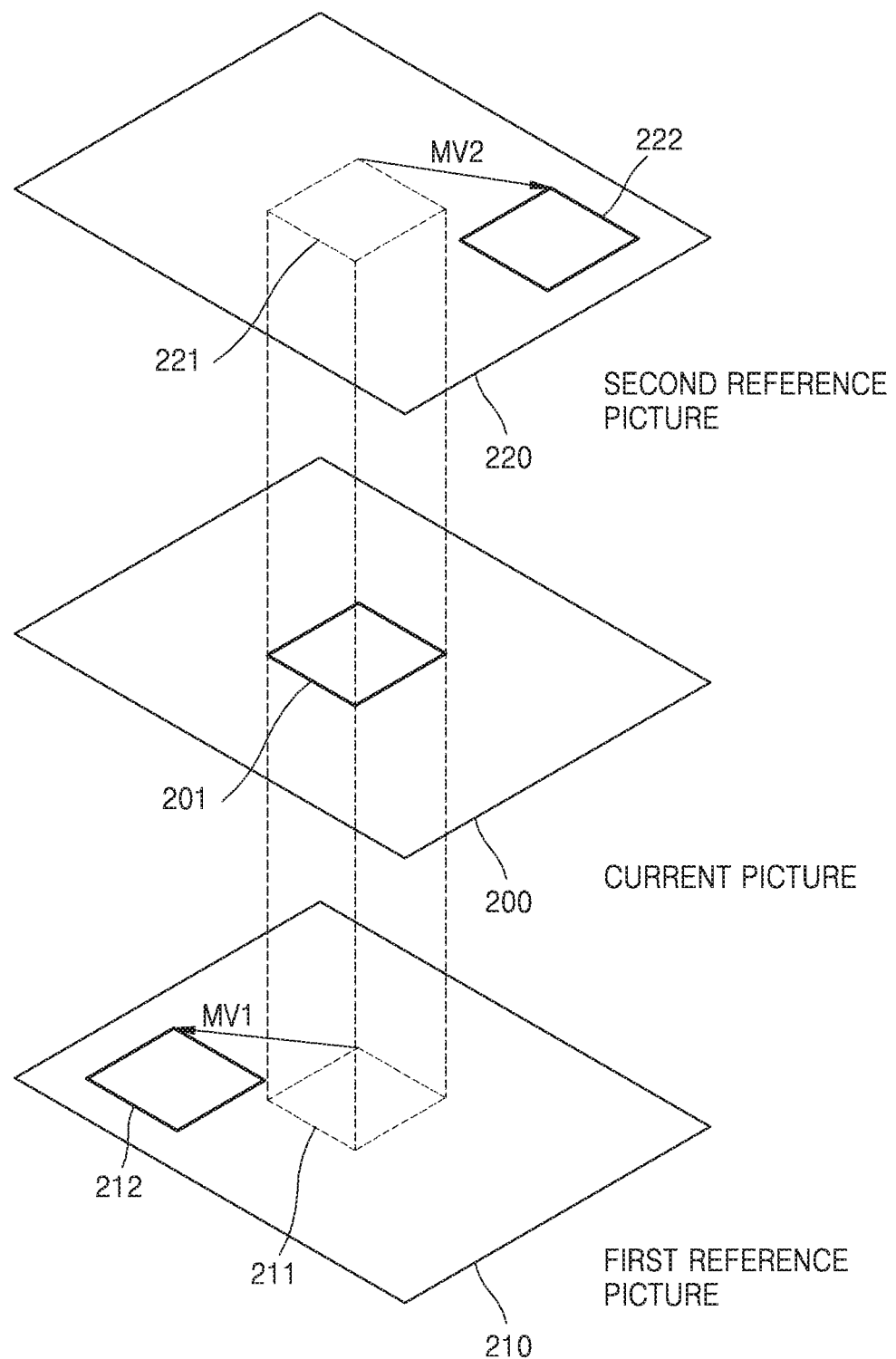
FIG. 2 is a reference diagram for describing block-based bi-directional motion prediction and compensation processes, according to an embodiment.

FIG. 2 is a reference diagram for describing block-based bi-directional motion prediction and compensation processes, according to an embodiment.

Referring to FIG. 2, the video encoding apparatus 150 performs bi-directional motion prediction, in which a region most similar to a current block 201 of a current picture 200 to be encoded is searched for in a first reference picture 210 and a second reference picture 220. Here, the first reference picture 210 may be a picture before the current picture 200, and the second reference picture 220 may be a picture after the current picture 200. As a result of the bi-directional motion prediction, the video encoding apparatus 150 determines a first corresponding region 212 most similar to the current block 201 from the first reference picture 210, and a second corresponding region 222 most similar to the current block 201 from the second reference picture 220. Here, the first corresponding region 212 and the second corresponding region 222 may be reference regions of the current block 201.

Also, the video encoding apparatus 150 may determine a first motion vector MV1 based on a position difference between the first corresponding region 212 and a block 211 of the first reference picture 210 at the same position as the current block 201, and determine a second motion vector MV2 based on a position difference between the second corresponding region 222 and a block 221 of the second reference picture 220 at the same position as the current block 201.

The video encoding apparatus 150 performs block unit bi-directional motion compensation on the current block 201 by using the first motion vector MV1 and the second motion vector MV2.

For example, when a pixel value positioned at (i, j) of the first reference picture 210 is P0(i,j), a pixel value positioned at (i, j) of the second reference picture 220 is P1(i,j), MV1=(MVx1, MVy1), and MV2=(MVx2, MVy2), wherein i and j are each an integer, a block unit bi-directional motion compensation value P_BiPredBlock(i,j) of a pixel at a (i, j) position of the current block 201 may be calculated according to an equation: P_BiPredBlock(i,j)={P0(i+MVx1, j+MVy1)+P1(i+MVx2, j+MVy2)}/2. As such, the video encoding apparatus 150 may generate the motion compensation value in block units by performing motion compensation on the current block 201 in block unit by using an average value or weighted sum of pixels in the first and second corresponding regions 212 and 222 indicated by the first and second motion vectors MV1 and MV2.

Figure 3A:
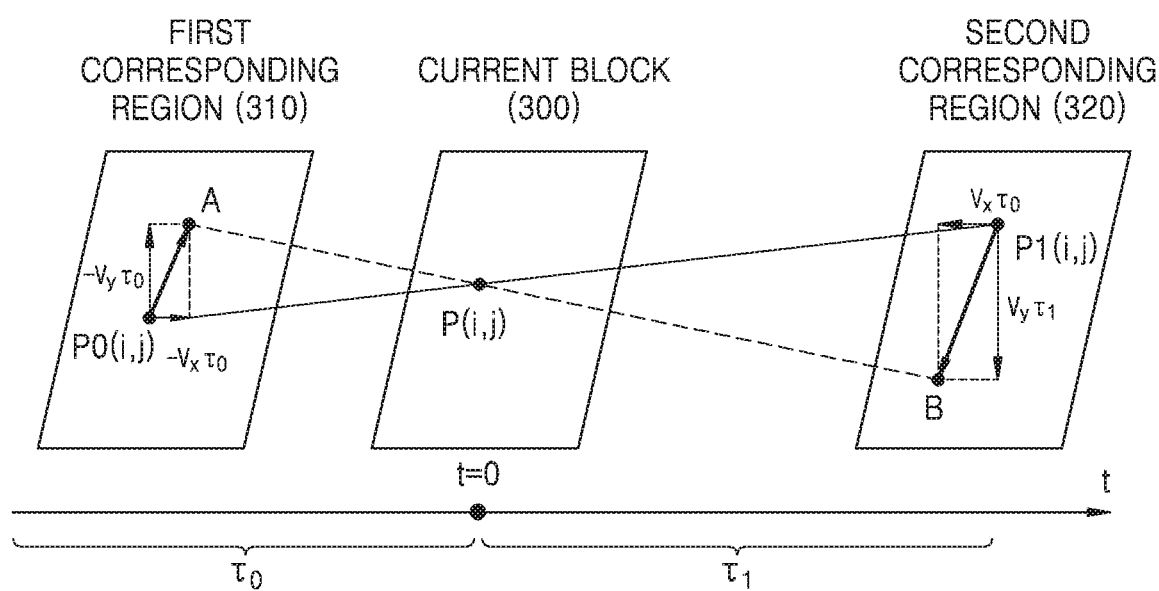
FIGS. 3A through 3C are reference diagrams for describing processes of performing pixel unit motion compensation, according to embodiments.
Figure 3B:
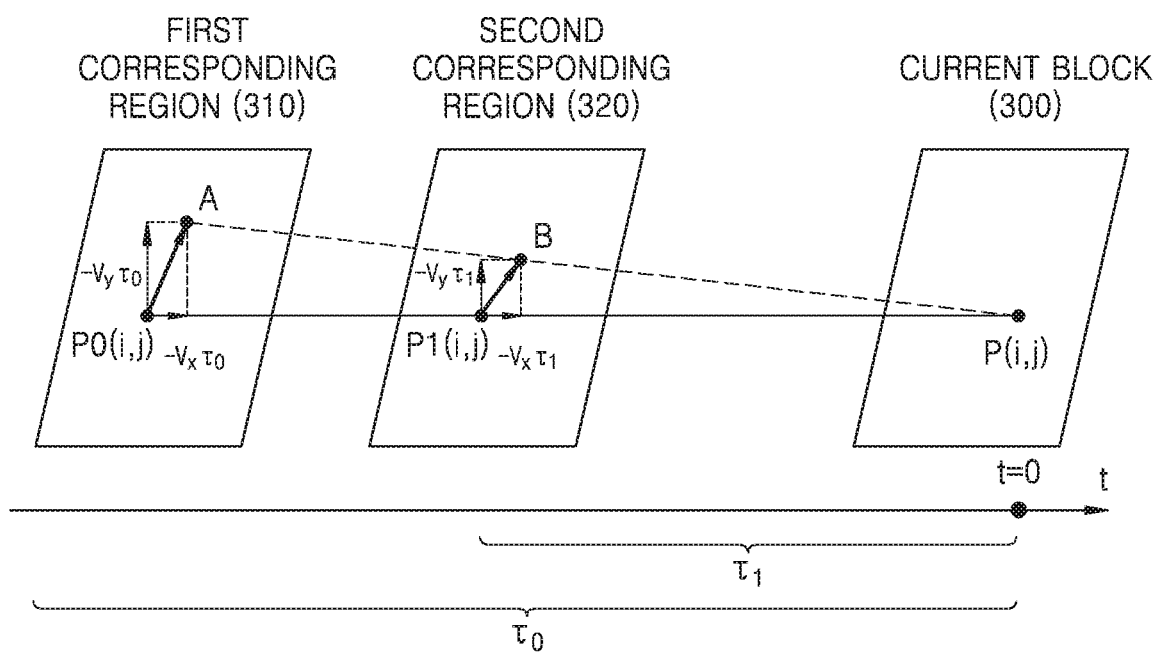
Figure 3C:
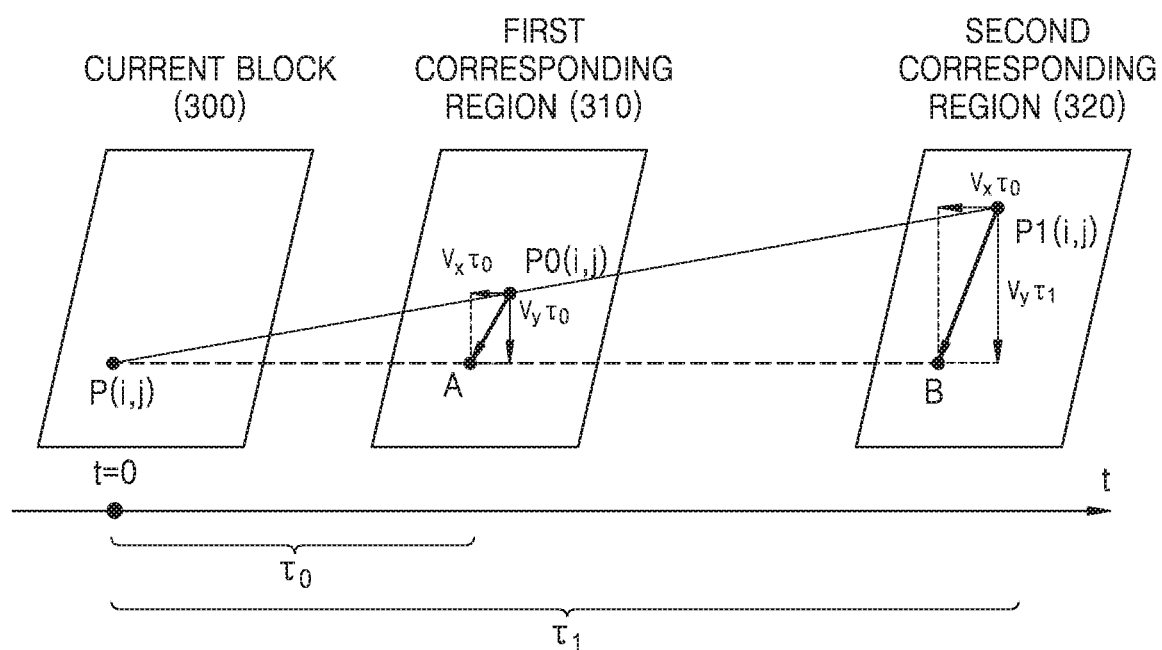

FIGS. 3A through 3C are reference diagrams for describing processes of performing pixel unit motion compensation, according to embodiments.

In FIG. 3A, a first corresponding region 310 and a second corresponding region 320 respectively correspond to the first corresponding region 212 and the second corresponding region 222 of FIG. 2, and may have shifted to overlap a current block 300 by using bi-directional motion vectors MV1 and MV2.

Also, P(i,j) denotes a pixel of the current block 300 at a (i, j) position that is bi-directional predicted, P0(i,j) denotes a first reference pixel value of a first reference picture corresponding to the pixel P(i,j) of the current block 300 that is bi-directional predicted, and P1(i,j) denotes a second reference pixel value of a second reference picture corresponding to the pixel P(i,j) of the current block 300 that is bi-directional predicted, wherein i and j each denote an integer.

In other words, the first reference pixel value P0(i,j) is a pixel value of a pixel corresponding to the pixel P(i,j) of the current block 300 determined by the bi-directional motion vector MV1 indicating the first reference picture, and the second reference pixel value P1(i,j) is a pixel value of a pixel corresponding to the pixel P(i,j) of the current block 300 determined by the bi-directional motion vector MV2 indicating the second reference picture.

Also, $$\frac{\partial P0(i,\ j)}{\partial x}$$

denotes a gradient value of a first reference pixel in a horizontal direction, $$\frac{\partial P0(i,\ j)}{\partial y}$$

denotes a gradient value of the first reference pixel in a vertical direction, $$\frac{\partial P1(i,\ j)}{\partial x}$$

denotes a gradient value of a second reference pixel in the horizontal direction, and $$\frac{\partial P1(i,\ j)}{\partial y}$$

denotes a gradient value of the second reference pixel in the vertical direction. Also, $\tau_0$ denotes a temporal distance between a current picture to which the current block 300 belongs and the first reference picture to which the first corresponding region 310 belongs, and $\tau_1$ denotes a temporal distance between the current picture and the second reference picture to which the second corresponding region 320 belongs. Here, a temporal distance between pictures may denote a difference of picture order count (POC) of the pictures.

When there is uniform small motion in a video sequence, a pixel in the first corresponding region 310 of the first reference picture, which is most similar to the pixel P(i,j) on which bi-directional motion compensation is performed in pixel group units, is not the first reference pixel P0(i,j), but is a first displacement reference pixel PA, in which the first reference pixel P0(i,j) is moved by a certain displacement vector. As described above, since there is uniform motion in the video sequence, a pixel in the second corresponding region 320 of the second reference picture, which is most similar to the pixel P(i,j), may be a second displacement reference pixel PB, in which the second reference pixel P1(i,j) is moved by a certain displacement vector. A displacement vector may include a displacement vector Vx in an x-axis direction and a displacement vector Vy in a y-axis direction. Accordingly, the pixel group unit motion compensator 165 calculates the displacement vector Vx in the x-axis direction and the displacement vector Vy in the y-axis direction included in the displacement vector, and perform motion compensation in pixel group units by using the displacement vector.

An optical flow denotes a pattern of apparent motion on an object or surface, which is induced by relative motion between a scene and an observer (eyes or a video image obtaining apparatus like a camera). In a video sequence, an optical flow may be represented by calculating motion between frames obtained at arbitrary times t and t+Δt. A pixel value positioned at (x, y) in the frame of the time t may be I(x,y,t). In other words, I(x,y,t) may be a value changing temporally and spatially. I(x,y,t) may be differentiated according to Equation1 with respect to the time t.

$$\frac{dI}{dt} = \frac{\partial I}{\partial x}\frac{dx}{dt} + \frac{\partial I}{\partial y}\frac{dy}{dt} + \frac{\partial I}{\partial t} \qquad [\text{Equation 1}]$$

When a pixel value changes according to motion but does not change according to time with respect to small motion in a block, dI/dt is 0. Also, when motion of a pixel value according to time is uniform, dx/dt may denote the displacement vector Vx of the pixel value I(x,y,t) in the x-axis direction and dy/dt may denote the displacement vector Vy of the pixel value I(x,y,t) in the y-axis direction, and accordingly, Equation 1 may be expressed as Equation 2.

$$\frac{\partial I}{\partial t} + Vx \cdot \frac{\partial I}{\partial x} + Vy \cdot \frac{\partial I}{\partial y} = 0 \qquad [\text{Equation 2}]$$

Here, sizes of the displacement vector Vx in the x-axis direction and the displacement vector Vy in the y-axis direction may have a value smaller than pixel accuracy used in bi-directional motion prediction. For example, when pixel accuracy is ¼ or 1/16 during bi-directional motion prediction, the sizes of the displacement vectors Vx and Vy may have a value smaller than ¼ or 1/16.

The pixel group unit motion compensator 165 calculates the displacement vector Vx in the x-axis direction and the displacement vector Vy in the y-axis direction according to Equation 2, and performs motion compensation in pixel group units by using the displacement vectors Vx and Vy. In Equation 2, since the pixel value I(x,y,t) is a value of an original signal, high overheads may be induced during encoding when the value of the original signal is used. Accordingly, the pixel group unit motion compensator 165 may calculate the displacement vectors Vx and Vy according to Equation 2 by using pixels of the first and second reference pictures, which are determined as results of performing bi-directional motion prediction in block units. In other words, the pixel group unit motion compensator 165 determines the displacement vector Vx in the x-axis direction and the displacement vector Vy in the y-axis direction, in which Δ is minimum in a window Ωij having a certain size and including neighboring pixels around the pixel P(i,j) on which bi-directional motion compensation is performed. Δ may be 0, but the displacement vector Vx in the x-axis direction and the displacement vector Vy in the y-axis direction, which satisfy Δ=0 with respect to all pixels in the window Ωij, may not exist, and thus the displacement vector Vx in the x-axis direction and the displacement vector Vy in the y-axis direction, in which Δ is minimum, are determined.

Processes of obtaining the displacement vectors Vx and Vy will be described in detail with reference to FIG. 8A.

In order to determine a prediction pixel value of a current pixel, a function P(t) with respect to t may be determined according to Equation 3.

$$P(t) = a3*t^3 + a2*t^2 + a1*t + a0 \quad \text{[Equation 3]}$$

Here, a picture when t=0 is a current picture in which a current block is included. Accordingly, the prediction pixel value of the current pixel included in the current block may be defined as a value of P(t) when t is 0.

When the temporal distance between the current picture and the first reference picture (the first reference picture is temporally before the current picture) is $\tau_0$ and the temporal distance between the current picture and the second reference picture (the second reference picture is temporally after the current picture) is $\tau_1$, a reference pixel value in the first reference picture is equal to $P(-\tau_0)$, and a reference pixel value in the second reference picture is equal to $P(\tau_1)$. Hereinafter, for convenience of calculation, it is assumed that $\tau_0$ and $\tau_1$ are both equal to $\tau$.

Coefficients of each degree of P(t) may be determined according to Equation 4. Here, P0(i,j) may denote a pixel value at a (i,j) position of the first reference picture, and P1(i,j) may denote a pixel value at a (i,j) of the second reference picture.

$$a0 = \frac{1}{2}\left(P0(i,j) + P1(i,j) + \frac{\tau}{2}\left(\frac{\partial P0(i,j)}{\partial t} - \frac{\partial P1(i,j)}{\partial t}\right)\right) \quad \text{[Equation 4]}$$

$$a1 = \frac{1}{4}\left(\frac{3}{\tau}(P0(i,j) - P1(i,j)) - \frac{\partial P0(i,j)}{\partial t} - \frac{\partial P1(i,j)}{\partial t}\right)$$

$$a2 = \frac{1}{4\tau}\left(\frac{\partial P0(i,j)}{\partial t} - \frac{\partial P1(i,j)}{\partial t}\right)$$

$$a3 = \frac{1}{4\tau^2}\left(\frac{1}{\tau}(P0(i,j) - P1(i,j)) + \frac{\partial P0(i,j)}{\partial t} + \frac{\partial P1(i,j)}{\partial t}\right)$$

Accordingly, a prediction pixel value P(0) of the current pixel in the current block may be determined according to Equation 5.

$$P(0) = a0 = \quad \text{[Equation 5]}$$
$$a0 = \frac{1}{2}\left(P0(i,j) + P1(i,j) + \frac{\tau}{2}\left(\frac{\partial P0(i,j)}{\partial t} - \frac{\partial P1(i,j)}{\partial t}\right)\right)$$

Equation 5 may be expressed as Equation 6 considering Equation 2.

$$P(0) = \quad \text{[Equation 6]}$$
$$a0 = \frac{1}{2}\left(P0(i,j) + P1(i,j) + \frac{\tau V_x}{2}\left(\frac{\partial P1(i,j)}{\partial x} - \frac{\partial P0(i,j)}{\partial x}\right) + \frac{\tau V_y}{2}\left(\frac{\partial P1(i,j)}{\partial y} - \frac{\partial P0(i,j)}{\partial y}\right)\right)$$

Accordingly, the prediction pixel value of the current pixel may be determined by using the displacement vector Vx, the displacement vector Vy, gradient values of the first reference pixel in the horizontal and vertical directions, and gradient values of the second reference pixel in the horizontal and vertical directions. Here, a portion (P0(i,j)+P1(i,j))/2) not related to the displacement vectors Vx and Vy may be a motion compensation value in block group units, and a portion related to the displacement vectors Vx and Vy may be a motion compensation value in pixel units. As a result, the prediction pixel value of the current pixel may be determined by adding the motion compensation value in block units and the motion compensation value in pixel group units.

Hereinabove, processes of determining the prediction pixel value of the current pixel when the temporal distance between the first reference picture and the current picture and the temporal distance between the second reference picture and the current picture are both $\tau$, and thus the same are described for convenience of description, but the temporal distance between the first reference picture and the current picture may be $\tau_0$ and the temporal distance between the second reference picture and the current picture may be $\tau_1$. Here, the prediction pixel value P(0) of the current pixel may be determined according to Equation 7.

$$P(0) = P0(i,j) + P1(i,j) + \frac{1}{2}\left(\tau_0 \frac{\partial P0(i,j)}{\partial t} - \tau_1 \frac{\partial P1(i,j)}{\partial t}\right) \quad \text{[Equation 7]}$$

Considering Equation 2, Equation 7 may be expressed as Equation 8.

$$P(0) = P0(i,j) + P1(i,j) + \frac{V_x}{2}\left(\tau_1 \frac{\partial P1(i,j)}{\partial x} - \tau_0 \frac{\partial P0(i,j)}{\partial x}\right) + \quad \text{[Equation 8]}$$
$$\frac{V_y}{2}\left(\tau_1 \frac{\partial P1(i,j)}{\partial y} - \tau_0 \frac{\partial P0(i,j)}{\partial y}\right)$$

Hereinabove, the first reference picture is displayed temporally after the current picture and the second reference picture is displayed temporally before the current picture, but alternatively, the first and second reference pictures may both be displayed temporally before the current picture, or after the current picture.

For example, as shown in FIG. 3B, the first reference picture including the first corresponding region 310 and the second reference picture including the second corresponding region 320 may both be displayed temporally before the current picture including the current block 300.

In this case, the prediction pixel value P(0) of the current pixel may be determined according to Equation 9, in which $\tau_1$ indicating the temporal distance between the second reference picture and the current picture in Equation 8 indicated with reference to FIG. 3A is replaced by $-\tau_1$.

$$P(0) = \quad \text{[Equation 9]}$$
$$P0(i,j) + P1(i,j) + \frac{V_x}{2}\left(-\tau_1 \frac{\partial P1(i,j)}{\partial x} - \tau_0 \frac{\partial P0(i,j)}{\partial x}\right) + \frac{V_y}{2}\left(-\tau_1 \frac{\partial P1(i,j)}{\partial y} - \tau_0 \frac{\partial P0(i,j)}{\partial y}\right)$$

For example, as shown in FIG. 3C, the first reference picture including the first corresponding region 310 and the second reference picture including the second corresponding region 320 may both be displayed temporally after the current picture including the current block 300.

In this case, the prediction pixel value P(0) of the current pixel may be determined according to Equation 10, in which $\tau_0$ indicating the temporal distance between the first reference picture and the current picture in Equation 8 indicated with reference to FIG. 3A is replaced by $-\tau_0$.

$$P(0) = \qquad \text{[Equation 10]}$$
$$P0(i,\ j) + P1(i,\ j) + \frac{Vx}{2}\left(\tau_1 \frac{\partial P1(i,\ j)}{\partial x} + \tau_0 \frac{\partial P0(i,\ j)}{\partial x}\right) +$$
$$\frac{Vy}{2}\left(\tau_1 \frac{\partial P1(i,\ j)}{\partial y} + \tau_0 \frac{\partial P0(i,\ j)}{\partial y}\right)$$

However, when the first and second reference pictures are both displayed temporally before the current picture or after the current picture as shown in FIGS. 3B and 3C, pixel group unit motion compensation may be performed when the first reference picture and the second reference picture are not the same reference picture. Also, in this case, the pixel group unit motion compensation may be performed only when the bi-directional motion vectors MV1 and MV2 both have a non-zero component. Also, in this case, the pixel group unit motion compensation may be performed only when a ratio of the motion vectors MV1 and MV2 is the same as a ratio of the temporal distance between the first reference picture and the current picture and the temporal distance between the second reference picture and the current picture. For example, the pixel group unit motion compensation may be performed when a ratio of an x component of the motion vector MV1 and an x component of the motion vector MV2 is the same as a ratio of a y component of the motion vector MV1 and a y component of the motion vector MV2, and is the same as a ratio of the temporal distance $\tau_0$ between the first reference picture and the current picture and the temporal distance $\tau_1$ between the second reference picture and the current picture.

Figure 4:
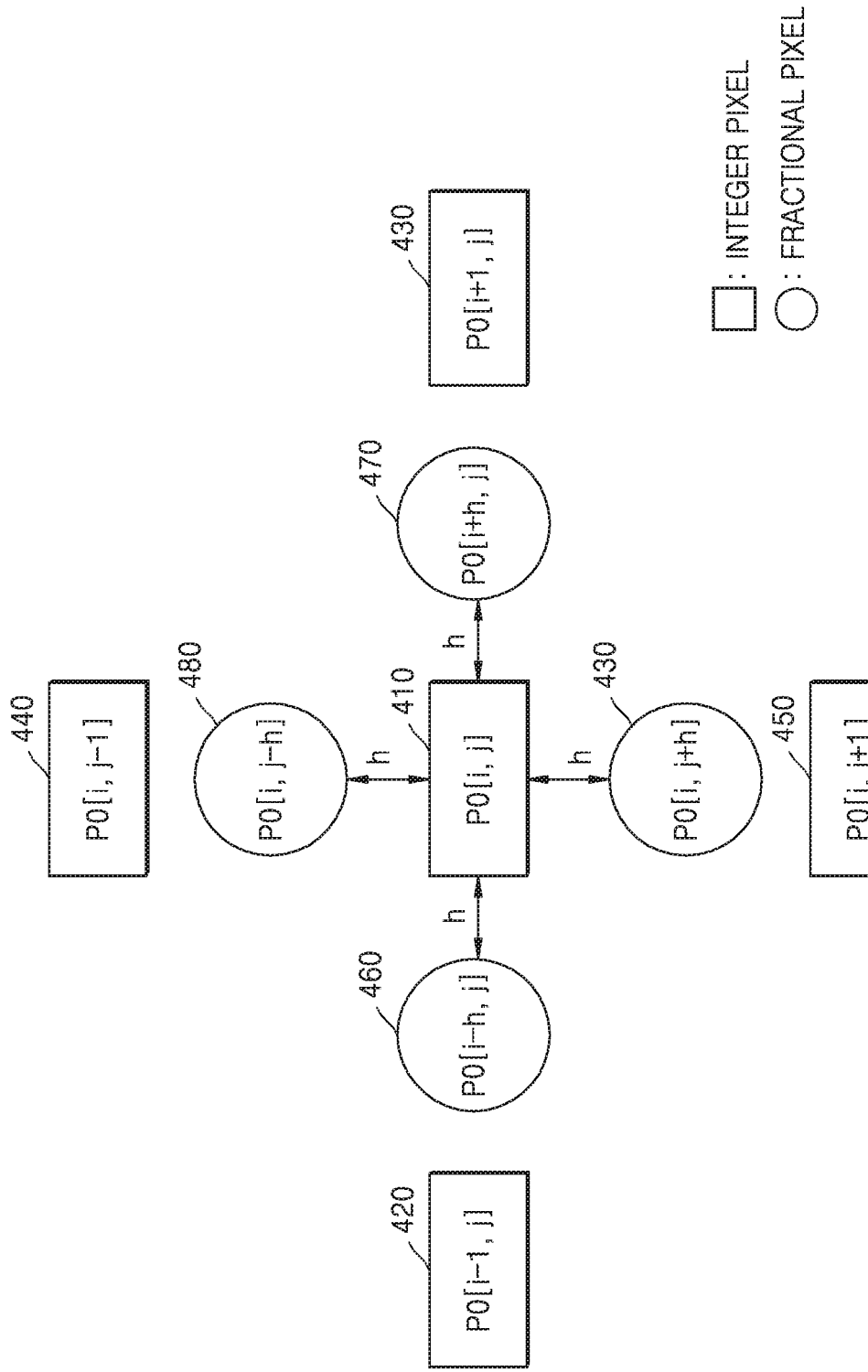
FIG. 4 is a reference diagram for describing processes of calculating gradient values in horizontal and vertical directions, according to an embodiment.

FIG. 4 is a reference diagram for describing processes of calculating gradient values in horizontal and vertical directions, according to an embodiment.

Referring to FIG. 4, a gradient value $$\frac{\partial P0(i,\ j)}{\partial x}$$

of a first reference pixel P0(i,j) 410 of a first reference picture in a horizontal direction and a gradient value $$\frac{\partial P0(i,\ j)}{\partial y}$$

of the first reference pixel P0(i,j) 410 in a vertical direction may be calculated by obtaining a variation of a pixel value at a neighboring fractional pixel position adjacent to the first reference pixel P0(i,j) 410 in the horizontal direction and a variation of a pixel value at a neighboring fractional pixel position adjacent to the first reference pixel P0(i,j) 410 in the vertical direction. In other words, according to Equation 11, the gradient value $$\frac{\partial P0(i,\ j)}{\partial x}$$

in the horizontal direction may be calculated by calculating a variation of pixel values of a fractional pixel P0(i−h,j) 460 and a fractional pixel P0(i+h,j) 470 away from P0(i,j) by h in the horizontal direction, wherein h is a fraction smaller than 1, and the gradient value $$\frac{\partial P0(i,\ j)}{\partial y}$$

in the vertical direction may be calculated by calculating a variation of pixel values of a fractional pixel P0(i,j−h) 480 and a fractional pixel P0(i,j+h) 490 away from P0(i,j) by h in the vertical direction.

$$\frac{\partial P0(i,\ j)}{\partial x} = \frac{P0(i+h,\ j) - P0(i-h,\ j)}{2h} \qquad \text{[Equation 11]}$$
$$\frac{\partial P0(i,\ j)}{\partial y} = \frac{P0(i,\ j+h) - P0(i,\ j-h)}{2h}$$

Pixel values of the fractional pixels P0(i−h,j) 460, P0(i+h,j) 470, P0(i,j−h) 480, and P0(i,j+h) 490 may be calculated by using general interpolation. Also, gradient values of a second reference pixel of a second reference picture in horizontal and vertical directions may also be calculated similarly to Equation 11.

According to an embodiment, instead of calculating a gradient value by calculating a variation of pixel values at fractional pixel positions as in Equation 11, a gradient value in a reference pixel may be calculated by using a certain filter. A filter coefficient of the certain filter may be determined based on a coefficient of an interpolation filter used to obtain a pixel value at a fractional pixel position considering linearity of a filter.

Figure 5:
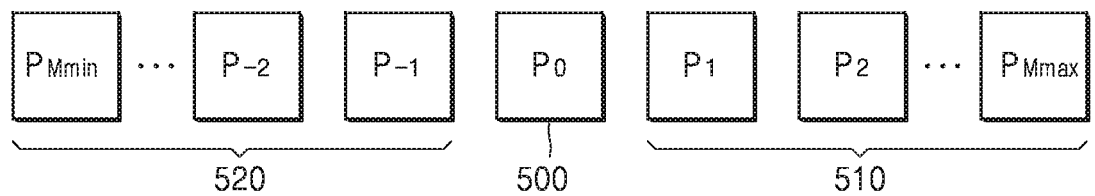
FIG. 5 is a reference diagram for describing processes of calculating gradient values in horizontal and vertical directions, according to another embodiment.

FIG. 5 is a reference diagram for describing processes of calculating gradient values in horizontal and vertical directions, according to another embodiment.

According to another embodiment, a gradient value may be determined by applying a certain filter to pixels of a reference picture. Referring to FIG. 5, the video decoding apparatus 100 may calculate a gradient value of a reference pixel P0 500 in a horizontal direction by applying a certain filter to $M_{Max}$ left pixels 520 and $|M_{Min}|$ right pixels 510 based on the reference pixel P0 500 of which a current horizontal gradient value is to be obtained. A filter coefficient used here may be determined according to a value a indicating an interpolation position (fractional pel position) between $M_{Max}$ and $M_{Min}$ integer pixels used to determine a window size, as shown in FIGS. 7A through 7D. For example, referring to FIG. 7A, when $M_{Min}$ and $M_{Max}$ for determining a window size are respectively −2 and 3, and are away from the reference pixel P0 500 by ¼, i.e., α=¼, coefficient filters {4, −17. −36. 60, −15, 4} in a second row of FIG. 7A are applied to neighboring pixels $P_{−2}$, $P_1$, $P_0$, $P_1$, $P_2$, and $P_3$.

In this case, a gradient value $$\frac{\partial P0(i,\ j)}{\partial x}$$

of the reference pixel P0 500 in the horizontal direction may be calculated via a weighted sum using a filter coefficient and a neighboring pixel, such as an equation;

$$\frac{\partial P0(i, j)}{\partial x}$$

$4*P_{-2}-17*P_1+-36*P_0+60*P_1-15*P_2+4*P_3+32 >> 6$. Similarly, a gradient value in a vertical direction may also be calculated by applying the filter coefficients shown in FIGS. 7A through 7E to neighboring pixels according to an interpolation position, and $M_{Min}$ and $M_{Max}$ for determining a window size.

Figure 6A:
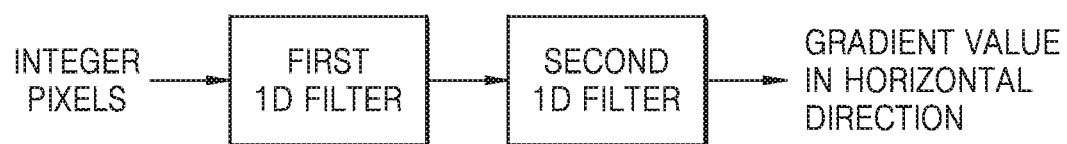
FIGS. 6A and 6B are diagrams for describing processes of determining gradient values in horizontal and vertical directions by using one-dimensional (1D) filters, according to embodiments.
Figure 6B:

FIGS. 6A and 6B are diagrams for describing processes of determining gradient values in horizontal and vertical directions by using 1 D filters, according to embodiments.

Referring to FIG. 6A, filtering may be performed by using a plurality of 1D filters with respect to an integer pixel so as to determine a gradient value of a reference pixel in a horizontal direction in a reference picture. Motion compensation in pixel group units is additional motion compensation performed after motion compensation in block units. Accordingly, a reference position of reference blocks of a current block indicated by a motion vector during motion compensation in block units may be a fractional pixel position, and motion compensation in pixel group units may be performed with respect to reference pixels in a reference block at a fractional pixel position. Accordingly, filtering may be performed considering that a gradient value of a pixel at a fractional pixel position is determined.

Referring to FIG. 6A, first, the video decoding apparatus 100 may perform filtering on pixels positioned in a horizontal or vertical direction from a neighboring integer pixel of a reference pixel in a reference picture, by using a first 1D filter. Similarly, the video decoding apparatus 100 may perform filtering on adjacent integer pixels in a row or column different from the reference pixel, by using the first 1D filter. The video decoding apparatus 100 may generate a gradient value of the reference pixel in the horizontal direction by performing filtering on values generated via the filtering, by using a second 1D filter.

For example, when a position of a reference pixel is a position of a fractional pixel at $(x+\alpha, y+\beta)$, wherein x and y are each an integer and $\alpha$ and $\beta$ are each a fraction, filtering may be performed according to Equation 12 by using a 1D vertical interpolation filter with respect to integer pixels (x,y), (x−1,y), (x+1, y), through $(x+M_{Min},y)$ and $(x+M_{Max},y)$ in a horizontal direction, wherein $M_{Min}$ and $M_{Mmax}$ are each an integer.

$$\text{Temp } [i, j + \beta] = \left( \sum_{j'=j+M_{min}}^{j'=j+M_{max}} fracFilter_\beta[j']I[i, j'] + offset_1 \right) \gg shift_1 \quad [\text{Equation 12}]$$

Here, $fracFilter_\beta$ may denote an interpolation filter for determining a pixel value at a fractional pixel position β in a vertical direction, and $fracFilter_\beta[j']$ may denote a coefficient of an interpolation filter applied to a pixel at a (i,j') position. I[i,j'] may denote a pixel value at the (i,j') position.

In other words, the first 1D filter may be an interpolation filter for determining a fractional pixel value in a vertical direction. $offset_1$ may denote an offset for preventing a round-off error, and $shift_1$ may denote a de-scaling bit number. $Temp[i,j+\beta]$ may denote pixel value at a fractional pixel position $(i,j+\beta)$. $Temp[i',j+\beta]$ may also be determined according to Equation 12 by replacing i by i', wherein i' is an integer from $i+M_{min}$ to, $i+M_{max}$ excluding i.

Then, the video decoding apparatus 100 may perform filtering on a pixel value at a fractional pixel position $(i,j+\beta)$ and a pixel value at a fractional pixel position $(i',j+\beta)$ by using a second 1D filter.

$$\frac{\partial I}{\partial x}[i+\alpha, j+\beta] = \quad [\text{Equation 13}]$$

$$\left( \sum_{i'=i+M_{min}}^{i'=i+M_{max}} gradFilter_\alpha[i']I[i', j+\beta] + offset_2 \right) \gg shift_2$$

Here, $gradFilter_\alpha$ may be a gradient filter for determining a gradient value at a fractional pixel position a in a horizontal direction. $gradFilter_\alpha[i']$ may denote a coefficient of an interpolation filter applied to a pixel at a $(i',j+\beta)$ position. In other words, the second 1D filter may be a gradient filter for determining a gradient value in a horizontal direction. $offset_2$ may denote an offset for preventing a round-off error, and $shift_2$ may denote a de-scaling bit number.

In other words, according to Equation 13, the video decoding apparatus 100 may determine a gradient value $$\frac{\partial I}{\partial x}[i+\alpha, j+\beta]$$

in a horizontal direction at $(i+a,j+\beta)$ by performing filtering on a pixel value $(Temp[i,j+\beta])$ at a pixel position $(i, j+\beta)$ and a pixel value $(Temp[i',j+\beta])$ positioned in a vertical direction from the pixel position $(i, j+\beta)$, by using the gradient filter $gradFilter_\alpha$.

Hereinabove, a gradient value in a horizontal direction is determined by first applying an interpolation filter and then applying a gradient filter, but alternatively, the gradient value in the horizontal direction may be determined by first applying the gradient filter and then applying the interpolation filter. Hereinafter, an embodiment of determining a gradient value in a horizontal direction by applying a gradient filter and then an interpolation filter will be described.

For example, when a position of a reference pixel is a position of a fractional pixel at $(x+\alpha, y+\beta)$, wherein x and y are each an integer and $\alpha$ and $\beta$ are each a fraction, filtering may be performed according to Equation 14 by using the first 1D filter, with respect to integer pixels (x,y), (x−1,y), (x+1, y), through $(x+M_{Min},y)$ and $(x+M_{Max},y)$ in a horizontal direction, wherein $M_{Min}$ and $M_{Mmax}$ are each an integer.

$$\text{Temp } [i+\alpha, j] = \quad [\text{Equation 14}]$$

$$\left( \sum_{i'=i+M_{min}}^{i'=i+M_{max}} gradFilter_\alpha[i']I[i', j] + offset_3 \right) \gg shift_3$$

Here, $gradFilter_\alpha$ may denote a gradient filter for determining a gradient value at a fractional pixel position α in a horizontal direction, and $gradFilter_\alpha[i']$ may denote a coefficient of a gradient filter applied to a pixel at a (i',j) position. I[i',j] may denote a pixel value at the (i',j) position.

In other words, the first 1D filter may be an interpolation filter for determining a gradient value of a pixel in a horizontal direction, wherein a horizontal component of a pixel position is a fractional position. offset$_3$ may denote an offset for preventing a round-off error, and shift$_3$ may denote a de-scaling bit number. Temp[i+α,j] may denote a gradient value at a pixel position (i+α,j) in the horizontal direction. Temp[i+α,j'] may also be determined according to Equation 14 by replacing j by j', wherein j' is an integer from j+M$_{min}$ to, j+M$_{max}$ excluding j.

Then, the video decoding apparatus 100 may perform filtering on a gradient value at a pixel position (i+α,j) in the horizontal direction and a gradient value at a pixel position (i+α,j') in the horizontal direction by using the second 1D filter, according to Equation 15.

$$\frac{\partial I}{\partial x}[i+\alpha, j+\beta] = \qquad\qquad\text{[Equation 15]}$$

$$\left(\sum_{j'=j+M_{min}}^{j'=j+M_{max}} fracFilter_\beta[j'] \text{ Temp } [i+\alpha, j'] + offset_4 \right) \gg shift_4$$

Here, fracFilter$_\beta$ may be an interpolation filter for determining a pixel value at a fractional pixel position β in a vertical direction. fracFilter$_\beta$[j'] may denote a coefficient of an interpolation filter applied to a pixel at a (i+3, j') position. In other words, the second 1D filter may be an interpolation filter for determining a pixel value at a fractional pixel position β in a vertical direction. offset$_4$ may denote an offset for preventing a round-off error, and shift$_4$ may denote a de-scaling bit number.

In other words, according to Equation 15, the video decoding apparatus 100 may determine a gradient value $$\frac{\partial I}{\partial x}[i+\alpha, j+\beta]$$

in a horizontal direction at (i+α,j+β) by performing filtering on a gradient value (Temp[i+α,j]) at a pixel position (i+α, j) in a horizontal direction and a gradient value (Temp[i+α,j']) of pixels in a horizontal direction positioned in a vertical direction from the pixel position (i+α, j), by using the gradient filter fracFilter$_\beta$.

Referring to FIG. 6B, filtering may be performed by using a plurality of 1D filters with respect to an integer pixel so as to determine a gradient value of a reference pixel in a vertical direction in a reference picture. Motion compensation in pixel units is additional motion compensation performed after motion compensation in block units. Accordingly, a reference position of reference blocks of a current block indicated by a motion vector during motion compensation in block units may be a fractional pixel position, and motion compensation in pixel units may be performed with respect to reference pixels in a reference block at a fractional pixel position. Accordingly, filtering may be performed considering that a gradient value of a pixel at a fractional pixel position is determined.

Referring to FIG. 6B, first, the video decoding apparatus 100 may perform filtering on pixels positioned in a horizontal or vertical direction from a neighboring integer pixel of a reference pixel in a reference picture, by using a first 1D filter. Similarly, the video decoding apparatus 100 may perform filtering on adjacent integer pixels in a row or column different from the reference pixel, by using the first 1D filter. The video decoding apparatus 100 may generate a gradient value of the reference pixel in the vertical direction by performing filtering on values generated via the filtering, by using a second 1D filter.

For example, when a position of a reference pixel is a position of a fractional pixel at (x+α, y+β), wherein x and y are each an integer and α and β are each a fraction, filtering may be performed according to Equation 16 by using the first 1D filter with respect to integer pixels (x,y), (x−1,y−1), (x+1, y+1) through (x+M$_{Min}$,y+M$_{Min}$) and (x+M$_{Max}$,y+M$_{max}$) in a horizontal direction, wherein M$_{Min}$ and M$_{Mmax}$ are each an integer.

$$\text{Temp }[i+\alpha, j] = \qquad\qquad\text{[Equation 16]}$$

$$\left(\sum_{i'=i+M_{min}}^{i'=i+M_{max}} fracFilter_\alpha[i']I[i', j] + offset_5 \right) \gg shift_5$$

Here, fracFilter$_\alpha$ may denote an interpolation filter for determining a pixel value at a fractional pixel position a in a horizontal direction, and fracFilter$_\alpha$[i'] may denote a coefficient of an interpolation filter applied to a pixel at a (i',j) position. l[i',j] may denote a pixel value at the (i',j) position.

In other words, the first 1D filter may be an interpolation filter for determining a pixel value at a fractional pixel position a in a horizontal direction. offset$_5$ may denote an offset for preventing a round-off error, and shift$_5$ may denote a de-scaling bit number.

Temp[i+α,j] may denote pixel value at a fractional pixel position (i+α,j). Temp[i+α,j'] may also be determined according to Equation 16 by replacing j by j', wherein j' is an integer from j+M$_{min}$ to, j+M$_{max}$ excluding j.

Then, the video decoding apparatus 100 may perform filtering on a pixel value at a pixel position (i+α,j) and a pixel value at a pixel position (i+α,j') according to Equation 17, by using a second 1D filter.

$$\frac{\partial I}{\partial y}[i+\alpha, j+\beta] = \qquad\qquad\text{[Equation 17]}$$

$$\left(\sum_{j'=j+M_{min}}^{j'=j+M_{max}} gradFilter_\beta[j'] \text{ Temp } [i+\alpha, j'] + offset_6 \right) \gg shift_6$$

Here, gradFilter$_\beta$ may be a gradient filter for determining a gradient value at a fractional pixel position p in a vertical direction. gradFilter$_\beta$[j'] may denote a coefficient of an interpolation filter applied to a pixel at a (i+α,j') position. In other words, the second 1D filter may be a gradient filter for determining a gradient value in a vertical direction at a fractional pixel position β. offset$_6$ may denote an offset for preventing a round-off error, and shift$_6$ may denote a de-scaling bit number.

In other words, according to Equation 17, the video decoding apparatus 100 may determine a gradient value $$\frac{\partial I}{\partial y}[i+\alpha, j+\beta]$$

in a vertical direction at (i+α,j+β) by performing filtering on a pixel value (Temp[i+α,j]) at a pixel position (i+α,j) and a pixel value (Temp[i+α,j']) positioned in a vertical direction from the pixel position (i+α,j), by using the gradient filter gradFilter$_\beta$.

Hereinabove, a gradient value in a vertical direction is determined by first applying an interpolation filter and then applying a gradient filter, but alternatively, the gradient value in the vertical direction may be determined by first applying the gradient filter and then applying the interpolation filter. Hereinafter, an embodiment of determining a gradient value in a vertical direction by applying a gradient filter and then an interpolation filter will be described.

For example, when a position of a reference pixel is a position of a fractional pixel at (x+α, y+β), wherein x and y are each an integer and α and β are each a fraction, filtering may be performed according to Equation 18 by using the first 1D filter, with respect to integer pixels (x,y), (x,y−1), (x, y+1) through (x,y+M$_{Min}$) and (x,y+M$_{max}$) in a vertical direction, wherein M$_{Min}$ and M$_{Mmax}$ are each an integer.

$$\text{Temp }[i, j + \beta] = \left( \sum_{j'=j+M_{min}}^{j'=j+M_{max}} gradFilter_\beta[j']I[i, j'] + \text{offset}_7 \right) \gg \text{shift}_7 \quad \text{[Equation 18]}$$

Here, gradFilter$_\beta$ may denote a gradient filter for determining a gradient value at a fractional pixel position β in a vertical direction, and gradFilter$_\beta$[j'] may denote a coefficient of a gradient filter applied to a pixel at a (i,j') position. I[i,j'] may denote a pixel value at the (i,j') position.

In other words, the first 1D filter may be an interpolation filter for determining a gradient value of a pixel in a vertical direction, wherein a vertical component of a pixel position is a fractional position. offset$_7$ may denote an offset for preventing a round-off error, and shift$_7$ may denote a de-scaling bit number.

Temp[i,j+β] may denote a gradient value at a pixel position (i,j+β) in the vertical direction. Temp[i',j+β] may also be determined according to Equation 18 by replacing i by i', wherein i' is an integer from i+M$_{min}$ to, i+M$_{max}$ excluding i.

Then, the video decoding apparatus 100 may perform filtering on a gradient value at a pixel position (i, j+β) in the vertical direction and a gradient value at a pixel position (i',j+β) in the vertical direction by using the second 1D filter, according to Equation 19.

$$\frac{\partial I}{\partial y}[i + \alpha, j + \beta] = \left( \sum_{i'=i+M_{min}}^{i'=i+M_{max}} fracFilter_\alpha[i'] \text{Temp }[i', j + \beta] + \text{offset}_8 \right) \gg \text{shift}_8 \quad \text{[Equation 19]}$$

Here, fracFilter$_\alpha$ may be an interpolation filter for determining a pixel value at a fractional pixel position α in a horizontal direction. fracFilter$_\alpha$[i'] may denote a coefficient of an interpolation filter applied to a pixel at a (i',j+β) position. In other words, the second 1D filter may be an interpolation filter for determining a pixel value at a fractional pixel position α in a horizontal direction. offset$_8$ may denote an offset for preventing a round-off error, and shift$_8$ may denote a de-scaling bit number.

In other words, according to Equation 19, the video decoding apparatus 100 may determine a gradient value $$\frac{\partial I}{\partial y}[i + \alpha, j + \beta]$$

in a vertical direction at (i+α,j+β) by performing filtering on a gradient value (Temp[i,j+β]) at a pixel position (i, j+β) in a vertical direction and a gradient value (Temp[i', j+β)]) of pixels in a vertical direction positioned in a horizontal direction from the pixel position (i, j+β), by using the gradient filter fracFilter$_\alpha$.

According to an embodiment, in the video decoding apparatus 100, gradient values in horizontal and vertical directions at (i+α, j+β) may be determined according to combinations of various filters described above. For example, in order to determine a gradient value in a horizontal direction, an interpolation filter for determining a pixel value in a vertical direction may be used as a first 1D filter and a gradient filter for determining a gradient value in a horizontal direction may be used as a second 1D filter. Alternatively, a gradient filter for determining a gradient value in a vertical direction may be used as a first 1D filter, and an interpolation filter for determining a pixel value in a horizontal direction may be used as a second 1D filter.

FIGS. 7A through 7E are tables showing filter coefficients of filters used to determine a pixel value at a fractional pixel position of a fractional pixel unit, and gradient values in horizontal and vertical directions, according to embodiments.

FIGS. 7A and 7B are tables showing filter coefficients of filters for determining a gradient value at a fractional pixel position of ¼ pel units, in a horizontal or vertical direction.

As described above, a 1D gradient filter and a 1D interpolation filter may be used to determine a gradient value in a horizontal or vertical direction. Referring to FIG. 7A, filter coefficients of a 1 D gradient filter are illustrated. Here, a 6-tap filter may be used as the 1D gradient filter. The filter coefficients of the 1D gradient filter may be coefficients scaled by 2^4. Mmin denotes a difference between a position of a center integer pixel and a position of a farthest pixel from among integer pixels in a negative direction applied to a filter based on the center integer pixel, and Mmax denotes a difference between the position of the center integer pixel and a position of a farthest pixel from among integer pixels in a positive direction applied to the filter based on the center integer pixel. For example, gradient filter coefficients for obtaining a gradient value of a pixel in a horizontal direction, in which a fractional pixel position α is ¼ in the horizontal direction, may be {4, −17, −36, 60, −15, −4}. Gradient filter coefficients for obtaining a gradient value of a pixel in the horizontal direction, in which a fractional pixel position α is 0, ½, or ¾ in the horizontal direction, may also be determined by referring to FIG. 7A.

Referring to FIG. 7B, filter coefficients of a 1 D interpolation filter are illustrated. Here, a 6-tap filter may be used as the 1D interpolation filter. The filter coefficients of the 1D interpolation filter may be coefficients scaled by 2^6. Mmin denotes a difference between a position of a center integer pixel and a position of a farthest pixel from among integer pixels in a negative direction applied to a filter based on the center integer pixel, and Mmax denotes a difference between the position of the center integer pixel and a position of a farthest pixel from among integer pixels in a positive direction applied to the filter based on the center integer pixel.

FIG. 7C is a table showing filter coefficients of a 1 D interpolation filter used to determine a pixel value at a fractional pixel position of ¼ pel units.

As described above, two same 1 D interpolation filters may be used in horizontal and vertical directions to determine a pixel value at a fractional pixel position.

Referring to FIG. 7C, filter coefficients of a 1D interpolation filter are illustrated. Here, a 6-tap filter may be used as the 1D interpolation filter. The filter coefficients of the 1D interpolation filter may be coefficients scaled by 2^6. Mmin denotes a difference between a position of a center integer pixel and a position of a farthest pixel from among integer pixels in a negative direction applied to a filter based on the center integer pixel, and Mmax denotes a difference between the position of the center integer pixel and a position of a farthest pixel from among integer pixels in a positive direction applied to the filter based on the center integer pixel.

FIG. 7D is a table showing filter coefficients of filters used to determine a gradient value in a horizontal or vertical direction at a fractional pixel position of 1/16 pel units.

As described above, 1D gradient filter and 1D interpolation filter may be used to determine a gradient value in a horizontal or vertical direction. Referring to FIG. 7D, filter coefficients of a 1 D gradient filter are illustrated. Here, a 6-tap filter may be used as the 1D gradient filter. The filter coefficients of the 1D gradient filter (may be coefficients scaled by 2^4. For example, gradient filter coefficients for obtaining a gradient value of a pixel in a horizontal direction, in which a fractional pixel position α is 1/16 in the horizontal direction, may be {8, −32, −13, 50, −18, 5}. Gradient filter coefficients for obtaining a gradient value of a pixel in the horizontal direction, in which a fractional pixel position α is 0, ⅛, 3/16, ¼, 5/16, ⅜, 7/16, or ½ in the horizontal direction, may also be determined by referring to FIG. 7D. Meanwhile, gradient filter coefficients for obtaining a gradient value of a pixel in the horizontal direction, in which a fractional pixel position α is 9/16, ⅝, 11/16, ¾, 13/16, ⅞, or 15/16 in the horizontal direction, may be determined by using symmetry of filter coefficients based on α=½. In other words, filter coefficients at right fractional pixel positions based on α=½ may be determined by using filter coefficients at left fractional pixel positions based on α=½ shown in FIG. 7D. For example, filter coefficients at α=15/16 may be determined by using filter coefficients {8, −32, −13, 50, −18, 5} at α=1/16, which is a symmetric position based on α=½. In other words, filter coefficients at α=15/16 may be determined to be {5, −18, 50, −13, −32, 8} by arranging {8, −32, −13, 50, −18, 5} in an inverse order.

Referring to FIG. 7E, filter coefficients of a 1 D interpolation filter are illustrated. Here, a 6-tap filter may be used as the 1D interpolation filter. The filter coefficients of the 1D interpolation filter may be coefficients scaled by 2^6. For example, 1 D interpolation filter coefficients for obtaining a pixel value of a pixel in a horizontal direction, in which a fractional pixel position α is 1/16 in the horizontal direction, may be {1, −3, 64, 4, −2, 0}. Interpolation filter coefficients for obtaining a pixel value of a pixel in the horizontal direction, in which a fractional pixel position α is 0, ⅛, 3/16, ¼, 5/16, ⅜, 7/16, or ½ in the horizontal direction, may also be determined by referring to FIG. 7E. Meanwhile, interpolation filter coefficients for obtaining a pixel value of a pixel in the horizontal direction, in which a fractional pixel position α is 9/16, ⅝, 11/16, ¾, 13/16, ⅞, or 15/16 in the horizontal direction, may be determined by using symmetry of filter coefficients based on α=½. In other words, filter coefficients at right fractional pixel positions based on α=½ may be determined by using filter coefficients at left fractional pixel positions based on α=½ shown in FIG. 7E. For example, filter coefficients at α=15/16 may be determined by using filter coefficients {1, −3, 64, 4, −2, 0} at α=1/16, which is a symmetric position based on α=½. In other words, filter coefficients at α=15/16 may be determined to be {0, −2, 4, 64, −3, 1} by arranging {1, −3, 64, 4, −2, 0} in an inverse order.

Figure 8A:
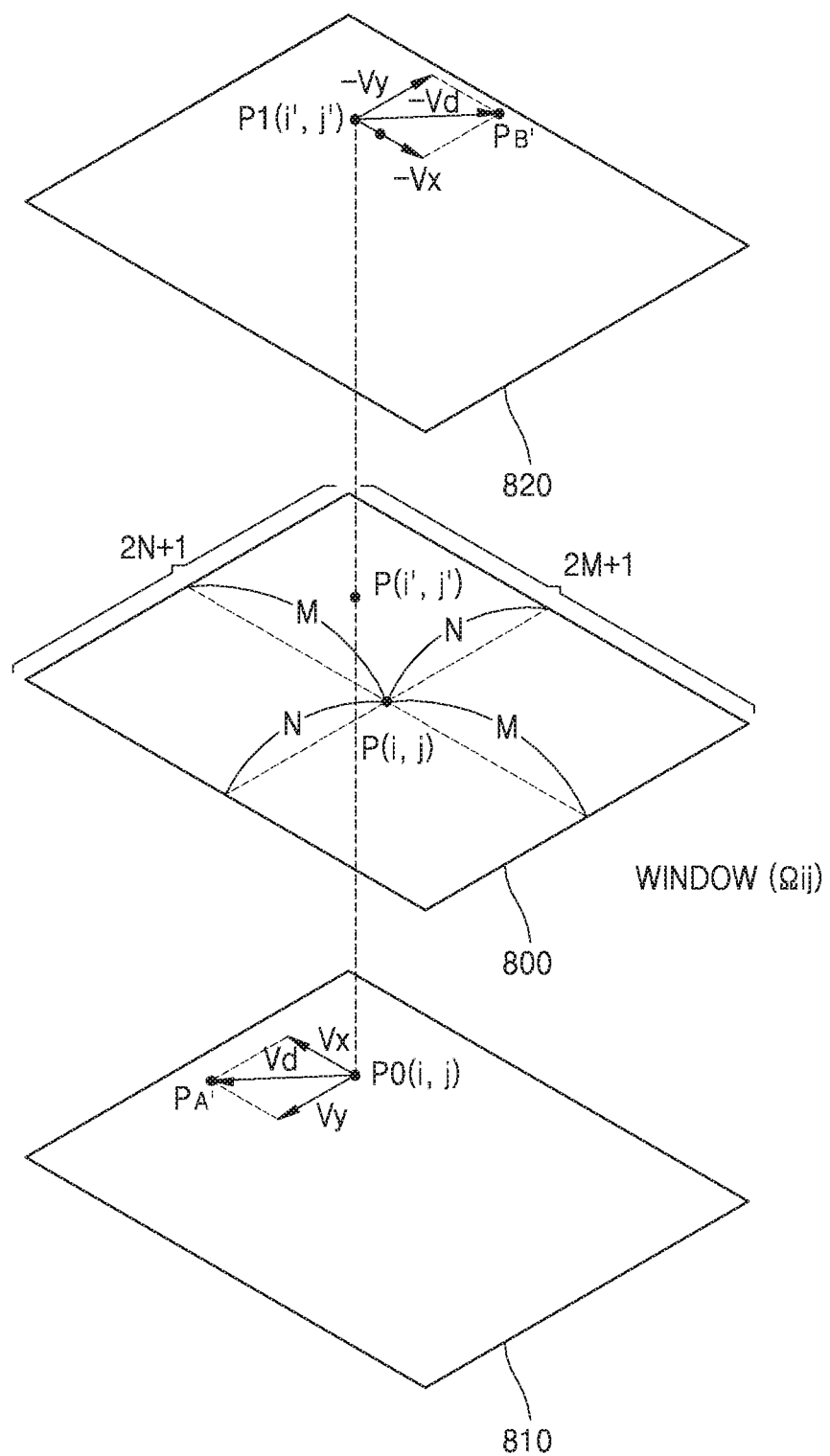
FIG. 8A is a reference diagram for describing processes of determining a horizontal direction displacement vector and a vertical direction displacement vector with respect to a pixel, according to an embodiment.

FIG. 8A is a reference diagram for describing processes of determining a horizontal direction displacement vector and a vertical direction displacement vector with respect to a pixel, according to an embodiment.

Referring to FIG. 8A, a window Ωij 800 having a certain size has a size of (2M+1)*(2N+1) based on a pixel P(i,j) that is bi-directionally predicted from a current block, wherein M and N are each an integer.

When P(i',j') denotes a pixel of a current block bi-directionally predicted in the window Ωij 800, wherein, when i−M≤i'≤i+M and j−N≤j'≤j+N, (i',j')∈Ωij, P0(i',j') denotes a pixel value of a first reference pixel of a first reference picture 810 corresponding to the pixel P(i',j') of the current block bi-directionally predicted, P1(i',j') denotes a pixel value of a second reference pixel of a second reference picture 820 corresponding to the pixel P(i',j') of the current block bi-directionally predicted, $$\frac{\partial P0(i', j')}{\partial x}$$

denotes a gradient value of the first reference pixel in a horizontal direction, $$\frac{\partial P0(i', j')}{\partial y}$$

denotes a gradient value of the first reference pixel in a vertical direction, $$\frac{\partial P1(i', j')}{\partial x}$$

denotes a gradient value of the second reference pixel in the horizontal direction, and $$\frac{\partial P1(i', j')}{\partial y}$$

denotes a gradient value of the second reference pixel in the vertical direction, a first displacement corresponding pixel PA' and a second displacement corresponding pixel PB' may be determined according to Equation 20. Here, PA' and PB' may be determined by using a first linear term of local Taylor expansion.

$$PA' = P0(i', j') - \tau 0 * Vx \frac{\partial P0(i', j')}{\partial x} - \tau 0 * Vy \frac{\partial P0(i', j')}{\partial y} \quad \text{[Equation 20]}$$

$$PB' = P1(i', j') + \tau 1 * Vx \frac{\partial P1(i', j')}{\partial x} + \tau 1 * Vy \frac{\partial P1(i', j')}{\partial y}$$

In Equation 20, a displacement vector Vx in an x-axis direction and a displacement vector Vy in a y-axis direction may be changed according to a position of the pixel P(i,j), i.e., are dependent on (i,j), the displacement vectors Vx and Vy may be expressed as Vx(i,j) and Vy(i,j).

A difference value Δi'j' between the first displacement corresponding pixel PA' and the second displacement corresponding pixel PB' may be determined according to Equation 21.

$$\Delta i'j' = (P0(i', j') - \tau 0 * Vx\frac{\partial P0(i', j')}{\partial x} - \tau 0 * Vy\frac{\partial P0(i', j')}{\partial y} -$$

$$(P1(i', j') - \tau 1 * Vx\frac{\partial P1(i', j')}{\partial x} + \tau 1 * Vy\frac{\partial 1(i', j')}{\partial y} =$$

$$P0(i', j') - P1(i', j') - Vx\left(\tau 0 * \frac{\partial P0(i', j')}{\partial x} + \tau 1 * \frac{\partial P1(i', j')}{\partial x}\right) - Vy\left(\tau 0\frac{\partial P0(i', j')}{\partial x} + \tau 1\frac{\partial P1(i', j')}{\partial y}\right)$$

[Equation 21]

The displacement vector Vx in the x-axis direction and the displacement vector Vy in the y-axis direction, which minimize the difference value Δi'j' between the first displacement corresponding pixel PA' and the second displacement corresponding pixel PB', may be determined by using the sum of squares ϕ(Vx,Vy) of the difference value Δi'j' as in Equation 22.

$$\Phi(Vx, Vy) = \sum_{i',j'\in\Omega ij} \Delta_{i'j'}^2 = \sum_{i',j'\in\Omega ij}\left(P0(i', j') - P1(i', j') - Vx(i, j)\right.$$

$$\left(\tau 0 * \frac{\partial P0(i', j')}{\partial x} + \tau 1 * \frac{\partial P1(i', j')}{\partial x}\right) - Vy(i, j)\left(\tau 0\frac{\partial P0(i', j')}{\partial y} + \tau 1\frac{\partial P1(i', j')}{\partial y}\right)\right)^2$$

In other words, the displacement vectors Vx and Vy may be determined by using a local maximum value or a local minimum value of ϕ(Vx,Vy). ϕ(Vx,Vy) denotes a function using the displacement vectors Vx and Vy as parameters, and the local maximum or local minimum value may be determined by calculating a value that becomes 0 by partially differentiating ϕ(Vx,Vy) arranged for τVx and τVy, with respect to τVx and τVy according to Equation 23. Hereinafter, for convenience of calculation, τ0 and τ1 are both the same, i.e., both τ.

$$\Phi(Vx, Vy) = (\tau Vx)^2 s1 + 2(\tau Vx)(\tau Vy)s2 + (\tau Vy)^2 s5 -$$

$$2(\tau Vx)s3 - 2(\tau Vy)s6 + \sum_{i',j'\in\Omega ij}(P0(i', j') - P1(i', j'))^2$$

[Equation 23]

Two linear equations using Vx(i,j) and Vy(i,j) as variables as Equation 24 may be obtained by using an equation:

$$\frac{\partial \Phi(Vx, Vy)}{\partial \tau V_x} = 0$$

and an equation:

$$\frac{\partial \Phi(Vx, Vy)}{\partial \tau V_x} = 0.$$

τVx*s1+τVy(i,j)*s2=s3

τVx*s4+τVy(i,j)*s5=s6   [Equation 24]

In Equation 24, s1 through s6 may be calculated according to Equation 25.

$$s1 = \sum_{i',j'\in\Omega ij}\left(\frac{\partial P0(i', j')}{\partial x} + \frac{\partial P1(i', j')}{\partial x}\right)^2$$ [Equation 25]

$$s2 = s4 = \sum_{i',j'\in\Omega ij}\left(\frac{\partial P0(i', j')}{\partial x} + \frac{\partial P1(i', j')}{\partial x}\right)$$

$$\left(\frac{\partial P0(i', j')}{\partial y} + \frac{\partial P1(i', j')}{\partial y}\right)$$

$$s3 = -\sum_{i',j'\in\Omega ij}(P0(i', j') - P1(i', j'))$$

$$\left(\frac{\partial P0(i', j')}{\partial x} + \frac{\partial P1(i', j')}{\partial x}\right)$$

$$s5 = \sum_{i',j'\in\Omega ij}\left(\frac{\partial P0(i', j')}{\partial y} + \frac{\partial P1(i', j')}{\partial y}\right)^2$$

$$s6 =$$

$$-\sum_{i',j'\in\Omega ij}(P0(i', j') - P1(i', j'))\left(\frac{\partial P0(i', j')}{\partial y} + \frac{\partial P1(i', j')}{\partial y}\right)$$

By solving a simultaneous equation of Equation 24, values of Vx(i,j) and Vy(i,j) may be obtained according to

[Equation 22]

τ*Vx(i,j)=−det1/det and τ*Vy(i,j)=−det2/det based on Kramer's formulas. Here, det1=s3*s5−s2*s6, det2=s1*s6−s3*s4, and det=s1*s5−s2*s2.

By performing minimization first in a horizontal direction and then in a vertical direction, simplified solutions of the above equations may be determined. In other words, when only a displacement vector in a horizontal direction is changed, Vy=0 in the first equation of Equation 24, and thus an equation: τVx=s3/s1 may be determined.

Then, an equation: τVy=(s6−τVx*S2)/s5 may be determined when the second equation of Equation 24 is arranged by using an equation: τVx=s3/s1.

Here, gradient values $$\frac{\partial P0(i', j')}{\partial x}, \frac{\partial P0(i', j')}{\partial y}, \frac{\partial P1(i', j')}{\partial x}, \text{ and } \frac{\partial P1(i', j')}{\partial y}$$

may be scaled without changing result values Vx(i,j) and Vy(i,j). However, it is premised that an overflow does not occur and a round-off error is not generated.

Regularization parameters r and m may be introduced so as to prevent division from being performed by 0 or a very small value while calculating Vx(i,j) and Vy(i,j).

For convenience, it is considered that Vx(i,j) and Vy(i,j) are opposite to directions shown in FIG. 3A. For example, Vx(i,j) and Vy(i,j) derived by Equation 24 based on directions of Vx(i,j) and Vy(i,j) of FIG. 3A may have the same size as Vx(i,j) and Vy(i,j) determined to be opposite to the directions of FIG. 3A, except for a sign.

The first displacement corresponding pixel PA' and the second displacement corresponding pixel PB' may be determined according to Equation 26. Here, the first displacement corresponding pixel PA' and the second displacement corresponding pixel PB' may be determined by using a first linear term of local Taylor expansion.

$$PA' = P0(i', j') - \tau 0 * Vx \frac{\partial P0(i', j')}{\partial x} + \tau 0 * Vy \frac{\partial P0(i', j')}{\partial y}$$ [Equation 26]

$$PB' = P1(i', j') - \tau 1 * Vx \frac{\partial P1(i', j')}{\partial x} - \tau 1 * Vy \frac{\partial P1(i', j')}{\partial y}$$

A difference value Δi'j' between the first displacement corresponding pixel PA' and the second displacement corresponding pixel PB' may be determined according to Equation 27.

$$\Delta i'j' = (P0(i', j') + \tau 0 * Vx \frac{\partial P0(i', j')}{\partial x} + \tau 0 * Vy \frac{\partial P0(i', j')}{\partial y} -$$ [Equation 27]

$$(P1(i', j') - \tau 1 * Vx \frac{\partial P1(i', j')}{\partial x} + \tau 1 * Vy \frac{\partial 1(i', j')}{\partial y})$$

$$\Delta i'j' = P0(i', j') - P1(i', j') + Vx\left(\tau 0 * \frac{\partial P0(i', j')}{\partial x} + \right.$$

$$\left. \tau 1 * \frac{\partial P1(i', j')}{\partial x}\right) + Vy\left(\tau 0 \frac{\partial P0(i', j')}{\partial y} + \tau 1 \frac{\partial P1(i', j')}{\partial y}\right)$$

The displacement vector Vx in the x-axis direction and the displacement vector Vy in the y-axis direction, which minimize the difference value Δi'j' between the first displacement corresponding pixel PA' and the second displacement corresponding pixel PB', may be determined by using a sum of squares φ(Vx,Vy) of a difference value Δ as in Equation 28. In other words, the displacement vectors Vx and Vy when φ(Vx,Vy) is minimum as in Equation 29 may be determined, and may be determined by using a local maximum value or a local minimum value of φ(Vx,Vy).

$$\Phi(Vx, Vy) = \sum_{i',j' \in \Omega ij} \Delta^2_{i'j'} =$$ [Equation 28]

$$\sum_{i',j' \in \Omega ij} \left(P0(i', j') - P1(i', j') + Vx(i, j)\left(\tau 0 * \frac{\partial P0(i', j')}{\partial x} + \tau 1 * \frac{\partial P1(i', j')}{\partial x}\right) + Vy(i, j)\left(\tau 0 \frac{\partial P0(i', j')}{\partial y} + \tau 1 \frac{\partial P1(i', j')}{\partial y}\right)\right)^2$$

$$(Vx, Vy) = \mathrm{argmin}_{Vx,Vy} \Phi(Vx, Vy)$$ [Equation 29]

φ(Vx,Vy) is a function using the displacement vectors Vx and Vy as parameters, and the local maximum value or the local minimum value may be determined by calculating a value that becomes 0 by partially differentiating φ(Vx,Vy) with respect to the displacement vectors Vx and Vy as in Equation 30.

$$\frac{\partial \Phi(Vx, Vy)}{\partial (Vx)} = 0; \frac{\partial \Phi(Vx, Vy)}{\partial (Vy)} = 0$$ [Equation 30]

In other words, the displacement vectors Vx and Vy that minimize φ(Vx,Vy) may be determined. In order to solve optimization issues, minimization may be first performed in a vertical direction and then in a horizontal direction. According to the minimization, the displacement vector Vx may be determined according to Equation 31.

$$Vx = (s1 + r) > m? \; clip3\left(-thBIO, thBIO, -\frac{s3}{s1+r}\right) : 0$$ [Equation 31]

Here, a function clip3(x, y, z) is a function that outputs x when z<x, outputs y when z>y, and outputs z when x<z<y.

According to Equation 31, when s1+r>m, the displacement vector Vx may be clip3(−thBIO,thBIO,−s3/(s1+r)), and when not s1+r>m, the displacement vector Vx may be 0.

According to the minimization, the displacement vector Vy may be determined according to Equation 32.

$$Vy =$$ [Equation 32]

$$(s5 + r) > m? \; clip3\left(-thBIO, thBIO, -\frac{s6 - Vx*s2/2}{s5+r}\right) : 0$$

Here, a function clip3(x, y, z) ix a function that outputs x when z<x, outputs y when z>y, and outputs z when x<z<y. According to Equation 32, when s5+r>m, the displacement vector Vy may be clip3(−thBIO,thBIO,−(s6−Vx*s2)/2/(s5+r), and when not s5+r>m, the displacement vector Vy may be 0.

Here, s1, s2, s3, and s5 may be determined according to Equation 33.

$$s1 = \sum_{i',j' \in \Omega ij} \left(\frac{\partial P0(i', j')}{\partial x} + \frac{\partial P1(i', j')}{\partial x}\right)^2$$ [Equation 33]

$$s2 = \sum_{i',j' \in \Omega ij} \left(\tau 0 \frac{\partial P0(i', j')}{\partial x} + \tau 1 \frac{\partial P1(i', j')}{\partial x}\right)$$

$$\left(\tau 0 \frac{\partial P0(i', j')}{\partial y} + \tau 1 \frac{\partial P1(i', j')}{\partial y}\right)$$

$$s3 = \sum_{i',j' \in \Omega ij} (P1(i', j') - P0(i', j'))$$

$$\left(\tau 0 \frac{\partial P0(i', j')}{\partial x} + \tau 1 \frac{\partial P1(i', j')}{\partial x}\right)$$

-continued $$s5 = \sum_{i',j' \in \Omega ij} \left(\tau 0 \frac{\partial P0(i', j')}{\partial y} + \tau 1 \frac{\partial P1(i', j')}{\partial y}\right)^2$$

$$s6 =$$

$$\sum_{i',j' \in \Omega ij} (P1(i', j') - P0(i', j'))\left(\tau 0 \frac{\partial P0(i', j')}{\partial y} + \tau 1 \frac{\partial P1(i', j')}{\partial y}\right)$$

As described above, r and m may be regularization parameters introduced to avoid a division result value being 0 or smaller and determined according to Equation 34 based on an internal bit depth d of an input video. In other words, the regularization parameter m is a minimal allowed denominator and the regularization parameter r may be a regularization parameter introduced to avoid division using 0 as a denominator when a gradient value is 0.

$$r = 500 * 4^{d-8}$$

$$m = 700 * 4^{d-8}$$ [Equation 34]

The displacement vectors Vx and Vy may have an upper limit and a lower limit of ±thBIO. The displacement vectors Vx and Vy may be clipped by a certain threshold value thBIO since there may be cases where motion compensation in pixel group units may not be trusted due to noise or irregular motion. The regularization parameter thBIO may be determined based on whether directions of all reference pictures are the same. For example, when the directions of all reference pictures are the same, the regularization parameter thBiO may be determined to be $12^{(d-8-1)}$ or $12*2^{(14-d)}$. When the directions of all reference pictures are different, thBIO may be determined to be $12^{(d-8-1)}/2$ or $12*2^{(13-d)}$.

However, an embodiment is not limited thereto, and values of the regularization parameters r, m, and thBIO may be determined based on information about regularization parameters obtained from a bitstream. Here, the information about regularization parameters may be included in a high level syntax carrier in a slice header, a picture parameter set, a sequence parameter set, or in other various forms.

Also, the regularization parameters r, m, and thBIO may be determined based on a parameter related to an image. For example, the regularization parameters r, m, and thBIO may be determined based on at least one of a bit depth of a sample, a size of GOP, a distance to a reference picture, a motion vector, an index of a reference picture, availability of bi-directional prediction of different temporal directions, a frame rate, and a setting parameter related to an encoding prediction structure.

For example, the regularization parameter may be determined based on the GOP size. For example, when the GOP size is 8 and the encoding prediction structure is random access, thBIO may be $12^{(d-8-1)}$. When the GOP size is 16 that is twice larger than 8, thBIO may be determined to be $2*2^{(d-8-1)}$.

Also, the video decoding apparatus 100 may determine the regularization parameter based on the distance with the reference picture. Here, the distance with the reference picture may denote a POC difference between the current picture and the reference picture. For example, thBIO may be determined to be small when the distance with the reference picture is small, and thBIO may be determined to be large when the distance with the reference picture is large.

The video decoding apparatus 100 may determine the regularization parameter based on the motion vector of the block. For example, when the size of the motion vector of the block is small, thBIO may be determined to be small, and when the size of the motion vector of the block is large, thBIO may be determined to be large. Also, for example, when an angle of the motion vector of the block is close to 0 and thus only has a horizontal component (generally, a horizontal component is larger than a vertical component), thBIO with respect to a vertical displacement vector may be determined to be small and thBIO with respect to a horizontal displacement vector may be determined to be large.

The video decoding apparatus 100 may determine the regularization parameter based on the reference picture index. The reference picture index may indicate a picture located closer to the current picture when a value thereof is smaller. Accordingly, when the reference picture index is small, thBIO may be determined to be small, and when the reference picture index is large, thBIO may be determined to be large.

Also, the regularization parameter may be determined according to the availability of temporally different bi-directional prediction. For example, $thBIO_{diff}$ when the temporally different bi-direction prediction is available may be larger than $thBIO_{same}$ when the temporally same bi-directional prediction is available, and the size of $thBIO_{diff}$ may be twice the size of $thBIO_{same}$.

The video decoding apparatus 100 may determine the regularization parameter based on the frame rate. Even when the sizes of GOP are the same, a temporal distance between frames is short when the frame rate is high, and thus the video decoding apparatus 100 may determine thBIO to have a smaller value.

The video decoding apparatus 100 may determine the regularization parameter based on the setting parameter related to the encoding prediction structure. For example, the setting parameter related to the encoding prediction structure may indicate random access or low-delay, and when the setting parameter related to the encoding prediction structure indicates low-delay, the thBIO value may be determined to be a small value since a temporally future picture is not referred to. When the setting parameter related to the encoding prediction structure indicates random access, the thBIO value may be determined to be a relatively large value.

The video decoding apparatus 100 may determine the regularization parameters r and m based on the bit depth of the sample. The regularization parameters r and m may be proportional to s1 and s5 of Equation 25, and since the regularization parameters r and m consist of multiplication of gradients, when values of the gradients increase, r and m are also increased. For example, when the bit depth d of the sample is increased, the gradient value may be increased, and thus the size of regularization parameters r and m may be increased.

Figure 8B:
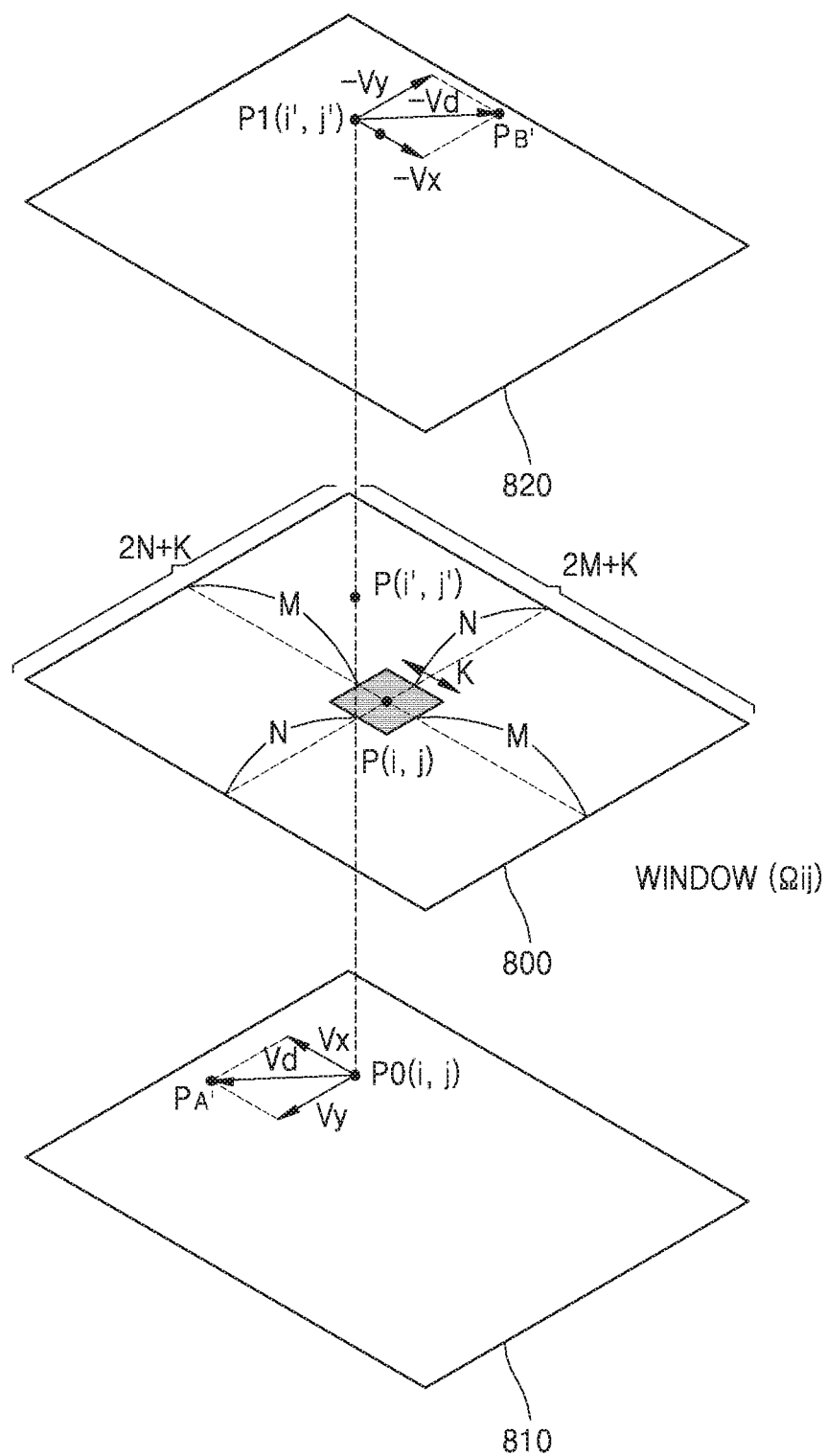
FIG. 8B is a reference diagram for describing processes of determining a horizontal direction displacement vector and a vertical direction displacement vector with respect to a pixel group, according to an embodiment.

FIG. 8B is a reference diagram for describing processes of determining a horizontal direction displacement vector and a vertical direction displacement vector with respect to a pixel group, according to an embodiment.

Referring to FIG. 8B, a window $\Omega ij$ 810 having a certain size has a size of $(2M+K+1)*(2N+K+1)$, wherein M and N are each an integer, based on a pixel group 820 having a K×K size and including a plurality of pixels instead of a pixel of a current block on which bi-direction prediction is performed.

Here, a difference from FIG. 8A is that the size of the window is large, and a horizontal direction displacement vector and a vertical direction displacement vector with respect to a pixel group may be determined in the same manner except the difference.

Figure 9A:
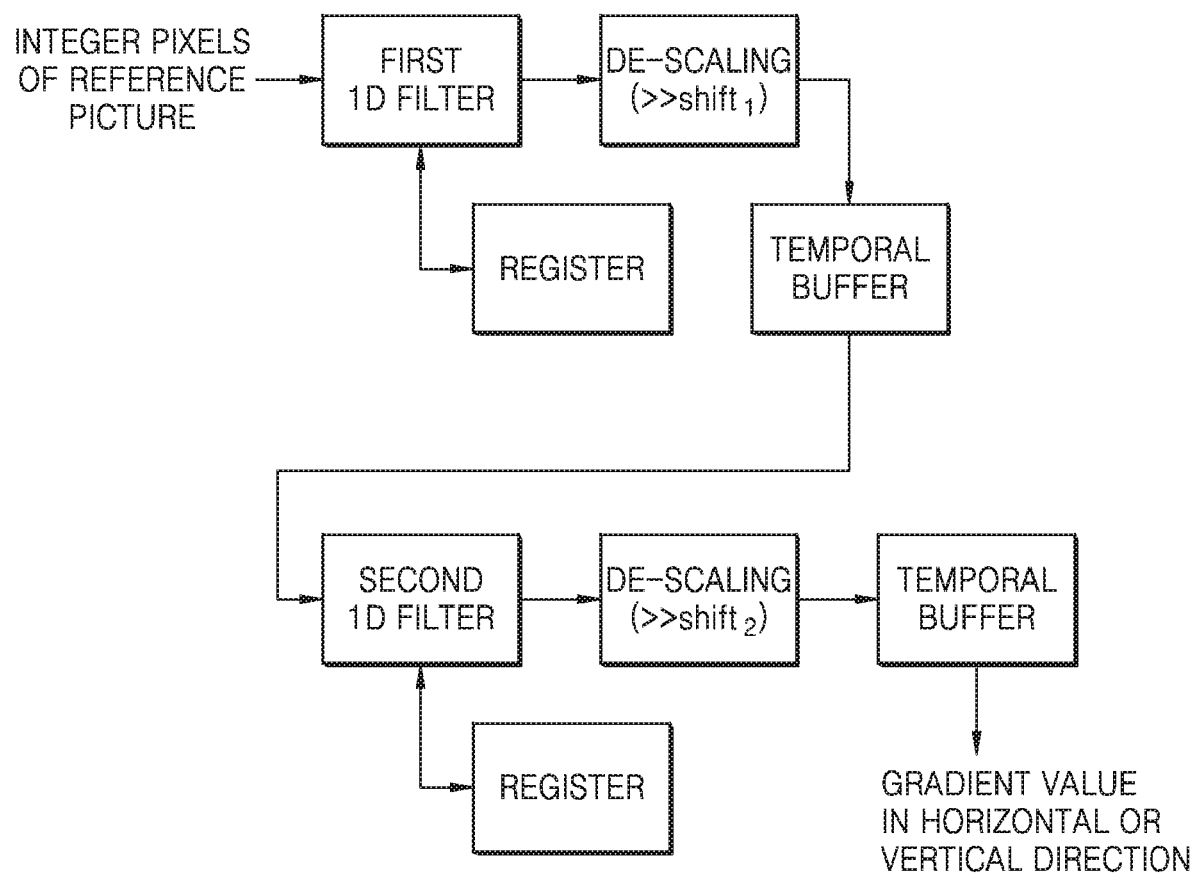
FIG. 9A is a diagram for describing processes of adding an offset value after filtering is performed, and determining a gradient value in a horizontal or vertical direction by performing de-scaling, according to an embodiment.

FIG. 9A is a diagram for describing processes of adding an offset value after filtering is performed, and determining a gradient value in a horizontal or vertical direction by performing de-scaling, according to an embodiment.

Referring to FIG. 9A, the video decoding apparatus 100 may determine a gradient value in a horizontal or vertical direction by performing filtering on a pixel, in which a component in a certain direction is at an integer position, by using a first 1D filter and a second 1D filter. However, a value obtained by performing the filtering on the pixel, in which the component in the certain direction is at an integer position, by using the first 1D filter or the second 1D filter may be outside a certain range. Such a phenomenon is referred to as an overflow phenomenon. Coefficients of a 1 D filter may be determined to be an integer for integer operation instead of an inaccurate and complicated fractional operation. The coefficients of the 1D filter may be scaled to be determined as an integer. When filtering is performed by using the scaled coefficients of the 1D filter, it is possible to perform an integer operation, but compared to when filtering is performed by using an un-scaled coefficients of a 1 D filter, a size of a value on which the filtering is performed may be high and an overflow phenomenon may occur. Accordingly, in order to prevent an overflow phenomenon, de-scaling may be performed after the filtering is performed by using the 1D filter. Here, the de-scaling may include bit-shifting to the right by a de-scaling bit number. The de-scaling bit number may be determined considering a maximum bit number of a register for a filtering operation and a maximum bit number of a temporal buffer that stores a filtering result, while maximizing accuracy of calculation. In particular, the de-scaling bit number may be determined based on an internal bit depth, a scaling bit number of an interpolation filter, and a scaling bit number for a gradient filter.

Hereinafter, performing of de-scaling during processes of generating an interpolation filtering value in a vertical direction by first performing filtering on a pixel at an integer position by using an interpolation filter in the vertical direction so as to determine a gradient value in a horizontal direction and then performing filtering on the interpolation filtering value in the vertical direction by using a gradient filter in the horizontal direction will be described.

According to Equation 12 above, the video decoding apparatus 100 may first perform filtering on a pixel at an integer position by using an interpolation filter in a vertical direction so as to determine a gradient value in a horizontal direction. Here, $shift_1$ may be b−8. Here, b may denote an internal bit depth of an input image. Hereinafter, a bit depth (Reg Bitdepth) of a register and a bit depth (Temp Bitdepth) of a temporal buffer when de-scaling is actually performed based on $shift_1$ will be described with reference to Table 1.

For example, when a gradient filter FracFilter in ¼ pel units in FIG. 7C is used, FilterSumPos may be 88 and FilterSumNeg may be −24.

A function Ceiling(x) may be a function outputting a smallest integer from among integers equal to or higher than x, with respect to a real number x. $offset_1$ is an offset value added to a value on which filtering is performed so as to prevent a round-off error that may be generated while performing de-scaling using $shift_1$, and $offset_1$ may be determined to be $2^{(shift_1-1)}$.

Referring to Table 1, when the internal bit depth b is 8, the bit depth (Reg Bitdepth) of the register may be 16, when the internal bit depth b is 9, the bit depth of the register may be 17, and when the internal bit depth b is 10, 11, 12, and 16, the bit depth of the register may be 18, 19, and 24. When a register used to preform filtering is a 32-bit register, since bit depths of all registers in FIG. 1 do not exceed 32, an overflow phenomenon does not occur.

Similarly, when the internal bit depths b are 8, 9, 10, 11, 12, and 16, the bit depths (Temp BitDepth) of the temporary buffers are all 16. When a temporary buffer used to store a value on which filtering is performed and then de-scaling is performed is a 16-bit buffer, since bit depths of all temporary buffers in Table 1 are 16 and thus do not exceed 16, an overflow phenomenon does not occur.

According to Equation 12, the video decoding apparatus 100 may generate an interpolation filtering value in a

TABLE 1

| b | Min(I) | Max(I) | RegMax | RegMin | Reg Bitdepth | TempMax | TempMin | Temp Bitdepth |
|---|---|---|---|---|---|---|---|---|
| 8 | 0 | 255 | 22440 | −6120 | 16 | 22440 | −6121 | 16 |
| 9 | 0 | 511 | 44968 | −12264 | 17 | 22484 | −6133 | 16 |
| 10 | 0 | 1023 | 90024 | −24552 | 18 | 22506 | −6139 | 16 |
| 11 | 0 | 2047 | 180136 | −49128 | 19 | 22517 | −6142 | 16 |
| 12 | 0 | 4095 | 360360 | −98280 | 20 | 22523 | −6143 | 16 |
| 16 | 0 | 65535 | 5767080 | −1572840 | 24 | 22528 | −6145 | 16 |

Here, a value of a variable in Table 1 may be determined according to Equation 35.

RegMin=Min(I)*FilterSumPos+Max(I)*FilterSumNeg

RegMax=Max(I)*FilterSumPos+Min(I)*FilterSumNeg

Reg BitDepth=ceiling(log$_2$(RegMax−RegMin)+1)

TempMin=(RegMin+offset1)>>shift1

TempMax=(RegMax+offset1)>>shift1

Temp BitDepth=ceiling(log$_2$(TempMax−TempMin)+1)     [Equation 35]

Here, Min(I) may denote a minimum value of a pixel value I determined by an internal bit depth, and Max(I) may denote a maximum value of the pixel value I determined by the internal bit depth. FilterSumPos denotes a maximum value of the sum of positive filter coefficients, and FilterSumNeg denotes a minimum value of the sum of negative filter coefficients.

vertical direction by first performing filtering on a pixel at an integer position by using an interpolation filtering in the vertical direction so as to determine a gradient value in a horizontal direction, and then perform filtering on the interpolation filtering value in the vertical direction by using a gradient filter in the horizontal direction, according to Equation 13. Here, $shift_2$ may be determined to be $p+q-shift_1$. Here, p may denote a bit number scaled with respect to an interpolation filter including filter coefficients shown in FIG. 7C, and q may denote a bit number scaled with respect to a gradient filter including filter coefficients shown in FIG. 7A. For example, p may be 6 and q may be 4, and accordingly, $shift_2=18-b$.

$shift_2$ is determined as such because $shift_1+shift_2$, i.e., the total sum of de-scaled bit numbers, should be the same as the sum (p+q) of bit numbers up-scaled with respect to a filter such that a final filtering result values are the same in a case when a filter coefficient is up-scaled and in a case when the filter coefficient is not up-scaled.

Hereinafter, a bit depth (Reg Bitdepth) of a register and a bit depth (Temp Bitdepth) of a temporary buffer when de-scaling is actually performed based on $shift_2$ will be described with reference to Table 2.

TABLE 2

| b | TempMin | TempMax | RegMax | RegMin | Reg Bitdepth | OutMax | OutMin | Temp Bitdepth |
|---|---------|---------|--------|--------|--------------|--------|--------|---------------|
| 8 | −6121 | 22440 | 1942148 | −1942148 | 23 | 1897 | −1898 | 13 |
| 9 | −6133 | 22484 | 1945956 | −1945956 | 23 | 3801 | −3802 | 14 |
| 10 | −6139 | 22506 | 1947860 | −1947860 | 23 | 7609 | −7610 | 15 |
| 11 | −6142 | 22517 | 1948812 | −1948812 | 23 | 15225 | −15226 | 16 |
| 12 | −6143 | 22523 | 1949288 | −1949288 | 23 | 30458 | −30459 | 17 |
| 16 | −6145 | 22528 | 1949764 | −1949764 | 23 | 487441 | −487442 | 21 |

Here, a value of a variable in Table 2 may be determined according to Equation 36.

RegMin=TempMin*FilterSumPos+ TempMax*FilterSumNeg

RegMax=TempMax*FilterSumPos+ TempMin*FilterSumNeg

Reg BitDepth=ceiling(log$_2$(RegMax−RegMin)+1)

TempMin=(RegMin+offset2)>>shift2

TempMax=(RegMax+offset2)>>shift2

Temp BitDepth=ceiling(log$_2$(TempMax−TempMin)+ 1)   [Equation 36]

Here, TempMax may denotes TempMax of Table 1 and TempMin may denote TempMin of Table 1. FilterSumPos denotes a maximum value of the sum of positive filter coefficients and FilterSumNeg denotes a minimum value of the sum of negative filter coefficients. For example, when a gradient filter gradFilter in ¼ pel units shown in FIG. 7C is used, FilterSumPos may be 68 and FilterSumNeg may be −68.

offset$_2$ is an offset value added to a value on which filtering is performed so as to prevent a round-off error that may be generated while performing de-scaling using shift$_2$, and offset$_1$ may be determined to be 2^(shift$_2$−1).

shift$_1$ and shift$_2$ may be determined as such, but alternatively, shift$_1$ and shift$_2$ may be variously determined as long as the sum of shift$_1$ and shift$_2$ is equal to the sum of scaling bit numbers. Here, values of shift$_1$ and shift$_2$ may be determined based on the premise that an overflow phenomenon does not occur. shift$_1$ and shift$_2$ may be determined based on an internal bit depth of an input image and a scaling bit number with respect to a filter.

However, shift$_1$ and shift$_2$ may not be necessarily determined such that the sum of shift$_1$ and shift$_2$ is equal to the num of scaling bit numbers with respect to a filter. For example, shift$_1$ may be determined to be d−8, but shift$_2$ may be determined to be a fixed number.

When shift$_1$ is the same as previous and shift$_2$ is a fixed number of 7, OutMax, OutMin, and Temp Bitdepth described with reference to Table 2 may be changed. Hereinafter, a bit depth (Temp Bitdepth) of a temporary buffer will now be described with reference to Table 3.

TABLE 3

| b | OutMax | OutMin | Temp Bitdepth |
|---|--------|--------|---------------|
| 8 | 15173 | −15174 | 16 |
| 9 | 15203 | −15204 | 16 |
| 10 | 15218 | −15219 | 16 |
| 11 | 15225 | −15226 | 16 |
| 12 | 15229 | −15230 | 16 |
| 16 | 15233 | −15234 | 16 |

Unlike Table 2, in Table 3, the bit depths (Temp Bitdepth) of the temporary buffers are the same, i.e., 16, in all b, and when result data is stored by using a 16-bit temporary buffer, the bit depth (Temp Bitdepth) of the temporary buffer is smaller than 16, and thus an overflow phenomenon does not occur with respect to internal bit depths of all input images. Meanwhile, referring to Table 2, when internal bit depths of input images are 12 and 16, and result data is stored by using a 16-bit temporary buffer, the bit depth (Temp Bitdepth) of the temporary buffer is higher than 16, and thus an overflow phenomenon may occur.

When shift$_2$ is a fixed number, a scaled filter coefficient is not used, and a result value of performing filtering and a result value of performing filtering and then de-scaling may be different. In this case, it would be obvious to one of ordinary skill in the art that de-scaling needs to be additionally performed.

Hereinabove, performing of de-scaling during processes of generating an interpolation filtering value in a vertical direction by first performing filtering on a pixel at an integer position by using an interpolation filter in the vertical direction so as to determine a gradient value in a horizontal direction, and then performing filtering on the interpolation filtering value in the vertical direction by using a gradient filter in the horizontal direction has been described, but it would be obvious to one of ordinary skill in the art that de-scaling may be performed in the similar manner when filtering is performed on a pixel, in which a component in a certain direction is an integer, so as to determine gradient values in horizontal and vertical directions via a combination of various 1D filters.

Figure 9B:
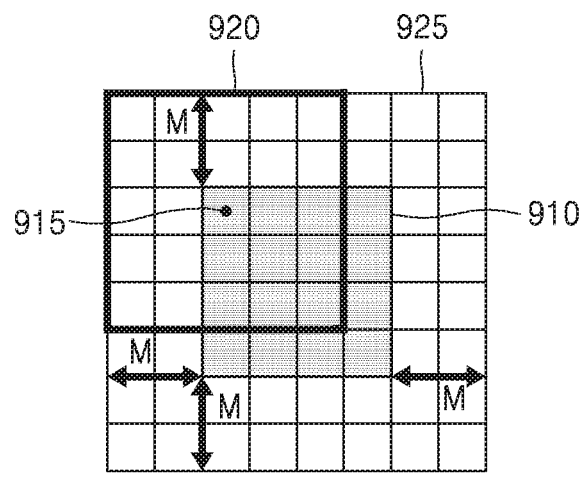
FIG. 9B is a diagram for describing a range necessary to determine a horizontal direction displacement vector and a vertical direction displacement vector during processes of performing pixel unit motion compensation with respect to a current block.

FIG. 9B is a diagram for describing a range necessary to determine a horizontal direction displacement vector and a vertical direction displacement vector during processes of performing pixel unit motion compensation with respect to a current block.

Referring to FIG. 9B, while performing pixel unit motion compensation on a reference block 910 corresponding to the current block, the video decoding apparatus 100 may determine a displacement vector per unit time in a horizontal direction and a displacement vector per unit time in a vertical direction in a pixel 915 by using a window 920 near the pixel 915 positioned at the upper left of the reference block 910. Here, the displacement vector per unit time in the horizontal or vertical direction may be determined by using a pixel value and gradient value of a pixel positioned in a range outside the reference block 910. In the same manner, while determining a horizontal direction displacement vector and a vertical direction displacement vector with respect to a pixel positioned on a boundary of the reference block 910, the video decoding apparatus 100 determines a pixel value and gradient value of a pixel positioned in a range outside the reference block 910. Accordingly, the video decoding apparatus 100 may determine the horizontal direction displacement vector and the displacement vector per unit time in the vertical direction by using a block 925 in a range larger than the reference block 910. For example, when the size of the current block is A×B and the size of a window per pixel is (2M+1)×(2N+1), the size of a range for determining the horizontal direction displacement vector and the vertical direction displacement vector may be (A+2M)×(B+2N).

Figure 9C:
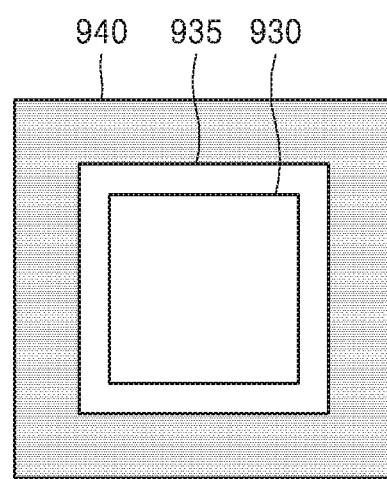
FIGS. 9C and 9D are diagrams for describing ranges of regions used during processes of performing motion compensation in pixel units, according to various embodiments.
Figure 9D:
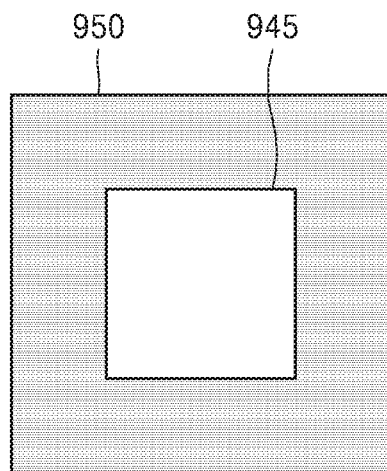

FIGS. 9C and 9D are diagrams for describing ranges of regions used during processes of performing motion compensation in pixel units, according to various embodiments.

Referring to FIG. 9C, while performing the motion compensation in pixel units, the video decoding apparatus 100 may determine a horizontal direction displacement vector per pixel and displacement vector per unit time in vertical direction per pixel included in a reference block 930 based on a block 935 in a range expanded by a size of a window of a pixel positioned on the boundary of the reference block 930. However, while determining the displacement vectors per unit time in the horizontal and vertical directions, the video decoding apparatus 100 require a pixel value and gradient value of a pixel positioned in the block 935, and at this time, an interpolation filter or gradient filter may be used to obtain the pixel value and gradient value. While using the interpolation filter or gradient filter on a boundary pixel of the block 935, a pixel value of a neighboring pixel may be used and accordingly, a pixel positioned outside a block boundary may be used. Accordingly, The pixel unit motion compensation may be performed by using a block 940 in a range additionally expanded to a value obtained by subtracting 1 from a tab number of the interpolation filter or gradient filter. Accordingly, when a size of a block is N×N, a size of a window per pixel is (2M+1)×(2M+1), and a length of an interpolation filter or gradient filter is T, a size of the block in the expanded range may be (N+2M+T−1)×(N+2M+T−1).

Referring to FIG. 9D, while performing the motion compensation in pixel units, the video decoding apparatus 100 may determine a horizontal direction displacement vector per pixel and displacement vector per unit time in vertical direction by using a pixel value and gradient value of a pixel positioned in a reference block 945 without expanding a reference block according to a size of a window of a pixel positioned on the boundary of the reference block 945. In particular, processes of the video decoding apparatus 100 determining the displacement vector per unit time in the horizontal direction and the displacement vector per unit time in the vertical direction without expanding a reference block are described with reference to FIG. 9E. However, an interpolation filter or gradient filter of the reference block 945 is used to obtain the pixel value or gradient value of the pixel, and the pixel unit motion compensation may be performed by using an expanded block 950. Accordingly, when a size of a block is N×N, a size of a window per pixel is (2M+1)×(2M+1), and a length of an interpolation filter or gradient filter is T, a size of the expanded block may be (N+T−1)×(N+T−1).

Figure 9E:
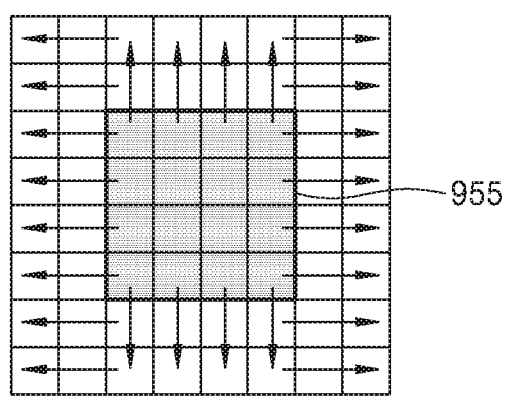
FIG. 9E is a diagram for describing processes of determining a horizontal direction displacement vector and a vertical direction displacement vector without expanding a reference block.

FIG. 9E is a diagram for describing processes of determining a horizontal direction displacement vector and a vertical direction displacement vector without expanding a reference block.

Referring to FIG. 9E, regarding a pixel positioned outside a boundary of a reference block 955, the video decoding apparatus 100 may adjust the position of the pixel to a position of an available pixel at a closest position among pixels positioned in the boundary of the reference block 955 to determine a pixel value and gradient value of the pixel positioned outside the boundary to be a pixel value and gradient value of the available pixel at the closest position. Here, the video decoding apparatus 100 may adjust the position of the pixel positioned outside the reference block 955 to the position of the available pixel at the closest position according to an equation: i'=i'<O?O:i';i'>H−1?H−1:P and an equation: j'=j'<O?O:j';j'>W−1?W−1:j'.

Here, i' denotes an x-coordinate value of a pixel, j' denotes a y-coordinate value of the pixel, and H and W denote a height and width of a reference block. Here, it is assumed that an upper left position of the reference block is (0,0). When the upper left position of the reference block is (xP, yP), a position of a final pixel may be (i'+xP, j'+yP).

Referring back to FIG. 9C, positions of pixels positioned outside the boundary of the reference block 930 in the block 935 expanded by the size of the window per pixel are adjusted to positions of pixels adjacent to the inside of the boundary of the reference block 930, and the video decoding apparatus 100 may determine the horizontal direction displacement vector per pixel and the displacement vector per unit time in the vertical direction per pixel in the reference block 945 *b* using the pixel value and gradient value of the reference block 945 as shown in FIG. 9D.

Accordingly, since the video decoding apparatus 100 performs the pixel unit motion compensation without expanding the reference block 945 according to the size of the window per pixel, memory access times for pixel value reference is reduced and multiplication operation times is reduced, and thus operation complexity may be reduced.

The video decoding apparatus 100 may perform a memory access operation and a multiplication operation by the memory access times and the multiplication operation times as shown in Table 4 below according to when the video decoding apparatus 100 performs block unit motion compensation (as being operated according to HEVC standard), performs pixel unit motion compensation with block expansion according to window size, and performs pixel unit motion compensation without block expansion. Here, it is assumed that a length T of a gradient filter is 7, a size of a block is N×N, and a size 2M+1 of a window per pixel is 5.

TABLE 4

|  | Block Unit Motion Compensation according to HEVC Standard | Pixel Unit Motion Compensation with Block Expansion | Pixel Unit Motion Compensation without Block Expansion |
|---|---|---|---|
| Memory Access Times | 2*(N + 7) × (N + 7) | 2 × (N + 4 + 7) × (N + 4 + 7) | 2 × (N + 7) × (N + 7) |
| Multiplication Operation Times | 2*8*{(N + 7) × N + N × N} | 2*8*{(N + 4 + 7) × (N + 4) + (N + 4) × (N + 4)} 2*6*{(N + 4 + 5) × (N + 4) + (N + 4) × (N + 4)} 2*6*{(N + 4 + 5) × (N + 4) + (N + 4) × (N + 4)} | 2*8*{(N + 7) × N + N × N + 4} 2*6*{(N + 5) × N + N × N} 2*6*{(N + 5) × N + N × N} |

In the block unit motion compensation according to HEVC standard, since an interpolation filter of 8-tab is used with respect to one sample, 8 neighboring samples are required, and thus when a size of a reference block is N×N, (N+7)×(N+7) reference samples are required according to 8-tab interpolation, and since bi-directional motion prediction compensation is performed, two reference blocks are used, and thus in the block unit motion compensation according to HEVC standard, memory access is performed 2*(N+7)×(N+7) times as shown in Table 4. When the pixel unit motion compensation is performed with block expansion, M=2, and the pixel unit motion compensation is performed by using an 8-tab interpolation filter or gradient filter with respect to a block having an expanded size of (N+4)×(N+4), (N+4+7)×(N+4+7) reference samples are required, and since bi-directional motion prediction compensation is performed, two reference blocks are used, and thus in the pixel unit motion compensation performed with block expansion, memory access is performed 2*(N+4+7)×(N+4+7) times as shown in Table 4.

However, when the pixel unit motion compensation is performed without block expansion, since a block is not expanded, (N+7)×(N+7) reference samples are required as in the block unit motion compensation according to HEVC standard, and since bi-directional motion prediction compensation is performed, two reference blocks are used, and thus in the pixel unit motion compensation performed without block expansion, access memory is performed 2*(N+7)×(N+7) times as in Table 4.

Figure 9F:
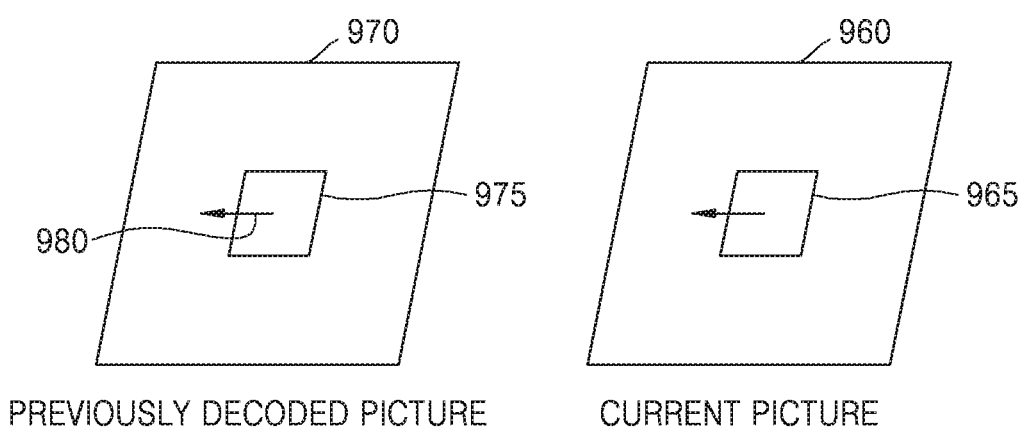
FIG. 9F is a diagram for describing processes of obtaining a temporal motion vector predictor candidate in which pixel group unit motion compensation is considered.

FIG. 9F is a diagram for describing processes of obtaining a temporal motion vector predictor candidate in which pixel group unit motion compensation is considered.

The video decoding apparatus 100 may perform inter prediction on a current block 965 in a current picture 960. Here, the video decoding apparatus 100 may obtain a motion vector 980 of a collocated block 975 of a pre-decoded picture 970 as a temporal motion vector prediction candidate of the current block 965, determine one of the obtained temporal motion vector predictor candidate of the current block and another motion vector predictor candidate as a motion vector predictor of the current block 965, and perform inter prediction on the current block 965 by using the motion vector predictor.

The video decoding apparatus 100 may perform block unit motion compensation and pixel group unit motion compensation on the collocated block 975 while performing the inter prediction on the collocated block 975 included in the pre-decoded picture 970. The video decoding apparatus 100 may perform the block unit motion compensation by using the motion vector 980 and may perform the pixel group unit motion compensation by using displacement vectors per unit time in horizontal and vertical directions per pixel group.

The video decoding apparatus 100 may store the motion vector 980 of the collocated block 975 considering that the motion vector 980 of the collocated block 975 may be used as the temporal motion vector predictor candidate after the pre-decoded picture 970. Here, the video decoding apparatus 100 may store the motion vector 980 based on a motion vector storage unit. In particular, the video decoding apparatus 100 may store the motion vector 980 according to an equation:

$$(MVx, MVY) = f_{R \times R}(MVx + \mu Vx, MVy + \mu Vy)).$$

Here, MVx and MVy may respectively denote an x component and a y component of a motion vector used in block unit motion compensation, and vx and vy may respectively denote an x component and a y component of a displacement vector per pixel used in pixel group unit motion compensation. Also, p indicates a weight. Here, the weight p may be determined based on a size R of a motion vector storage unit, a size K of a pixel group, and a scaling factor of a gradient filter or interpolation filter used in motion compensation in pixel group units. For example, when a value of the size K of the pixel group increases, the weight p may be decreased, and when the size R of the motion vector storage unit increases, the weight p may be decreased. Also, when a value of the scaling factor of the gradient filter or interpolation filter increases, the weight p may be decreased. Here, $f_{R \times R}$(MVx, MVy) may denote a function by the motion vector MVx,MVy considering the size of the motion vector storage unit of R×R. For example, $f_{R \times R}$(MVx, MVy) may be a function in which an average value of x components MVx of motion vectors of a unit included in the motion vector storage unit of R×R is determined to be the x component MVx stored in the motion vector storage unit of R×R, and an average value of y components MVy of motion vectors of a unit included in the motion vector storage unit of R×R is determined to be the y component MVy stored in the motion vector storage unit of R×R.

Since the stored motion vector 980 is a motion vector considering the motion compensation in pixel group units, the temporal motion vector predictor candidate of the current block 965 may be determined to be a motion vector used in more precise motion compensation while inter prediction is performed on the current block 965, and thus prediction encoding/decoding efficiency may be increased.

Hereinafter, a method of determining a data unit that may be used while the video decoding apparatus 100 according to an embodiment decodes an image will be described with reference to FIGS. 10 through 23. Operations of the video encoding apparatus 150 may be similar to or the reverse of various embodiments of operations of the video decoding apparatus 100 described below.

Figure 10:
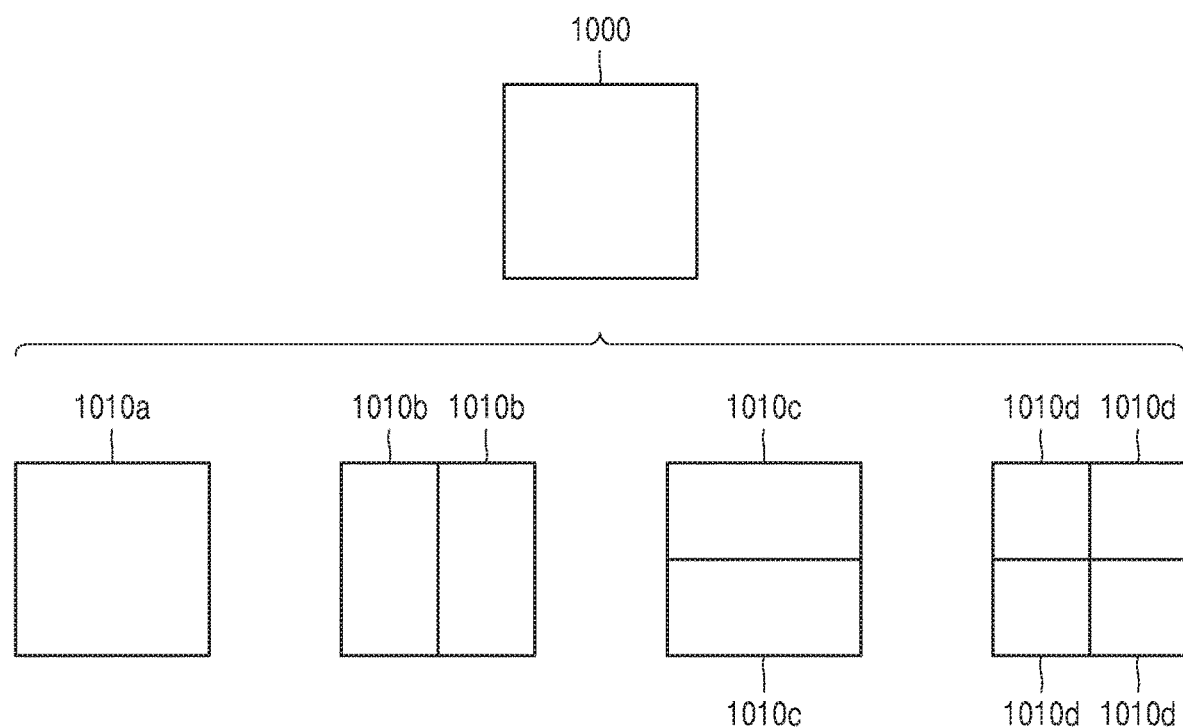
FIG. 10 illustrates processes of determining at least one coding unit as a current coding unit is split, according to an embodiment.

FIG. 10 illustrates processes of determining at least one coding unit as the video decoding apparatus 100 splits a current coding unit, according to an embodiment.

According to an embodiment, the video decoding apparatus 100 may determine a shape of a coding unit by using block shape information, and determine a shape into which a coding unit is split by using split shape information. In other words, a split method of a coding unit, which is indicated by the split shape information, may be determined based on a block shape indicated by the block shape information used by the video decoding apparatus 100.

According to an embodiment, the video decoding apparatus 100 may use block shape information indicating that a current coding unit has a square shape. For example, the video decoding apparatus 100 may determine, according to split shape information, whether to not split a square coding unit, to split the square coding unit vertically, to split the square coding unit horizontally, or to split the square coding unit into four coding units. Referring to FIG. 10, when block shape information of a current coding unit 1000 indicates a square shape, the video decoding apparatus 100 may not split a coding unit 1010*a* having the same size as the current coding unit 1000 according to split shape information indicating non-split, or determine coding units 1010*b*, 1010*c*, or 1010*d* based on split shape information indicating a certain split method.

Referring to FIG. 10, the video decoding apparatus 100 may determine two coding units 1010*b* by splitting the current coding unit 1000 in a vertical direction based on split shape information indicating a split in a vertical direction, according to an embodiment. The video decoding apparatus 100 may determine two coding units 1010c by splitting the current coding unit 1000 in a horizontal direction based on split shape information indicating a split in a horizontal direction. The video decoding apparatus 100 may determine four coding units 1010d by splitting the current coding unit 1000 in vertical and horizontal directions based on split shape information indicating splitting in vertical and horizontal directions. However, a split shape into which a square coding unit may be split is not limited to the above shapes, and may include any shape indicatable by split shape information. Certain split shapes into which a square coding unit are split will now be described in detail through various embodiments.

FIG. 11 illustrates processes of determining at least one coding unit when the video decoding apparatus 100 splits a coding unit having a non-square shape, according to an embodiment.

According to an embodiment, the video decoding apparatus 100 may use block shape information indicating that a current coding unit has a non-square shape. The video decoding apparatus 100 may determine, according to split shape information, whether to not split the non-square current coding unit or to split the non-square current coding unit via a certain method. Referring to FIG. 11, when block shape information of a current coding unit 1100 or 1150 indicates a non-square shape, the video decoding apparatus 100 may not split coding units 1110 or 1160 having the same size as the current coding unit 1100 or 1150 according to split shape information indicating non-split, or determine coding units 1120a, 1120b, 1130a, 1130b, 1130c, 1170a, 1170b, 1180a, 1180b, and 1180c based on split shape information indicating a certain split method. A certain split method of splitting a non-square coding unit will now be described in detail through various embodiments.

According to an embodiment, the video decoding apparatus 100 may determine a shape into which a coding unit is split by using split shape information, and in this case, the split shape information may indicate the number of at least one coding unit generated as the coding unit is split. Referring to FIG. 11, when split shape information indicates that the current coding unit 1100 or 1150 is split into two coding units, the video decoding apparatus 100 may determine two coding units 1120a and 1120b or 1170a and 1170b included in the current coding unit 1100 or 1150 by splitting the current coding unit 1100 or 1150 based on the split shape information.

According to an embodiment, when the video decoding apparatus 100 splits the current coding unit 1100 or 1150 having a non-square shape based on split shape information, the video decoding apparatus 100 may split the current coding unit 1100 or 1150 considering locations of long sides of the current coding unit 1100 or 1150 having a non-square shape. For example, the video decoding apparatus 100 may determine a plurality of coding units by splitting the current coding unit 1100 or 1150 in a direction of splitting the long sides of the current coding unit 1100 or 1150 considering a shape of the current coding unit 1100 or 1150.

According to an embodiment, when split shape information indicates that a coding unit is split into an odd number of blocks, the video decoding apparatus 100 may determine the odd number of coding units included in the current coding unit 1100 or 1150. For example, when split shape information indicates that the current coding unit 1100 or 1150 is split into three coding units, the video decoding apparatus 100 may split the current coding unit 1100 or 1150 into three coding units 1130a through 1130c or 1180a through 1180c. According to an embodiment, the video decoding apparatus 100 may determine the odd number of coding units included in the current coding unit 1100 or 1150, and the sizes of the determined coding units may not be all the same. For example, the size of coding unit 1130b or 1180b from among the determined odd number of coding units 1130a through 1130c or 1180a through 1180c may be different from the sizes of coding units 1130a and 1130c or 1180a and 1180c. In other words, coding units that may be determined when the current coding unit 1100 or 1150 is split may have a plurality of types of sizes, and in some cases, the coding units 1130a through 1130c or 1180a through 1180c may have different sizes.

According to an embodiment, when split shape information indicates that a coding unit is split into an odd number of blocks, the video decoding apparatus 100 may determine the odd number of coding units included in the current coding unit 1100 or 1150, and in addition, may set a certain limit on at least one coding unit from among the odd number of coding units generated via splitting. Referring to FIG. 11, the video decoding apparatus 100 may differentiate decoding processes performed on the coding unit 1130b or 1180b located at the center from among the three coding units 1130a through 1130c or 1180a through 1180c generated as the current coding unit 1100 or 1150 is split from the other coding units 1130a and 1130c or 1180a and 1180c. For example, the video decoding apparatus 100 may limit the coding unit 1130b or 1180b located at the center to be no longer split unlike the other coding units 1130a and 1130c or 1180a and 1180c, or to be split only a certain number of times.

Figure 12:
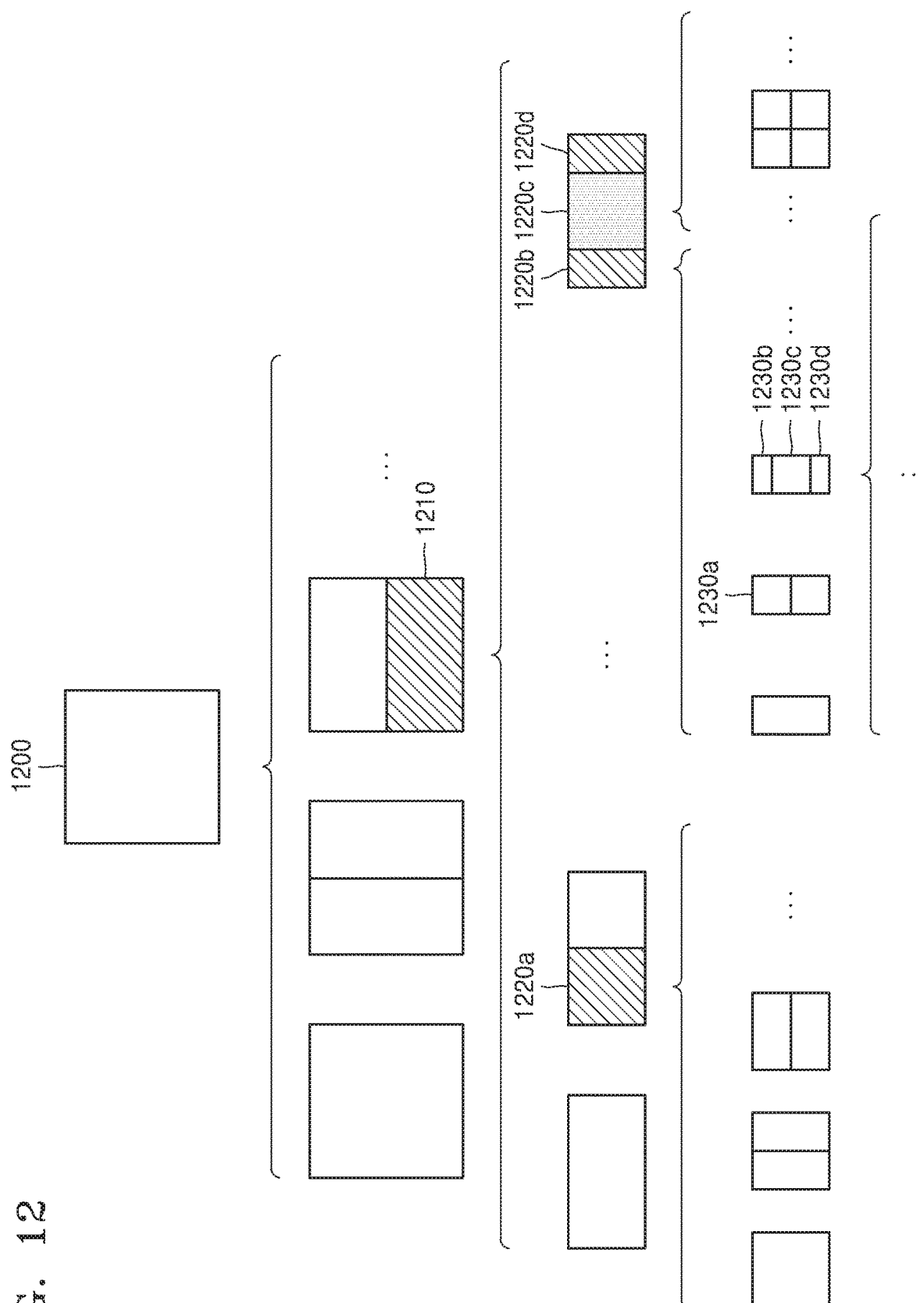
FIG. 12 illustrates processes of splitting a coding unit, based on at least one of a block shape information and split shape information, according to an embodiment.

FIG. 12 illustrates processes of the video decoding apparatus 100 splitting a coding unit, based on at least one of a block shape information and split shape information, according to an embodiment.

According to an embodiment, the video decoding apparatus 100 may determine that a first coding unit 1200 having a square shape is split or not split into coding units, based on at least one of block shape information and split shape information. According to an embodiment, when split shape information indicates that the first coding unit 1200 is split in a horizontal direction, the video decoding apparatus 100 may determine a second coding unit 1210 by splitting the first coding unit 1200 in a horizontal direction. A first coding unit, a second coding unit, and a third coding unit used according to an embodiment are terms used to indicate a relation between before and after splitting a coding unit. For example, a second coding unit may be determined by splitting a first coding unit, and a third coding unit may be determined by splitting a second coding unit. Hereinafter, it will be understood that relations between first through third coding units are in accordance with the features described above.

According to an embodiment, the video decoding apparatus 100 may determine that the determined second coding unit 1210 is split or not split into coding units based on at least one of block shape information and split shape information. Referring to FIG. 12, the video decoding apparatus 100 may split the second coding unit 1210, which has a non-square shape and is determined by splitting the first coding unit 1200, into at least one third coding unit 1210a, 1220b, 1220c, or 1220d, or may not split the second coding unit 1210, based on at least one of block shape information and split shape information. The video decoding apparatus 100 may obtain at least one of the block shape information and the split shape information, and obtain a plurality of second coding units (for example, the second coding units 1210) having various shapes by splitting the first coding unit 1200 based on at least one of the obtained block shape information and split shape information, wherein the second coding unit 1210 may be split according to a method of splitting the first coding unit 1200 based on at least one of the block shape information and the split shape information. According to an embodiment, when the first coding unit 1200 is split into the second coding units 1210 based on at least one of block shape information and split shape information with respect to the first coding unit 1200, the second coding unit 1210 may also be split into third coding units (for example, the third coding units 1220a through 1220d) based on at least one of block shape information and split shape information with respect to the second coding unit 1210. In other words, a coding unit may be recursively split based on at least one of split shape information and block shape information related to each coding unit. Accordingly, a square coding unit may be determined from a non-square coding unit, and such a square coding unit may be recursively split such that a non-square coding unit is determined. Referring to FIG. 12, a certain coding unit (for example, a coding unit located at the center or a square coding unit) from among the odd number of third coding units 1220b through 1220d determined when the second coding unit 1210 having a non-square shape is split may be recursively split. According to an embodiment, the third coding unit 1220c having a square shape from among the third coding units 1220b through 1220d may be split in a horizontal direction into a plurality of fourth coding units. A fourth coding unit 1240 having a non-square shape from among the plurality of fourth coding units may again be split into a plurality of coding units. For example, the fourth coding unit 1240 having a non-square shape may be split into an odd number of coding units 1250a through 1250c.

A method that may be used to recursively split a coding unit will be described below through various embodiments.

According to an embodiment, the video decoding apparatus 100 may determine that each of the third coding units 1220a through 1220d is split into coding units or that the second coding unit 1210 is not split, based on at least one of block shape information and split shape information. The video decoding apparatus 100 may split the second coding unit 1210 having a non-square shape into the odd number of third coding units 1220b through 1220d, according to an embodiment. The video decoding apparatus 100 may set a certain limit on a certain third coding unit from among the third coding units 1220b through 1220d. For example, the video decoding apparatus 100 may limit that the third coding unit 1220c located at the center of the third coding units 1220b through 1220d is no longer split, or is split into a settable number of times. Referring to FIG. 12, the video decoding apparatus 100 may limit that the third coding unit 1220c located at the center of the third coding units 1220b through 1220d included in the second coding unit 1210 having a non-square shape is no longer split, is split into a certain split shape (for example, split into four coding units or split into shapes corresponding to those into which the second coding unit 1210 is split), or is split only a certain number of times (for example, split only n times wherein n>0). However, such limits on the third coding unit 1220c located at the center are only examples and should not be interpreted as being limited by those examples, but should be interpreted as including various limits as long as the third coding unit 1220c located at the center are decoded differently from the other third coding units 1220b and 1220d.

According to an embodiment, the video decoding apparatus 100 may obtain at least one of block shape information and split shape information used to split a current coding unit from a certain location in the current coding unit.

Figure 13:
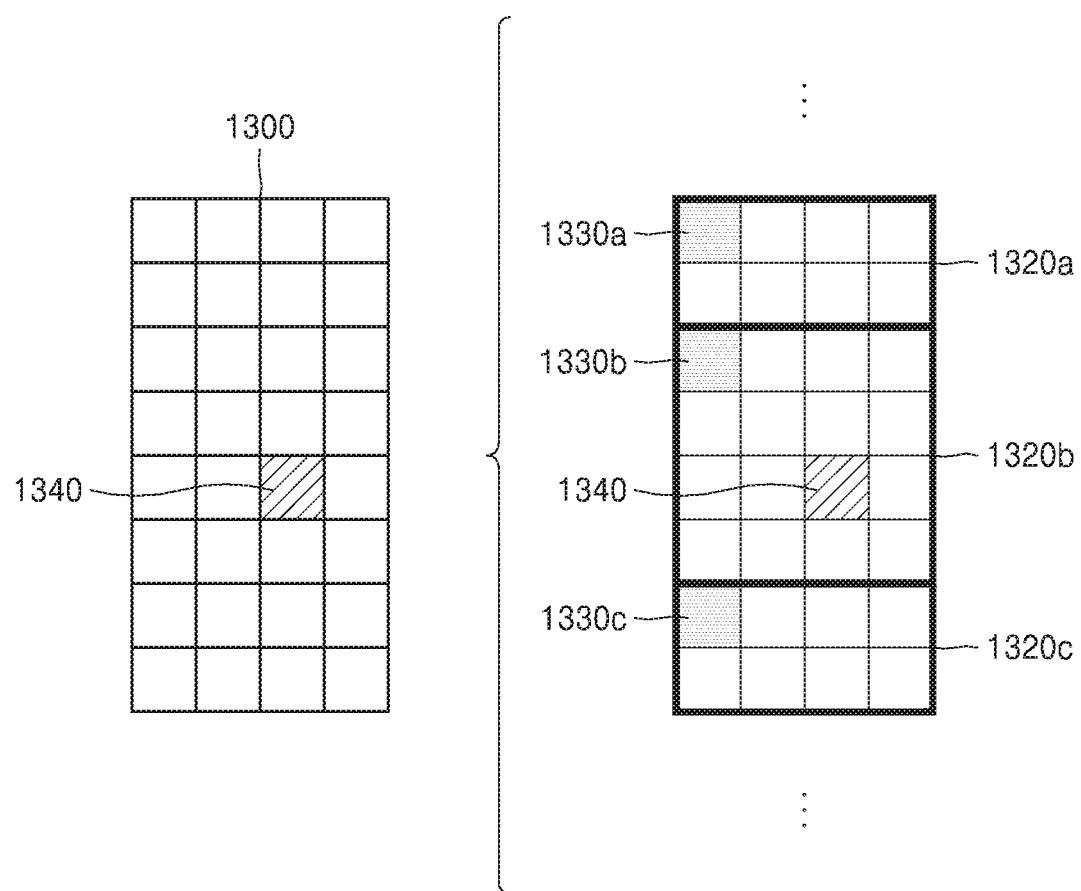
FIG. 13 illustrates a method of determining a certain coding unit from among an odd number of coding units, according to an embodiment.

FIG. 13 illustrates a method of determining, by the video decoding apparatus 100, a certain coding unit from among an odd number of coding units, according to an embodiment. Referring to FIG. 13, at least one of block shape information and split shape information of a current coding unit 1300 may be obtained from a sample at a certain location (for example, a sample 1340 located at the center) from among a plurality of samples included in the current coding unit 1300. However, the certain location in the current coding unit 1300 from which at least one of block shape information and split shape information is obtained is not limited to the center location shown in FIG. 13, but may be any location (for example, an uppermost location, a lowermost location, a left location, a right location, an upper left location, a lower left location, an upper right location, or a lower right location) included in the current coding unit 1300. The video decoding apparatus 100 may determine that a current coding unit is split into coding units having various shapes and sizes or is not split by obtaining at least one of block shape information and split shape information from a certain location.

According to an embodiment, the video decoding apparatus 100 may select one coding unit when a current coding unit is split into a certain number of coding units. A method of selecting one of a plurality of coding units may vary, and details thereof will be described below through various embodiments.

According to an embodiment, the video decoding apparatus 100 may split a current coding unit into a plurality of coding units, and determine a coding unit at a certain location.

FIG. 13 illustrates a method of determining, by the video decoding apparatus 100, a coding unit at a certain location from among an odd number of coding units, according to an embodiment.

According to an embodiment, the video decoding apparatus 100 may use information indicating a location of each of the odd number of coding units so as to determine a coding unit located at the center from among the odd number of coding units. Referring to FIG. 13, the video decoding apparatus 100 may determine the odd number of coding units 1320a through 1320c by splitting the current coding unit 1300. The video decoding apparatus 100 may determine the center coding unit 1320b by using information about the locations of the odd number of coding units 1320a through 1320c. For example, the video decoding apparatus 100 may determine the coding unit 1320b located at the center by determining the locations of the coding units 1320a through 1320b based on information indicating locations of certain samples included in the coding units 1320a through 1320c. In detail, the video decoding apparatus 100 may determine the coding unit 1320b located at the center by determining the locations of the coding units 1320a through 1320c based on information indicating locations of upper left samples 1330a through 1330c of the coding units 1320a through 1320c.

According to an embodiment, the information indicating the locations of the upper left samples 1330a through 1330c included in the coding units 1320a through 1320c respectively may include information about a location or coordinates of the coding units 1320a through 1320c in a picture. According to an embodiment, the information indicating the locations of the upper left samples 1330a through 1330c included in the coding units 1320a through 1320c respectively may include information indicating widths or heights of the coding units 1320a through 1320c included in the current coding unit 1300, and such widths or heights may correspond to information indicating differences between coordinates of the coding units 1320a through 1320c in a picture. In other words, the video decoding apparatus 100 may determine the coding unit 1320b located at the center by directly using the information about the locations or coordinates of the coding units 1320a through 1320c in a picture or by using information about the widths or heights of the coding units 1320a through 1320c corresponding to the differences between coordinates.

According to an embodiment, the information indicating the location of the upper left sample 1330a of the upper coding unit 1320a may indicate (xa, ya) coordinates, the information indicating the location of the upper left sample 1330b of the center coding unit 1320b may indicate (xb, yb) coordinates, and the information indicating the location of the upper left sample 1330c of the lower coding unit 1320c may indicate (xc, yc) coordinates. The video decoding apparatus 100 may determine the center coding unit 1320b by using the coordinates of the upper left samples 1330a through 1330c respectively included in the coding units 1320a through 1320c. For example, when the coordinates of the upper left samples 1330a through 1330c are arranged in an ascending order or descending order, the coding unit 1320b including the coordinates (xb, yb) of the sample 1330b located at the center may be determined as a coding unit located at the center from among the coding units 1320a through 1320c determined when the current coding unit 1300 is split. However, coordinates indicating the locations of the upper left samples 1330a through 1330c may be coordinates indicating absolute locations in a picture, and in addition, (dxb, dyb) coordinates, i.e., information indicating a relative location of the upper left sample 1330b of the center coding unit 1320b, and (dxc, dyc) coordinates, i.e., information indicating a relative location of the upper left sample 1330c of the lower coding unit 1320c, may be used based on the location of the upper left sample 1330a of the upper coding unit 1320a. Also, a method of determining a coding unit at a certain location by using, as information indicating locations of samples included in coding units, coordinates of the samples is not limited to the above, and various arithmetic methods capable of using coordinates of samples may be used.

According to an embodiment, the video decoding apparatus 100 may split the current coding unit 1300 into the plurality of coding units 1320a through 1320c, and select a coding unit from the coding units 1320a through 1320c according to a certain standard. For example, the video decoding apparatus 100 may select the coding unit 1320b having a different size from among the coding units 1320a through 1320c.

According to an embodiment, the video decoding apparatus 100 may determine widths or heights of the coding units 1320a through 1320c by respectively using the (xa, ya) coordinates, i.e., the information indicating the location of the upper left sample 1330a of the upper coding unit 1320a, the (xb, yb) coordinates, i.e., the information indicating the location of the upper left sample 1330b of the center coding unit 1320b, and the (xc, yc) coordinates, i.e., the information indicating the location of the upper left sample 1330c of the lower coding unit 1320c. The video decoding apparatus 100 may determine the sizes of the coding units 1320a through 1320c by respectively using the coordinates (xa, ya), (xb, yb), and (xc, yc) indicating the locations of the coding units 1320a through 1320c.

According to an embodiment, the video decoding apparatus 100 may determine the width of the upper coding unit 1320a to be xb-xa, and the height to be yb-ya. According to an embodiment, the video decoding apparatus 100 may determine the width of the center coding unit 1320b to be xc-xb, and the height to be yc-yb. According to an embodiment, the video decoding apparatus 100 may determine the width or height of the lower coding unit 1320c by using the width and height of the current coding unit 1300 and the widths and heights of the upper coding unit 1320a and center coding unit 1320b. The video decoding apparatus 100 may determine a coding unit having a different size from other coding units based on the determined widths and heights of the coding units 1320a through 1320c. Referring to FIG. 13, the video decoding apparatus 100 may determine the center coding unit 1320b having a size different from those of the upper coding unit 1320a and lower coding unit 1320c as a coding unit at a certain location. However, processes of the video decoding apparatus 100 determining a coding unit having a different size from other coding units are only an example of determining a coding unit at a certain location by using sizes of coding units determined based on sample coordinates, and thus various processes of determining a coding unit at a certain location by comparing sizes of coding units determined according to certain sample coordinates may be used.

However, a location of a sample considered to determine a location of a coding unit is not limited to the upper left as described above, and information about a location of an arbitrary sample included in a coding unit may be used.

According to an embodiment, the video decoding apparatus 100 may select a coding unit at a certain location from among an odd number of coding units determined when a current coding unit is split, while considering a shape of the current coding unit. For example, when the current coding unit has a non-square shape in which a width is longer than a height, the video decoding apparatus 100 may determine a coding unit at a certain location in a horizontal direction. In other words, the video decoding apparatus 100 may determine one of coding units having a different location in the horizontal direction and set a limit on the one coding unit. When the current coding unit has a non-square shape in which a height is longer than a width, the video decoding apparatus 100 may determine a coding unit at a certain location in a vertical direction. In other words, the video decoding apparatus 100 may determine one of coding units having a different location in the vertical direction and set a limit on the one coding unit.

According to an embodiment, the video decoding apparatus 100 may use information indicating a location of each of an even number of coding units so as to determine a coding unit at a certain location from among the even number of coding units. The video decoding apparatus 100 may determine the even number of coding units by splitting a current coding unit, and determine the coding unit at the certain location by using information about the locations of the even number of coding units. Detailed processes thereof may correspond to those of determining a coding unit at a certain location (for example, a center location) from among an odd number of coding units described in FIG. 13, and thus details thereof are not provided again.

According to an embodiment, when a current coding unit having a non-square shape is split into a plurality of coding units, certain information about a coding unit at a certain location during splitting processes may be used to determine the coding unit at the certain location from among the plurality of coding units. For example, the video decoding apparatus 100 may use at least one of block shape information and split shape information stored in a sample included in a center coding unit during splitting processes so as to determine a coding unit located at the center from among a plurality of coding units obtained by splitting a current coding unit.

Referring to FIG. 13, the video decoding apparatus 100 may split the current coding unit 1300 into the plurality of coding units 1320a through 1320c based on at least one of block shape information and split shape information, and determine the coding unit 1320b located at the center from among the plurality of coding units 1320a through 1320c. In addition, the video decoding apparatus 100 may determine the coding unit 1320b located at the center considering a location from which at least one of the block shape information and the split shape information is obtained. In other words, at least one of the block shape information and the split shape information of the current coding unit 1300 may be obtained from the sample 1340 located at the center of the current coding unit 1300, and when the current coding unit 1300 is split into the plurality of coding units 1320a through 1320c based on at least one of the block shape information and the split shape information, the coding unit 1320b including the sample 1340 may be determined as a coding unit located at the center. However, information used to determine a coding unit located at the center is not limited to at least one of the block shape information and the split shape information, and various types of information may be used while determining a coding unit located at the center.

According to an embodiment, certain information for identifying a coding unit at a certain location may be obtained from a certain sample included in a coding unit to be determined. Referring to FIG. 13, the video decoding apparatus 100 may use at least one of block shape information and split shape information obtained from a sample at a certain location in the current coding unit 1300 (for example, a sample located at the center of the current coding unit 1300), so as to determine a coding unit at a certain location (for example, a coding unit located at the center from among a plurality of coding units) from among the plurality of coding units 1320a through 1320c determined when the current coding unit 1300 is split. In other words, the video decoding apparatus 100 may determine the sample at the certain location considering a block shape of the current coding unit 1300, and determine and set a certain limit on the coding unit 1320b including a sample from which certain information (for example, at least one of block shape information and split shape information) is obtainable, from among the plurality of coding units 1320a through 1320c determined when the current coding unit 1300 is split. Referring to FIG. 13, according to an embodiment, the video decoding apparatus 100 may determine, as a sample from which certain information is obtainable, the sample 1340 located at the center of the current coding unit 1300, and set a certain limit on the coding unit 1320b including such a sample 1340 during decoding processes. However, a location of a sample from which certain information is obtainable is not limited to the above, and may be a sample at an arbitrary location included in the coding unit 1320b determined to set a limit.

According to an embodiment, a location of a sample from which certain information is obtainable may be determined according to a shape of the current coding unit 1300. According to an embodiment, block shape information may determine whether a shape of a current coding unit is square or non-square, and determine a location of a sample from which certain information is obtainable according to the shape. For example, the video decoding apparatus 100 may determine, as a sample from which certain information is obtainable, a sample located on a boundary of splitting at least one of a width and a height of a current coding unit into halves by using at least one of information about the width of the current coding unit and information about the height of the current coding unit. As another example, when block shape information related to a current coding unit indicates a non-square shape, the video decoding apparatus 100 may determine, as a sample from which certain information is obtainable, one of samples adjacent to a boundary of splitting long sides of the current coding unit into halves.

According to an embodiment, when a current coding unit is split into a plurality of coding units, the video decoding apparatus 100 may use at least one of block shape information and split shape information so as to determine a coding unit at a certain location from among the plurality of coding units. According to an embodiment, the video decoding apparatus 100 may obtain at least one of block shape information and split shape information from a sample at a certain location included in a coding unit, and may split a plurality of coding units generated as a current coding unit is split by using at least one of the split shape information and the block shape information obtained from the sample at the certain location included in each of the plurality of coding units. In other words, a coding unit may be recursively split by using at least one of block shape information and split shape information obtained from a sample at a certain location included in each coding unit. Since processes of recursively splitting a coding unit have been described above with reference to FIG. 12, details thereof are not provided again.

According to an embodiment, the video decoding apparatus 100 may determine at least one coding unit by splitting a current coding unit, and determine an order of decoding the at least one coding unit according to a certain block (for example, the current coding unit).

Figure 14:
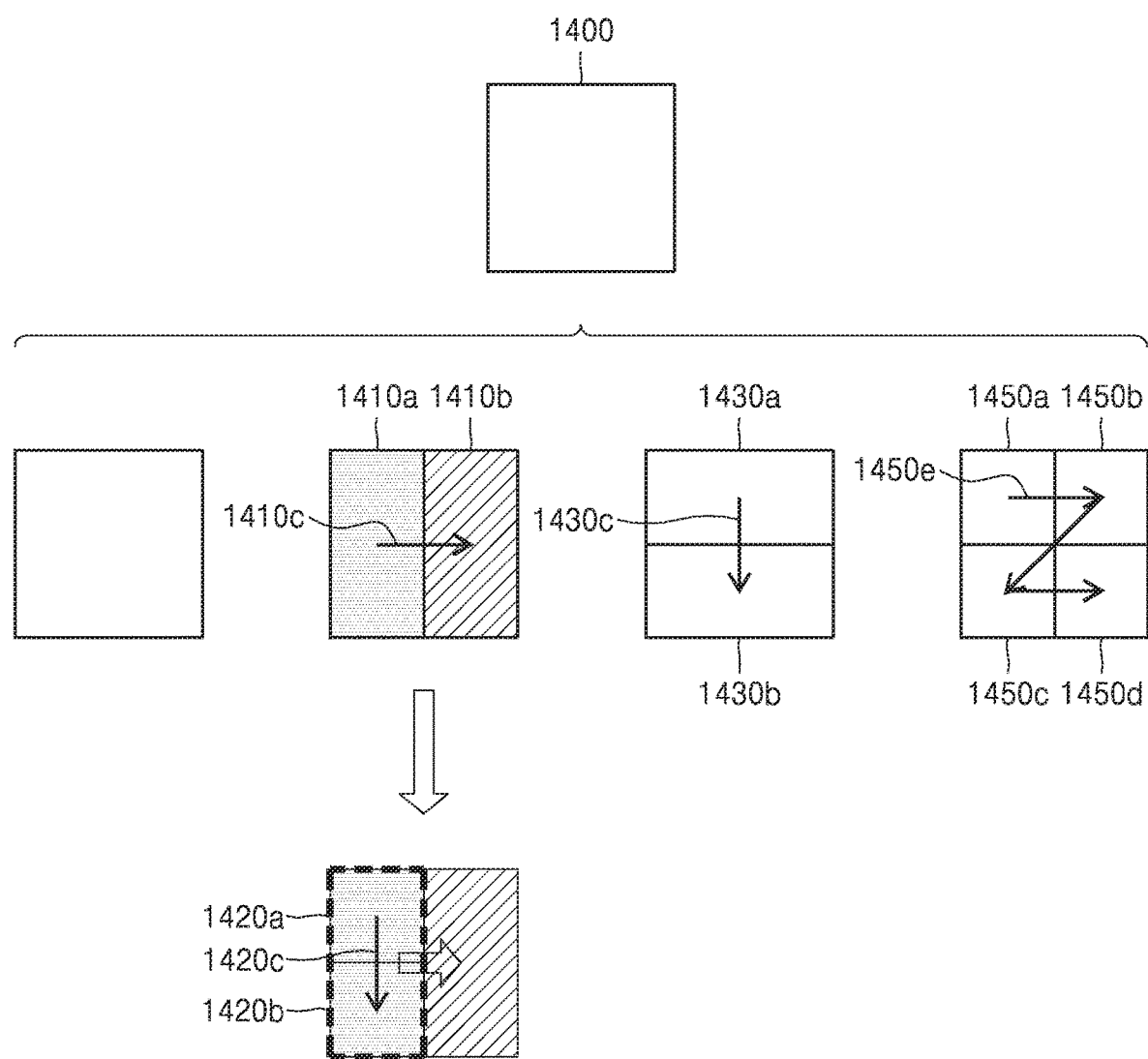
FIG. 14 illustrates an order of processing a plurality of coding units when the plurality of coding units are determined when a current coding unit is split, according to an embodiment.

FIG. 14 illustrates an order of processing a plurality of coding units when the plurality of coding units are determined when the video decoding apparatus 100 splits a current coding unit, according to an embodiment.

According to an embodiment, the video decoding apparatus 100 may determine second coding units 1410a and 1410b by splitting a first coding unit 1400 in a vertical direction, determine second coding units 1430a and 1430b by splitting the first coding unit 1400 in a horizontal direction, or determine second coding units 1450a through 1450d by splitting the first coding unit 140 in horizontal and vertical directions, according to block shape information and split shape information.

Referring to FIG. 14, the video decoding apparatus 100 may determine the second coding units 1410a and 1410b, which are determined by splitting the first coding unit 1400 in the vertical direction, to be processed in a horizontal direction 1410c. The video decoding apparatus 100 may determine the second coding units 1430a and 1430b, which are determined by splitting the first coding unit 1400 in the horizontal direction, to be processed in a vertical direction 1430c. The video decoding apparatus 100 may determine the second coding units 1450a through 1450d, which are determined by splitting the first coding unit 1400 in the vertical and horizontal directions, to be processed) according to a certain order in which coding units located in one row is processed and then coding units located in a next row is processed (for example, a raster scan order or a z-scan order 1450e).

According to an embodiment, the video decoding apparatus 100 may recursively split coding units. Referring to FIG. 14, the video decoding apparatus 100 may determine the plurality of second coding units 1410a and 1410b, 1430a and 1430b, or 1450a through 1450d by splitting the first coding unit 1400, and recursively split each of the plurality of second coding units 1410a and 1410b, 1430a and 1430b, or 1450a through 1450d. A method of splitting the plurality of second coding units 1410a and 1410b, 1430a and 1430b, or 1450a through 1450d may correspond to a method of splitting the first coding unit 1400. Accordingly, each of the plurality of second coding units 1410a and 1410b, 1430a and 1430b, or 1450a through 1450d may be independently split into a plurality of coding units. Referring to FIG. 14, the video decoding apparatus 100 may determine the second coding units 1410a and 1410b by splitting the first coding unit 1400 in the vertical direction, and in addition, determine that each of the second coding units 1410a and 1410b is independently split or not split.

According to an embodiment, the video decoding apparatus 100 may split the second coding unit 1410a at the left in a horizontal direction into third coding units 1420a and 1420b, and may not split the second coding unit 1410b at the right.

According to an embodiment, an order of processing coding units may be determined based on split processes of coding units. In other words, an order of processing coding units that are split may be determined based on an order of processing coding units before being split. The video decoding apparatus 100 may determine an order of processing the third coding units 1420a and 1420b determined when the second coding unit 1410a at the left is split independently from the second coding unit 1410b at the right. Since the third coding units 1420a and 1420b are determined when the second coding unit 1410a at the left is split in a horizontal direction, the third coding units 1420a and 1420b may be processed in a vertical direction 1420c. Also, since an order of processing the second coding unit 1410a at the left and the second coding unit 1410b at the right corresponds to the horizontal direction 1410c, the second coding unit 1410b at the right may be processed after the third coding units 1420a and 1420b included in the second coding unit 1410a at the left are processed in the vertical direction 1420c. The above descriptions are related processes of determining an order of processing coding units according to coding units before being split, but such processes are not limited to the above embodiments, and any method of independently processing, in a certain order, coding units split into various shapes may be used.

Figure 15:
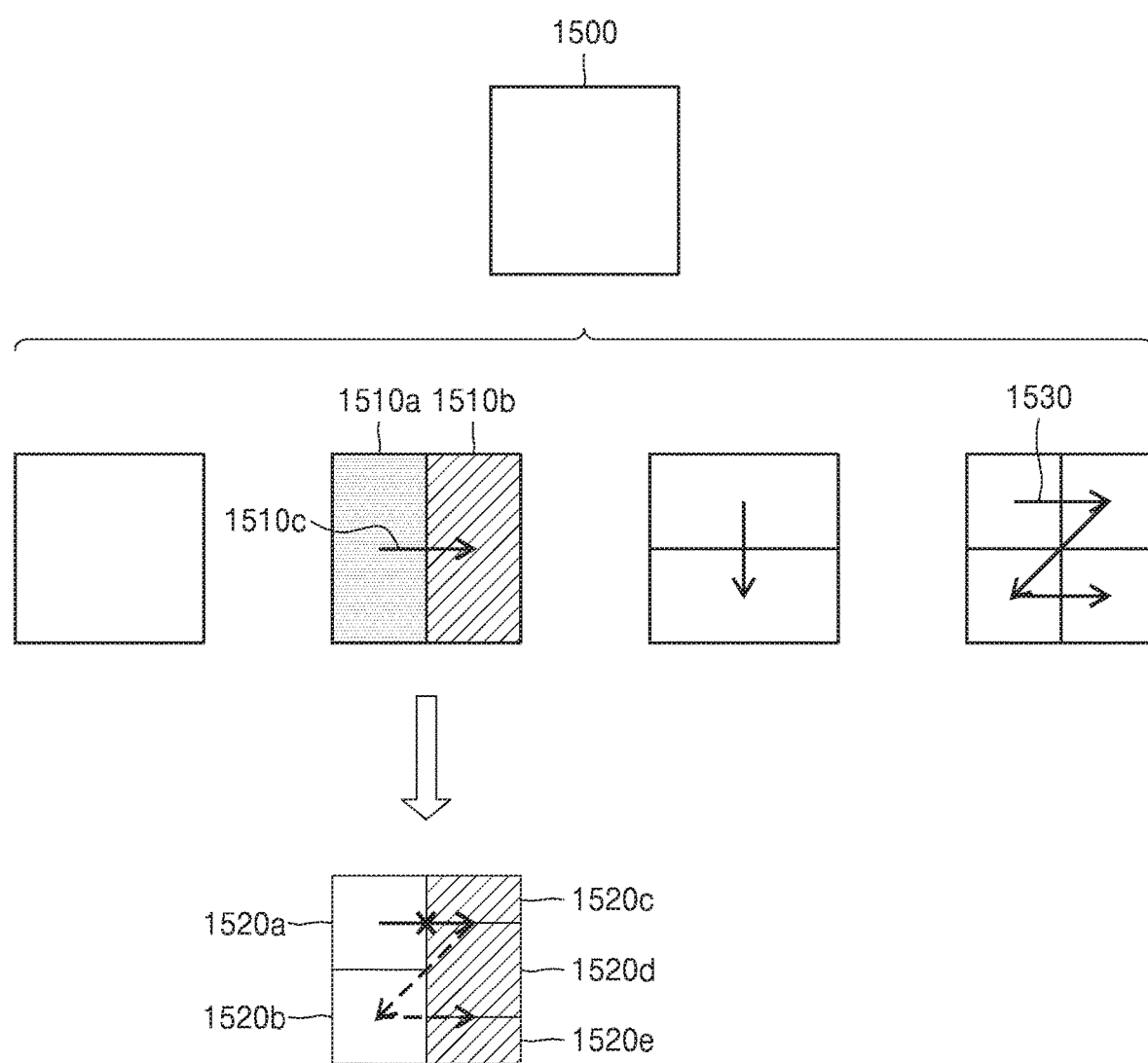
FIG. 15 illustrates processes of determining that a current coding unit is split into an odd number of coding units when coding units are not processable in a certain order, according to an embodiment.

FIG. 15 illustrates processes of determining that a current coding unit is split into an odd number of coding units when coding units are not processable in a certain order by the video decoding apparatus 100, according to an embodiment.

According to an embodiment, the video decoding apparatus 100 may determine that a current coding unit is split into an odd number of coding units based on obtained block shape information and split shape information. Referring to FIG. 15, a first coding unit 1500 having a square shape may be split into second coding units 1510a and 1510b having a non-square shape, and the second coding units 1510a and 1510b may be independently respectively split into third coding units 1520a and 1520b, and 1520c through 1520e. According to an embodiment, the video decoding apparatus 100 may split the second coding unit 1510a at the left from among the second coding units 1510a and 1510b into a horizontal direction to determine the plurality of third coding units 1520a and 1520b, and split the second coding unit 1510b at the right into the odd number of third coding units 1520c through 1520e.

According to an embodiment, the video decoding apparatus 100 may determine whether a coding unit split into an odd number exists by determining whether the third coding units 1520a through 1520e are processable in a certain order. Referring to FIG. 15, the video decoding apparatus 100 may determine the third coding units 1520a through 1520e by recursively splitting the first coding unit 1500. The video decoding apparatus 100 may determine, based on at least one of block shape information and split shape information, whether a coding unit is split into an odd number from among shapes into which the first coding unit 1500, the second coding units 1510a and 1510b, or the third coding units 1520a through 1520e are split. For example, the second coding unit 1510b at the right from among the second coding units 1510a and 1510b may be split into the odd number of third coding units 1520c through 1520e. An order of processing a plurality of coding units included in the first coding unit 1500 may be a certain order (for example, a z-scan order 1530), and the video decoding apparatus 100 may determine whether the third coding units 1520c through 1520e determined when the second coding unit 1510b at the right is split into an odd number satisfy a condition of being processable according to the certain order.

According to an embodiment, the video decoding apparatus 100 may determine whether the third coding units 1520a through 1520e included in the first coding unit 1500 satisfy a condition of being processable according to a certain order, wherein the condition is related to whether at least one of a width and a height of each of the second coding units 1510a and 1510b is split into halves according to boundaries of the third coding units 1520a through 1520e. For example, the third coding units 1520a and 1520b determined when the height of the second coding unit 1510a at the left and having a non-square shape is split into halves satisfy the condition, but it may be determined that the third coding units 1520c through 1520e do not satisfy the condition because the boundaries of the third coding units 1520c through 1520e that are determined when the second coding unit 1510b at the right is split into three coding units do not split the width or height of the second coding unit 1510b at the right into halves. The video decoding apparatus 100 may determine disconnection of a scan order when the condition is not satisfied, and determine that the second coding unit 1510b at the right is split into the odd number of coding units, based on a result of the determination. According to an embodiment, the video decoding apparatus 100 may set a certain limit on a coding unit at a certain location from among an odd number of coding units obtained by splitting a coding unit, and since such a limit or certain location has been described above through various embodiments, details thereof are not provided again.

Figure 16:
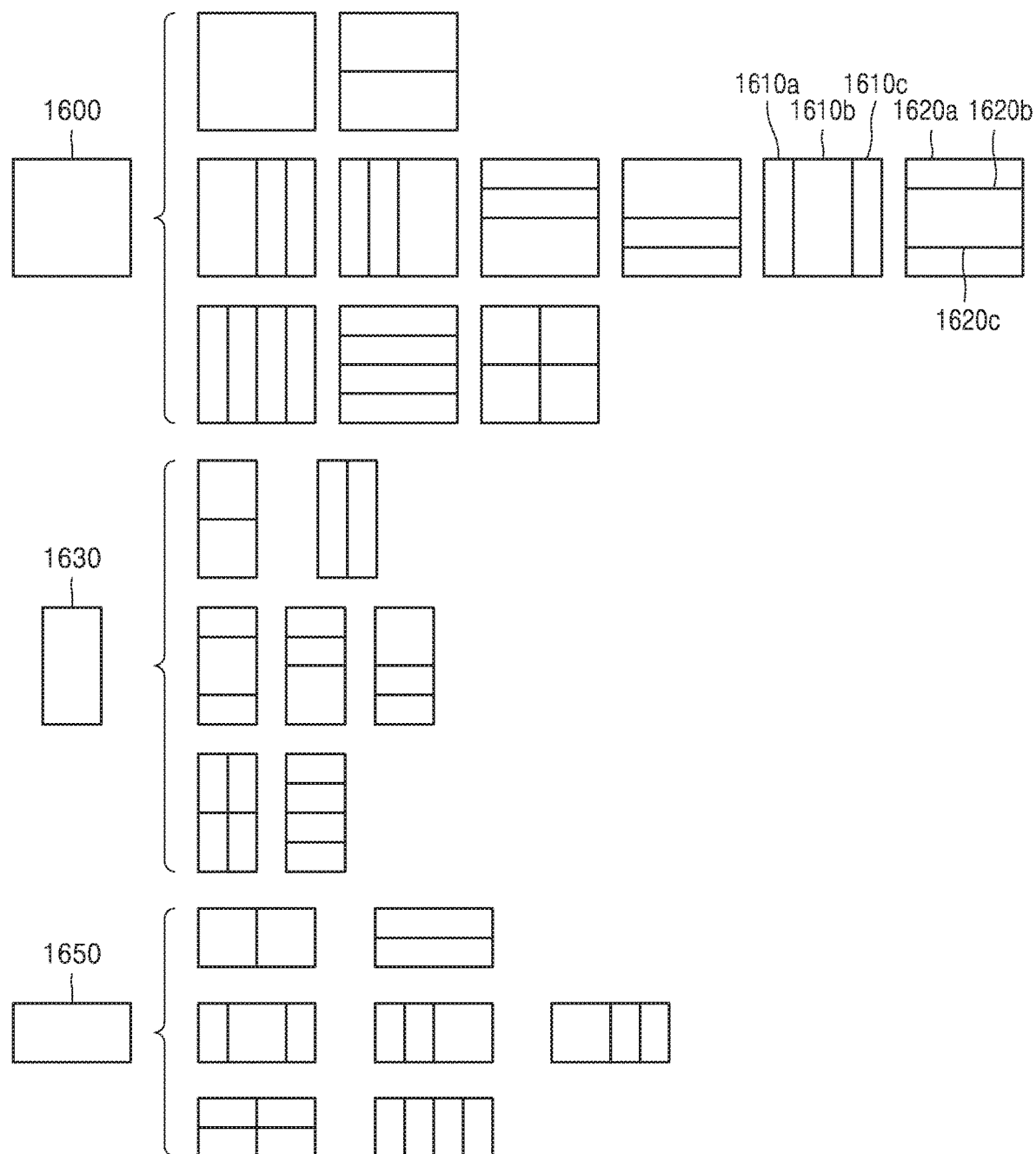
FIG. 16 illustrates processes of determining at least one coding unit when a first coding unit is split, according to an embodiment.

FIG. 16 illustrates processes of determining at least one coding unit when the video decoding apparatus 100 splits a first coding unit 1600, according to an embodiment. According to an embodiment, the video decoding apparatus 100 may split the first coding unit 1600 based on at least one of block shape information and split shape information obtained through the obtainer 105). The first coding unit 1600 having a square shape may be split into four coding units having a square shape or a plurality of coding units having a non-square shape. For example, referring to FIG. 16, when block shape information indicates that the first coding unit 1600 is a square and split shape information indicates a split into non-square coding units, the video decoding apparatus 100 may split the first coding unit 1600 into a plurality of non-square coding units. In detail, when split shape information indicates that an odd number of coding units are determined by splitting the first coding unit 1600 in a horizontal direction or a vertical direction, the video decoding apparatus 100 may determine, as the odd number of coding units, second coding units 1610a through 1610c by splitting the first coding unit 1600 having a square shape in a vertical direction, or second coding units 1620a through 1620c by splitting the first coding unit 1600 in a horizontal direction.

According to an embodiment, the video decoding apparatus 100 may determine whether the second coding units 1610a through 1610c and 1620a through 1620c included in the first coding unit 1600 satisfy a condition of being processable in a certain order, wherein the condition is related to whether at least one of a width and a height of the first coding unit 1600 is split into halves according to boundaries of the second coding units 1610a through 1610c and 1620a through 1620c. Referring to FIG. 16, since the boundaries of the second coding units 1610a through 1610c determined when the first coding unit 1600 having a square shape is split in a vertical direction do not split the width of the first coding unit 1600 into halves, it may be determined that the first coding unit 1600 does not satisfy the condition of being processable in a certain order. Also, since the boundaries of the second coding units 1620a through 1620c determined when the first coding unit 1600 having a square shape is split in a horizontal direction do not split the height of the first coding unit 1600 into halves, it may be determined that the first coding unit 1600 does not satisfy the condition of being processable in a certain order. The video decoding apparatus 100 may determine disconnection of a scan order when the condition is not satisfied, and determine that the first coding unit 1600 is split into the odd number of coding units based on a result of the determination. According to an embodiment, the video decoding apparatus 100 may set a certain limit on a coding unit at a certain location from among an odd number of coding units obtained by splitting a coding unit, and since such a limit or certain location has been described above through various embodiments, details thereof are not provided again.

According to an embodiment, the video decoding apparatus 100 may determine coding units having various shapes by splitting a first coding unit.

Referring to FIG. 16, the video decoding apparatus 100 may split the first coding unit 1600 having a square shape and a first coding unit 1630 or 1650 having a non-square shape into coding units having various shapes.

Figure 17:
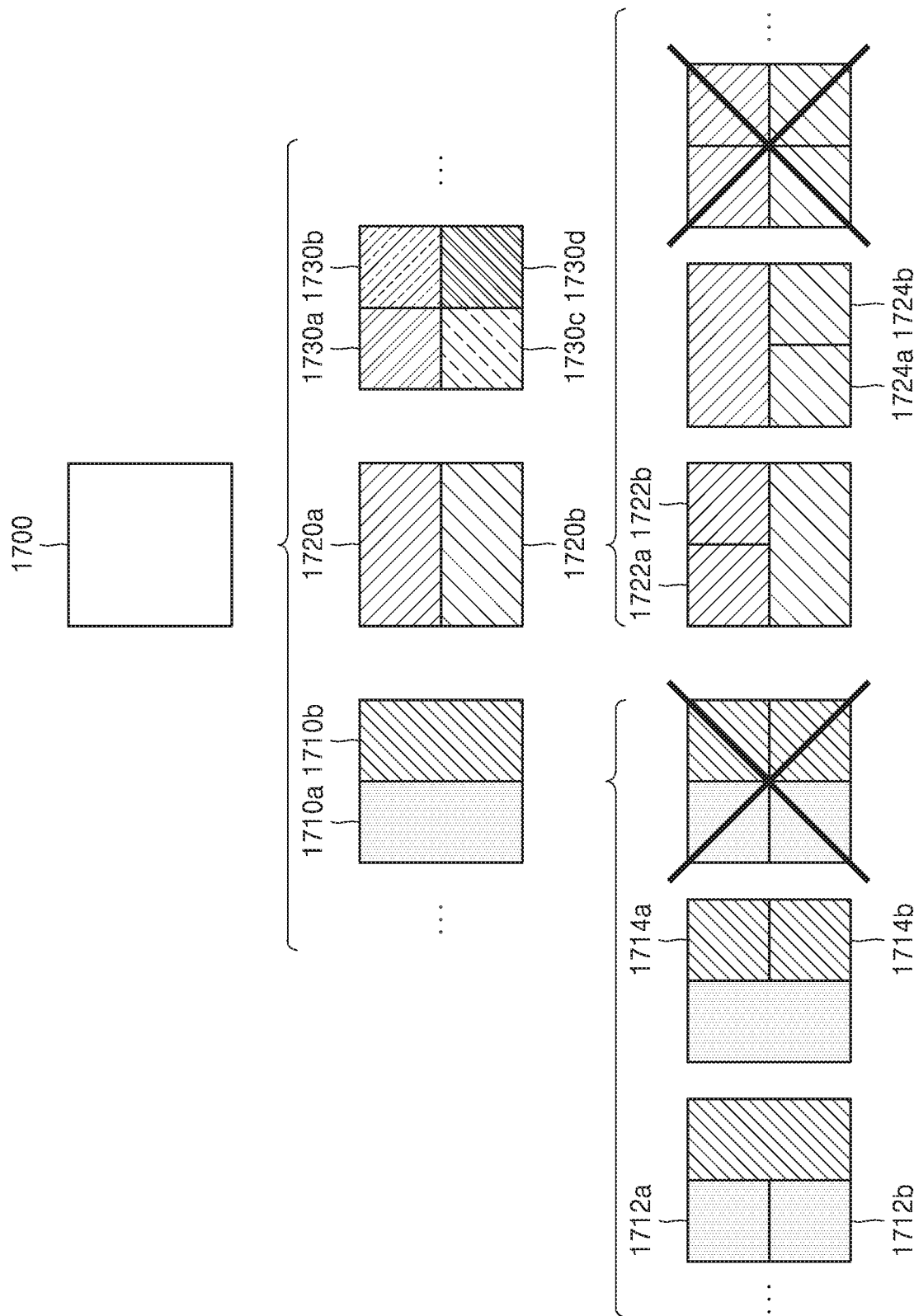
FIG. 17 illustrates that a shape into which a second coding unit is splittable is restricted when the second coding unit having a non-square shape determined when a first coding unit is split satisfies a certain condition, according to an embodiment.

FIG. 17 illustrates that a shape into which a second coding unit is splittable by the video decoding apparatus 100 is restricted when the second coding unit having a non-square shape determined when a first coding unit 1700 is split satisfies a certain condition, according to an embodiment.

According to an embodiment, the video decoding apparatus 100 may determine that the first coding unit 1700 having a square shape is split into second coding units 1710a and 1710b or 1720a and 1720b having a non-square shape, based on at least one of block shape information and split shape information obtained through the obtainer 105. The second coding units 1710a and 1710b or 1720a and 1720b may be independently split. Accordingly, the video decoding apparatus 100 may determine that the second coding units 1710a and 1710b or 1720a and 1720b are split into a plurality of coding units or are not split based on at least one of block shape information and split shape information related to each of the coding units 1710a and 1710b or 1720a and 1720b. According to an embodiment, the video decoding apparatus 100 may determine third coding units 1712a and 1712b by splitting, in a horizontal direction, the second coding unit 1710a at the left having a non-square shape, which is determined when the first coding unit 1700 is split in a vertical direction. However, when the second coding unit 1710a at the left is split in the horizontal direction, the video decoding apparatus 100 may set a limit that the second coding unit 1710b at the right is not split in the horizontal direction like the second coding unit 1710a at the left. When third coding units 1714a and 1714b are determined when the second coding unit 1710b at the right is split in the same direction, i.e., the horizontal direction, the third coding units 1712a, 1712b, 1714a, and 1714b are determined when the second coding units 1710a at the left and the second coding unit 1710b at the right are each independently split in the horizontal direction. However, this is the same result as splitting the first coding unit 1700 into four second coding units 1730a through 1730d having a square shape based on at least one of block shape information and split shape information, and thus may be inefficient in terms of image decoding.

According to an embodiment, the video decoding apparatus 100 may determine third coding units 1722a and 1722b or 1724a, and 1724b by splitting, in a vertical direction, the second coding unit 1720a or 1720b having a non-square shape determined when the first coding unit 1700 is split in the horizontal direction. However, when one of second coding units (for example, the second coding unit 1720a at the top) is split in a vertical direction, the video decoding apparatus 100 may set a limit that the other second coding unit (for example, the second coding unit 1720b at the bottom) is not split in the vertical direction like the second coding unit 1720a at the top for the above described reasons.

Figure 18:
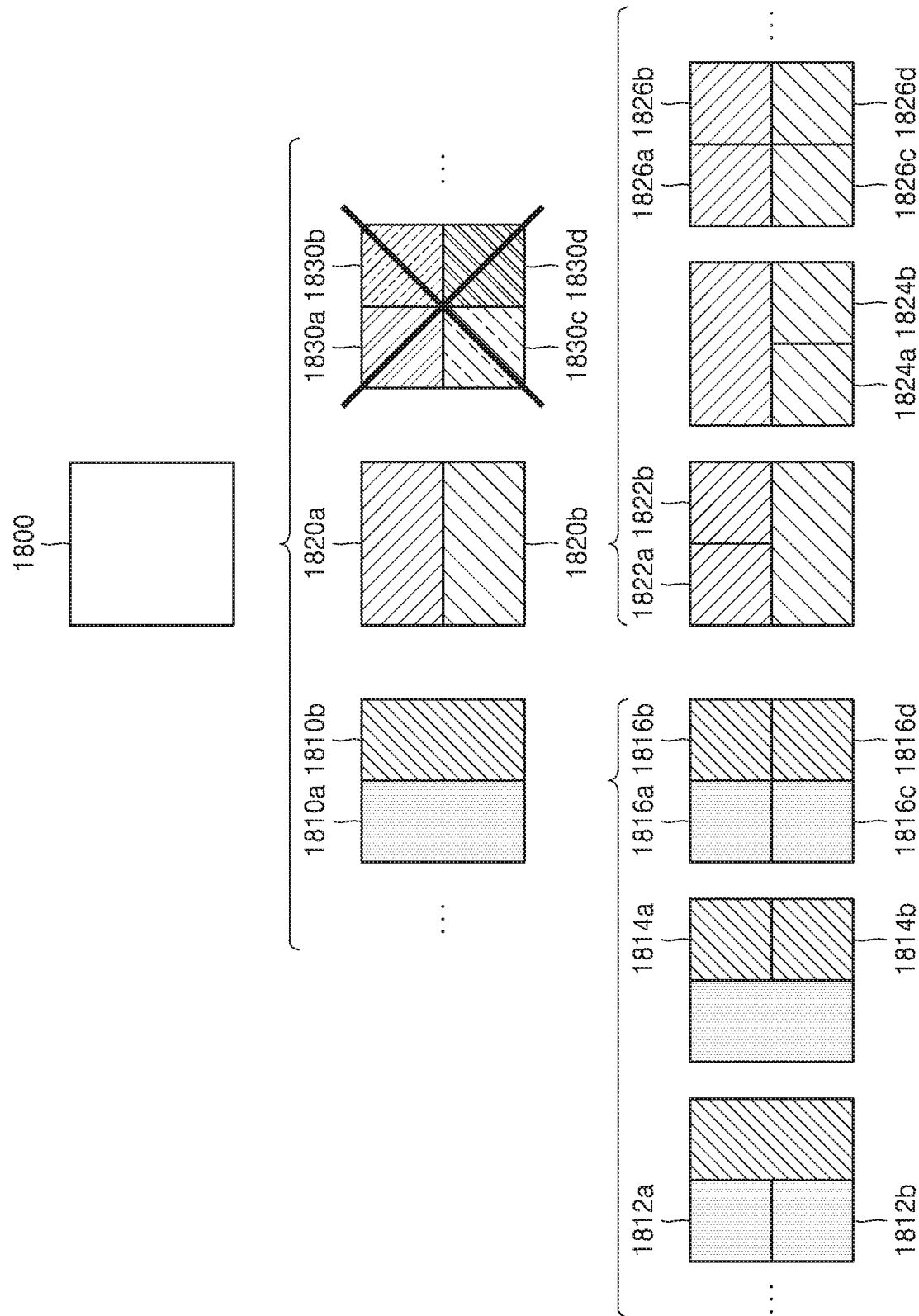
FIG. 18 illustrates processes of splitting a coding unit having a square shape when split shape information is unable to indicate that a coding unit is split into four square shapes, according to an embodiment.

FIG. 18 illustrates processes of the video decoding apparatus 100 splitting a coding unit having a square shape when split shape information is unable to indicate that a coding unit is split into four square shapes, according to an embodiment.

According to an embodiment, the video decoding apparatus 100 may determine second coding units 1810a and 1810b, or 1820a and 1820b, by splitting a first coding unit 1800 based on at least one of block shape information and split shape information. Split shape information may include information about various shapes into which a coding unit may be split, but such information about various shapes may not include information for splitting a coding unit into four square coding units. According to such split shape information, the video decoding apparatus 100 is unable to split the first coding unit 1800 having a square shape into four second coding units 1830 through 1830d having a square shape. The video decoding apparatus 100 may determine the second coding units 1810a and 1810b, or 1820a and 1820b having a non-square shape based on the split shape information.

According to an embodiment, the video decoding apparatus 100 may independently split each of the second coding units 1810a and 1810b, or 1820a and 1820b having a non-square shape. Each of the second coding units 1810a and 1810b, or 1820a and 1820b may be split in a certain order via a recursive method that may be a split method corresponding to a method of splitting the first coding unit 1800 based on at least one of the block shape information and the split shape information.

For example, the video decoding apparatus 100 may determine third coding units 1812a and 1812b having a square shape by splitting the second coding unit 1810a at the left in a horizontal direction, or determine third coding units 1814a and 1814b having a square shape by splitting the second coding unit 1810b at the right in a horizontal direction. In addition, the video decoding apparatus 100 may determine third coding units 1816a through 1816d having a square shape by splitting both the second coding unit 1810a at the left and the second coding unit 1810b at the right in the horizontal direction. In this case, coding units may be determined in the same manner as when the first coding unit 1800 is split into four second coding units 1830a through 1830d having a square shape.

As another example, the video decoding apparatus 100 may determine third coding units 1822a and 1822b having a square shape by splitting the second coding unit 1820a at the top in a vertical direction, and determine third coding units 1824a and 1824b having a square shape by splitting the second coding unit 1820b at the bottom in a vertical direction. In addition, the video decoding apparatus 100 may determine third coding units 1826a through 1826d having a square shape by splitting both the second coding unit 1820a at the top and the second coding unit 1820b at the bottom in the vertical direction. In this case, coding units may be determined in the same manner as when the first coding unit 1800 is split into four second coding units 1830a through 1830d having a square shape.

Figure 19:
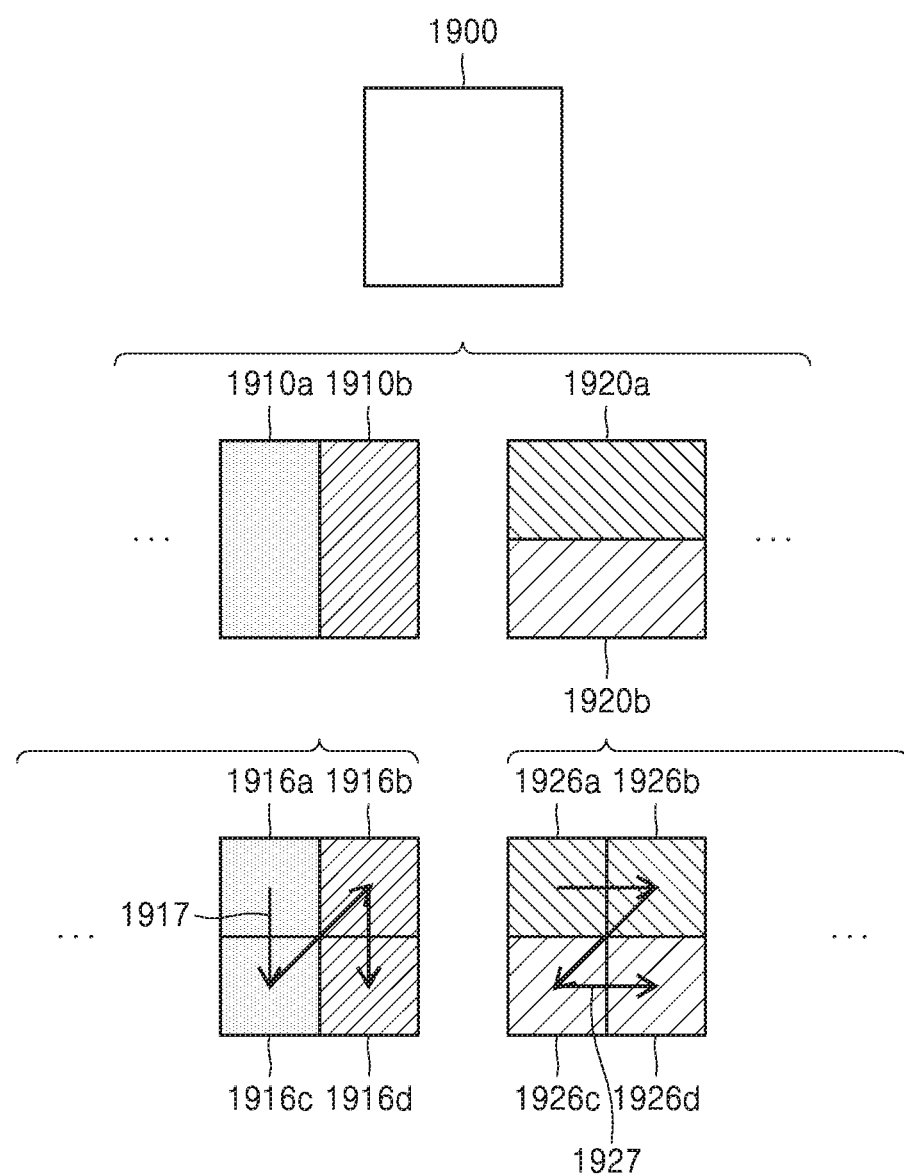
FIG. 19 illustrates that an order of processing a plurality of coding units may be changed according to processes of splitting a coding unit, according to an embodiment.

FIG. 19 illustrates that an order of processing a plurality of coding units may be changed according to processes of splitting a coding unit, according to an embodiment.

According to an embodiment, the video decoding apparatus 100 may split a first coding unit 1900 based on block shape information and split shape information. When the block shape information indicates a square shape and the split shape information indicates that the first coding unit 1900 is split in at least one of a horizontal direction and a vertical direction, the video decoding apparatus 100 may split the first coding unit 1900 to determine second coding units 1910a and 1910b, or 1920a and 1920b. Referring to FIG. 19, the second coding units 1910a and 1910b, or 1920a and 1920b having a non-square shape and determined when the first coding unit 1900 is split in the horizontal direction or the vertical direction may each be independently split based on block shape information and split shape information. For example, the video decoding apparatus 100 may determine third coding units 1916a through 1916d by splitting, in the horizontal direction, each of the second coding units 1910a and 1910b generated as the first coding unit 1900 is split in the vertical direction, or determine third coding units 1926a through 1926d by splitting, in the horizontal direction, the second coding units 1920a and 1920b generated as the first coding unit 1900 is split in the horizontal direction. Processes of splitting the second coding units 1910a and 1910b, or 1920a and 1920b have been described above with reference to FIG. 17, and thus details thereof are not provided again.

According to an embodiment, the video decoding apparatus 100 may process coding units according to a certain order. Features about processing coding units according to a certain order have been described above with reference to FIG. 14, and thus details thereof are not provided again. Referring to FIG. 19, the video decoding apparatus 100 may determine four third coding units 1916a through 1916d or 1926a through 1926d having a square shape by splitting the first coding unit 1900 having a square shape. According to an embodiment, the video decoding apparatus 100 may determine an order of processing the third coding units 1916a through 1916d or 1926a through 1926d based on how the first coding unit 1900 is split.

According to an embodiment, the video decoding apparatus 100 may determine the third coding units 1916a through 1916d by splitting, in the horizontal direction, the second coding units 1910a and 1910b generated as the first coding unit 1900 is split in the vertical direction, and process the third coding units 1916a through 1916d according to an order 1917 of first processing, in the vertical direction, the third coding units 1916a and 1916b included in the second coding unit 1910a at the left, and then processing, in the vertical direction, the third coding units 1916c and 1916d included in the second coding unit 1910b at the right.

According to an embodiment, the video decoding apparatus 100 may determine the third coding units 1926a through 1926d by splitting, in the vertical direction, the second coding units 1920a and 1920b generated as the first coding unit 1900 is split in the horizontal direction, and process the third coding units 1926a through 1926d according to an order 1927 of first processing, in the horizontal direction, the third coding units 1926a and 1926b included in the second coding unit 1920a at the top, and then processing, in the horizontal direction, the third coding units 1926c and 1926d included in the second coding unit 1920b at the bottom.

Referring to FIG. 19, the third coding units 1916a through 1916d or 1926a through 1926d having a square shape may be determined when the second coding units 1910a and 1910b, or 1920a and 1920b are each split. The second coding units 1910a and 1910b determined when the first coding unit 1900 is split in the vertical direction and the second coding units 1920a and 1920b determined when the first coding unit 1900 is split in the horizontal direction are split in different shapes, but according to the third coding units 1916a through 1916d and 1926a through 1926d determined afterwards, the first coding unit 1900 is split in coding units having same shapes. Accordingly, the video decoding apparatus 100 may process pluralities of coding units determined in same shapes in different orders even when the coding units having the same shapes are consequently determined when coding units are recursively split through different processes based on at least one of block shape information and split shape information.

FIG. 20 illustrates processes of determining a depth of a coding unit as a shape and size of the coding unit are changed, when a plurality of coding units are determined when the coding unit is recursively split, according to an embodiment.

According to an embodiment, the video decoding apparatus 100 may determine a depth of a coding unit according to a certain standard. For example, the certain standard may be a length of a long side of the coding unit. When a length of a long side of a current coding unit is split 2n times shorter than a length of a long side of a coding unit before being split, it may be determined that a depth of the current coding unit is increased n times a depth of the coding unit before being split, wherein n>0. Hereinafter, a coding unit having an increased depth is referred to as a coding unit of a lower depth.

Referring to FIG. 20, the video decoding apparatus 100 may determine a second coding unit 2002 and a third coding unit 2004 of lower depths by splitting a first coding unit 2000 having a square shape, based on block shape information indicating a square shape (for example, block shape information may indicate '0:SQURE'), according to an embodiment. When a size of the first coding unit 2000 having a square shape is 2N×2N, the second coding unit 2002 determined by splitting a width and a height of the first coding unit 2000 by ½^1 may have a size of N×N. In addition, the third coding unit 2004 determined by splitting a width and a height of the second coding unit 2002 by ½ may have a size of N/2×N/2. In this case, a width and a height of the third coding unit 2004 corresponds to ½^2 of the first coding unit 2000. When a depth of first coding unit 2000 is D, a depth of the second coding unit 2002 having ½^1 of the width and the height of the first coding unit 2000 may be D+1, and a depth of the third coding unit 2004 having ½^2 of the width and the height of the first coding unit 2000 may be D+2.

According to an embodiment, the video decoding apparatus 100 may determine a second coding unit 2012 or 2022 and a third coding unit 2014 or 2024 by splitting a first coding unit 2010 or 2020 having a non-square shape, based on block shape information indicating a non-square shape (for example, block shape information may indicate '1:NS_VER' indicating a non-square shape in which a height is longer than a width, or '2:NS_HOR' indicating a non-square shape in which a width is longer than a height), according to an embodiment.

The video decoding apparatus 100 may determine a second coding unit (for example, the second coding unit 2002, 2012, or 2022) by splitting at least one of a width and a height of the first coding unit 2010 having a size of N×2N. In other words, the video decoding apparatus 100 may determine the second coding unit 2002 having a size of N×N or the second coding unit 2022 having a size of N×N/2 by splitting the first coding unit 2010 in a horizontal direction, or determine the second coding unit 2012 having a size of N/2×N by splitting the first coding unit 2010 in horizontal and vertical directions.

The video decoding apparatus 100 may determine a second coding unit (for example, the second coding unit 2002, 2012, or 2022) by splitting at least one of a width and a height of the first coding unit 2020 having a size of 2N×N. In other words, the video decoding apparatus 100 may determine the second coding unit 2002 having a size of N×N or the second coding unit 2012 having a size of N/2×N by splitting the first coding unit 2020 in a vertical direction, or determine the second coding unit 2022 having a size of N×N/2 by splitting the first coding unit 2010 in horizontal and vertical directions.

According to an embodiment, the video decoding apparatus 100 may determine a third coding unit (for example, the third coding unit 2004, 2014, or 2024) by splitting at least one of a width and a height of the second coding unit 2002 having a size of N×N. In other words, the video decoding apparatus 100 may determine the third coding unit 2004 having a size of N/2×N/2, the third coding unit 2014 having a size of N/22×N/2, or the third coding unit 2024 having a size of N/2×N/22 by splitting the second coding unit 2002 in vertical and horizontal directions.

According to an embodiment, the video decoding apparatus 100 may determine a third coding unit (for example, the third coding unit 2004, 2014, or 2024) by splitting at least one of a width and a height of the second coding unit 2022 having a size of N/2×N. In other words, the video decoding apparatus 100 may determine the third coding unit 2004 having a size of N/2×N/2 or the third coding unit 2024 having a size of N/2×N/22 by splitting the second coding unit 2012 in a horizontal direction, or the third coding unit 2014 having a size of N/22×N/2 by splitting the second coding unit 2012 in vertical and horizontal directions.

According to an embodiment, the video decoding apparatus 100 may determine a third coding unit (for example, the third coding unit 2004, 2014, or 2024) by splitting at least one of a width and a height of the second coding unit 2022 having a size of N×N/2. In other words, the video decoding apparatus 100 may determine the third coding unit 2004 having a size of N/2×N/2 or the third coding unit 2014 having a size of N/22×N/2 by splitting the second coding unit 2022 in a vertical direction, or the third coding unit 2024 having a size of N/2×N/22 by splitting the second coding unit 2022 in vertical and horizontal directions.

According to an embodiment, the video decoding apparatus 100 may split a coding unit (for example, the first, second, or third coding unit 2000, 2002, or 2004) having a square shape in a horizontal or vertical direction. For example, the first coding unit 2010 having a size of N×2N may be determined by splitting the first coding unit 2000 having a size of 2N×2N in the vertical direction, or the first coding unit 2020 having a size of 2N×N may be determined by splitting the first coding unit 2000 in the horizontal direction. According to an embodiment, when a depth is determined based on a length of a longest side of a coding unit, a depth of a coding unit determined when the first coding unit 2000 having a size of 2N×2N is split in a horizontal or vertical direction may be the same as a depth of the first coding unit 2000.

According to an embodiment, the width and the height of the third coding unit 2014 or 2024 may be ½^2 of those of the first coding unit 2010 or 2020. When the depth of the first coding unit 2010 or 2020 is D, the depth of the second coding unit 2012 or 2022 that is ½ of the width and the height of the first coding unit 2010 or 2020 may be D+1, and the depth of the third coding unit 2014 or 2024 that is ½^2 of the width and the height of the first coding unit 2010 or 202 may be D+2.

Figure 21:
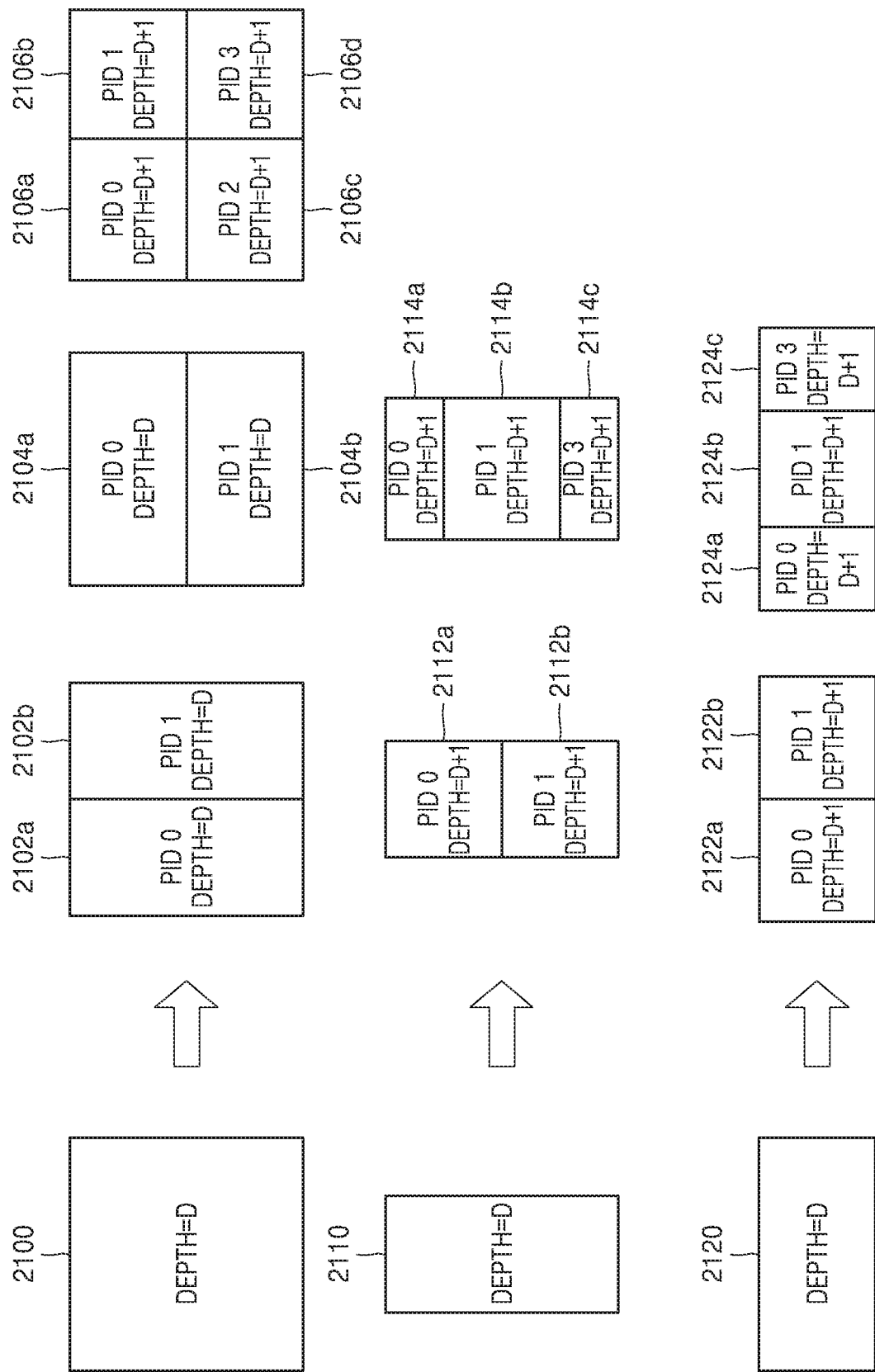
FIG. 21 illustrates a part index (PID) for distinguishing depths and coding units, which may be determined according to shapes and sizes of coding units, according to an embodiment.

FIG. 21 illustrates a part index (PID) for distinguishing depths and coding units, which may be determined according to shapes and sizes of coding units, according to an embodiment.

According to an embodiment, the video decoding apparatus 100 may determine a second coding unit having various shapes by splitting a first coding unit 2100 having a square shape. Referring to FIG. 21, the video decoding apparatus 100 may determine second coding units 2102a and 2102b, 2104a and 2104b, or 2106a through 2106d by splitting the first coding unit 2100 in at least one of a vertical direction and a horizontal direction, according to split shape information. In other words, the video decoding apparatus 100 may determine the second coding units 2102a and 2102b, 2104a and 2104b, or 2106a through 2106d based on split shape information of the first coding unit 2100.

According to an embodiment, a depth of the second coding units 2102a and 2102b, 2104a and 2104b, or 2106a through 2106d determined according to the split shape information of the first coding unit 2100 having a square shape may be determined based on a length of a long side. For example, since a length of one side of the first coding unit 2100 having a square shape is the same as a length of a long side of the second coding units 2102a and 2102b or 2104a and 2104b having a non-square shape, the depths of the first coding unit 2100 and the second coding units 2102a and 2102b or 2104a and 2104b having a non-square shape may be the same, i.e., D. On the other hand, when the video decoding apparatus 100 splits the first coding unit 2100 into the four second coding units 2106a through 2106d having a square shape, based on the split shape information, a length of one side of the second coding units 2106a through 2106d having a square shape is ½ of the length of one side of the first coding unit 2100, the depths of the second coding units 2106a through 2106d may be D+1, i.e., a depth lower than the depth D of the first coding unit 2100.

According to an embodiment, the video decoding apparatus 100 may split a first coding unit 2110, in which a height is longer than a width, in a horizontal direction into a plurality of second coding units 2112a and 2112b or 2114a through 2114c, according to split shape information. According to an embodiment, the video decoding apparatus 100 may split a first coding unit 2120, in which a width is longer III than a height, in a vertical direction into a plurality of second coding units 2122a and 2122b or 2124a through 2124c, according to split shape information.

According to an embodiment, depths of the second coding units 2112a and 2112b, 2114a through 2114c, 2122a and 2122b, or 2124a through 2124c determined according to the split shape information of the first coding unit 2110 or 2120 having a non-square shape may be determined based on a length of a long side. For example, since a length of one side of the second coding units 2112a and 2112b having a square shape is ½ of a length of a long side of the first coding unit 2110 having a non-square shape, in which the height is longer than the width, the depths of the second coding units 2112a and 2112b are D+1, i.e., depths lower than the depth D of the first coding unit 2110 having a non-square shape.

In addition, the video decoding apparatus 100 may split the first coding unit 2110 having a non-square shape into an odd number of second coding units 2114a through 2114c, based on split shape information. The odd number of second coding units 2114a through 2114c may include the second coding units 2114a and 2114c having a non-square shape, and the second coding unit 2114b having a square shape. In this case, since a length of a long side of the second coding units 2114a and 2114c having a non-square shape and a length of one side of the second coding unit 2114b having a square shape are ½ of a length of one side of the first coding unit 2110, depths of the second coding units 2114a through 2114b may be D+1, i.e., a depth lower than the depth D of the first coding unit 2110. The video decoding apparatus 100 may determine depths of coding units related to the first coding unit 2120 having a non-square shape in which a width is longer than a height, in the same manner as the determining of depths of coding units related to the first coding unit 2110.

According to an embodiment, with respect to determining PIDs for distinguishing coding units, when an odd number of coding units do not have the same size, the video decoding apparatus 100 may determine PIDs based on a size ratio of the coding units (. Referring to FIG. 21, the second coding unit 2114b located at the center from the odd number of second coding units 2114a through 2114c may have the same width as the second coding units 2114a and 2114c, but have a height twice higher than those of the second coding units 2114a and 2114c. In this case, the second coding unit 2114b located at the center may include two of the second coding units 2114a and 2114c. Accordingly, when the PID of the second coding unit 2114b located at the center is 1 according to a scan order, the PID of the second coding unit 2114c in a next order may be 3, the PID having increased by 2. In other words, values of the PID may be discontinuous. According to an embodiment, the video decoding apparatus 100 may determine whether an odd number of coding units have the same sizes based on discontinuity of PID for distinguishing the coding units.

According to an embodiment, the video decoding apparatus 100 may determine whether a plurality of coding units determined when a current coding unit is split have certain split shapes based on values of PID. Referring to FIG. 21, the video decoding apparatus 100 may determine the even number of second coding units 2112a and 211b or the odd number of second coding units 2114a through 2114c by splitting the first coding unit 2110 having a rectangular shape in which the height is longer than the width. The video decoding apparatus 100 may use the PID indicating each coding unit so as to distinguish a plurality of coding units. According to an embodiment, a PID may be obtained from a sample at a certain location (for example, an upper left sample) of each coding unit.

According to an embodiment, the video decoding apparatus 100 may determine a coding unit at a certain location from among coding units determined by using PIDs for distinguishing coding units. According to an embodiment, when split shape information of the first coding unit 2110 having a rectangular shape in which a height is longer than a width indicates that the first coding unit 2110 is split into three coding units, the video decoding apparatus 100 may split the first coding unit 2110 into the three second coding units 2114a through 2114c. The video decoding apparatus 100 may assign a PID to each of the three second coding units 2114a through 2114c. The video decoding apparatus 100 may compare PIDs of an odd number of coding units so as to determine a center coding unit from among the coding units. The video decoding apparatus 100 may determine, as a coding unit at a center location from among coding units determined when the first coding unit 2110 is split, the second coding unit 2114b having a PID corresponding to a center value from among PIDs, based on PIDs of the coding units. According to an embodiment, while determining PIDs for distinguishing coding units, when the coding units do not have the same sizes, the video decoding apparatus 100 may determine PIDs based on a size ratio of the coding units. Referring to FIG. 21, the second coding unit 2114b generated when the first coding unit 2110 is split may have the same width as the second coding units 2114a and 2114c, but may have a height twice higher than those of the second coding units 2114a and 2114c. In this case, when the PID of the second coding unit 2114b located at the center is 1, the PID of the second coding unit 2114c in a next order may be 3, the PID having increased by 2. As such, when an increasing range of PIDs differs while uniformly increasing, the video decoding apparatus 100 may determine that a current coding unit is split into a plurality of coding units including a coding unit having a different size from other coding units. According to an embodiment, when split shape information indicates splitting into an odd number of coding units, the video decoding apparatus 100 may split a current coding unit into a plurality of coding units, in which a coding unit at a certain location (for example, a center coding unit) has a size different from other coding units. In this case, the video decoding apparatus 100 may determine the center coding unit having the different size by using PIDs of the coding units. However, a PID, and a size or location of a coding unit at a certain location described above are specified to describe an embodiment, and thus should not be limitedly interpreted, and various PIDs, and various locations and sizes of a coding unit may be used.

According to an embodiment, the video decoding apparatus 100 may use a certain data unit from which recursive splitting of a coding unit is started.

Figure 22:
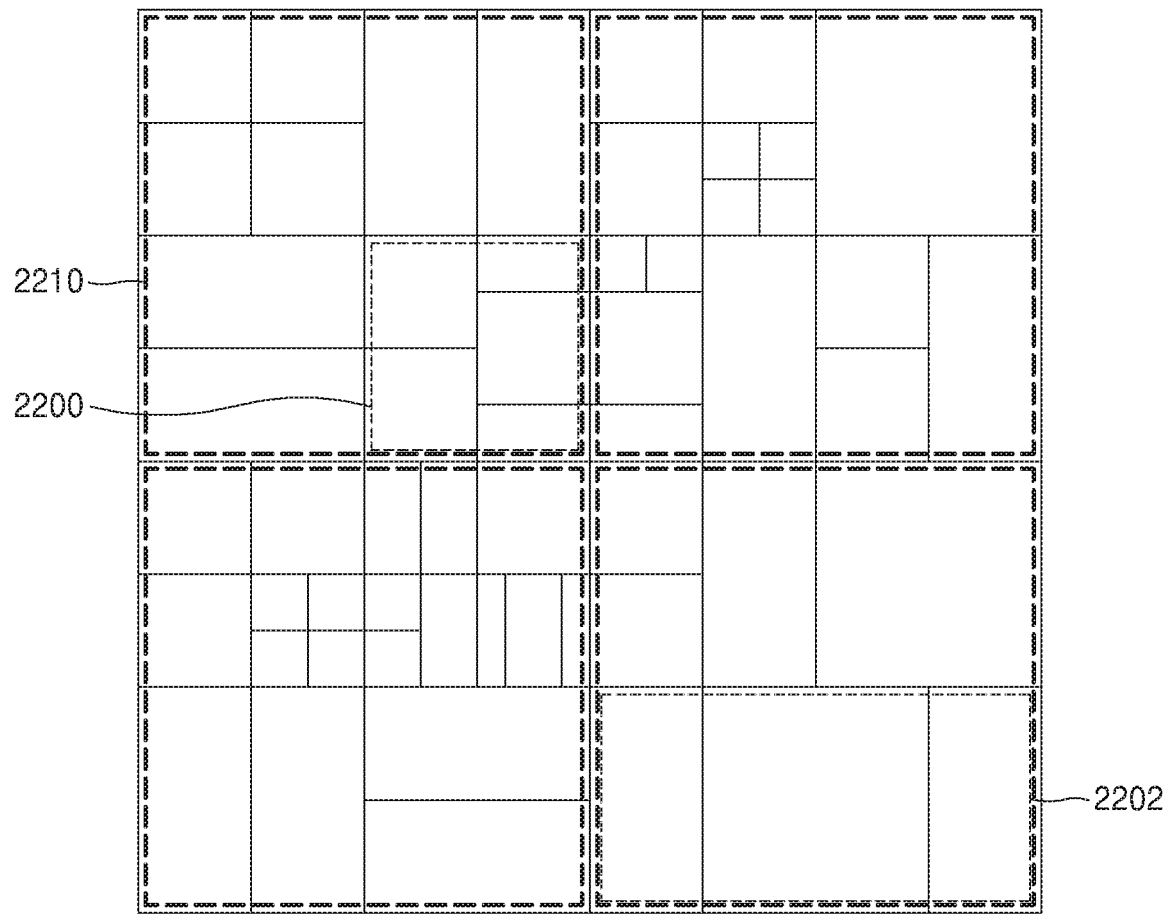
FIG. 22 illustrates that a plurality of coding units are determined according to a plurality of certain data units included in a picture, according to an embodiment.

FIG. 22 illustrates that a plurality of coding units are determined according to a plurality of certain data units included in a picture, according to an embodiment.

According to an embodiment, a certain data unit may be defined as a data unit from which a coding unit starts to be recursively split by using at least one of block shape information and split shape information. In other words, the certain data unit may correspond to a coding unit of an uppermost depth used while determining a plurality of coding units by splitting a current picture. Hereinafter, the certain data unit is referred to as a reference data unit for convenience of description.

According to an embodiment, the reference data unit may indicate a certain size and shape. According to an embodiment, the reference data unit may include M×N samples. Here, M and N may be the same, and may be an integer expressed as a multiple of 2. In other words, a reference data unit may indicate a square shape or a non-square shape, and may later be split into an integer number of coding units.

According to an embodiment, the video decoding apparatus 100 may split a current picture into a plurality of reference data units. According to an embodiment, the video decoding apparatus 100 may split the plurality of reference data units obtained by splitting the current picture by using split shape information about each of the reference data units. Split processes of such reference data units may correspond to split processes using a quad-tree structure.

According to an embodiment, the video decoding apparatus 100 may pre-determine a smallest size available for the reference data unit included in the current picture. Accordingly, the video decoding apparatus 100 may determine the reference data unit having various sizes that are equal to or larger than the smallest size, and determine at least one coding unit based on the determined reference data unit by using block shape information and split shape information.

Referring to FIG. 22, the video decoding apparatus 100 may use a reference coding unit 2200 having a square shape, or may use a reference coding unit 2202 having a non-square shape. According to an embodiment, a shape and size of a reference coding unit may be determined according to various data units (for example, a sequence, a picture, a slice, a slice segment, and a largest coding unit) that may include at least one reference coding unit.

According to an embodiment, the obtainer 105 of the video decoding apparatus 100 may obtain, from a bitstream, at least one of information about a shape of a reference coding unit and information about a size of the reference coding unit, according to the various data units. Processes of determining at least one coding unit included in the reference coding unit 2200 having a square shape have been described above through processes of splitting the current coding unit 1000 of FIG. 10, and processes of determining at least one coding unit included in the reference coding unit 2200 having a non-square shape have been described above through processes of splitting the current coding unit 1100 or 1150 of FIG. 11, and thus details thereof are not provided again.

According to an embodiment, in order to determine a size and shape of a reference coding unit according to some data units pre-determined based on a predetermined condition, the video decoding apparatus 100 may use a PID for distinguishing the size and shape of the reference coding unit. In other words, the obtainer 105 may obtain, from a bitstream, only a PID for distinguishing a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The video decoding apparatus 100 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit corresponding to the PID indicating the size and shape of the reference coding unit may be pre-determined. In other words, the video decoding apparatus 100 may select at least one of the pre-determined size and shape of the reference coding unit according to the PID so as to determine at least one of the size and shape of the reference coding unit included in a data unit that is a criterion for obtaining the PID.

According to an embodiment, the video decoding apparatus 100 may use at least one reference coding unit included in one largest coding unit. In other words, a largest coding unit splitting an image may include at least one reference coding unit, and a coding unit may be determined when each of the reference coding unit is recursively split. According to an embodiment, at least one of a width and height of the largest coding unit may be an integer times at least one of a width and height of the reference coding unit. According to an embodiment, a size of a reference coding unit may be equal to a size of a largest coding unit, which is split n times according to a quad-tree structure. In other words, the video decoding apparatus 100 may determine a reference coding unit by splitting a largest coding unit n times according to a quad-tree structure, and split the reference coding unit based on at least one of block shape information and split shape information according to various embodiments.

Figure 23:
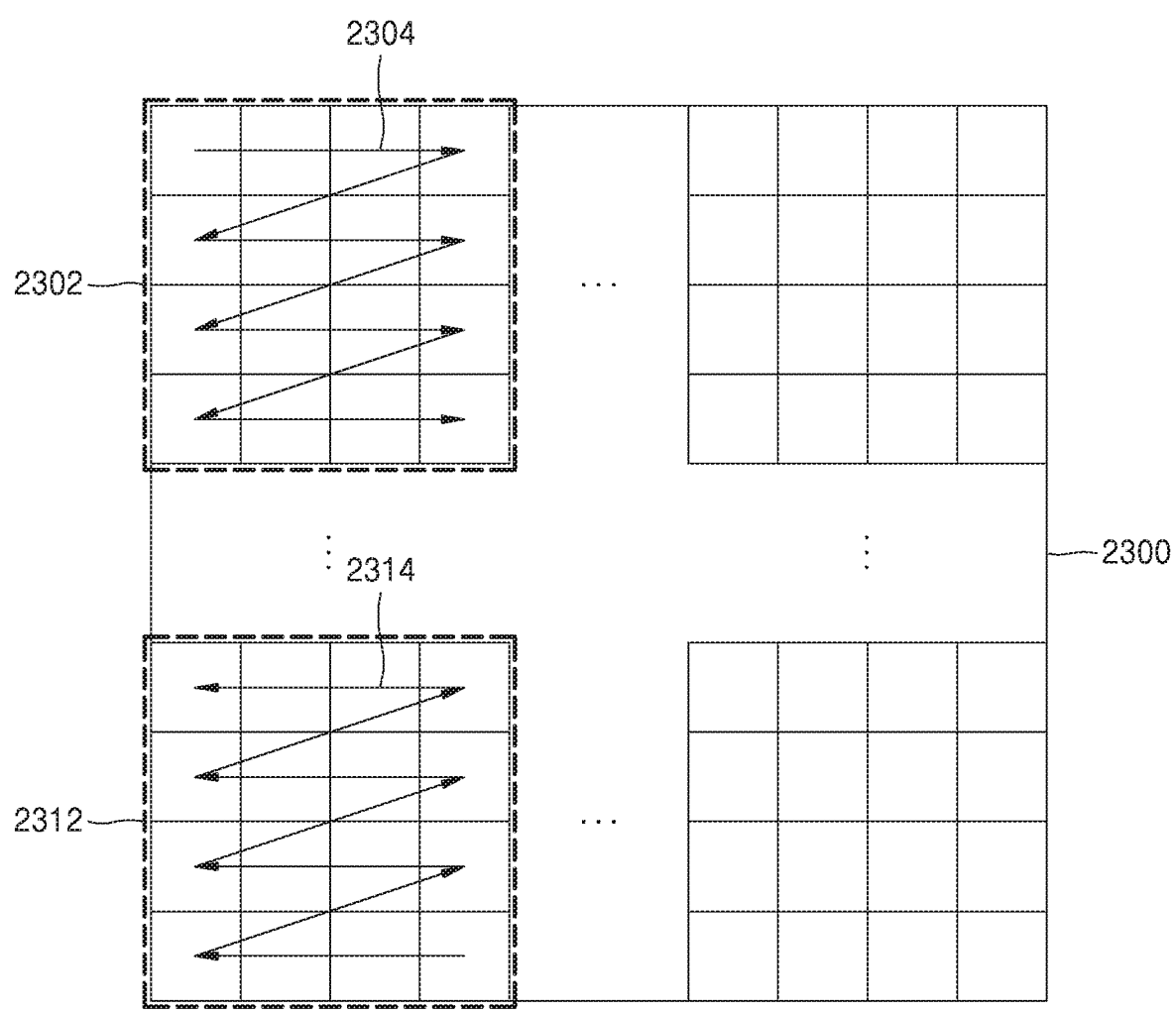
FIG. 23 illustrates a processing block serving as a criterion of determining a determination order of reference coding units included in a picture, according to an embodiment.

FIG. 23 illustrates a processing block serving as a criterion of determining a determination order of reference coding units included in a picture 2300, according to an embodiment.

According to an embodiment, the video decoding apparatus 100 may determine at least one processing block splitting a picture. A processing block is a data unit including at least one reference coding unit splitting an image, and the at least one reference coding unit included in the processing block may be determined in a certain order. In other words, a determining order of the at least one reference coding unit determined in each processing block may correspond to one of various orders for determining a reference coding unit, and may vary according to processing blocks. A determining order of reference coding units determined per processing block may be one of various orders, such as a raster scan order, a Z-scan order, an N-scan order, an up-right diagonal scan order, a horizontal scan order, and a vertical scan order, but should not be limitedly interpreted with respect to the scan orders.

According to an embodiment, the video decoding apparatus 100 may determine a size of at least one processing block included in an image by obtaining information about a size of a processing block. The video decoding apparatus 100 may obtain, from a bitstream, the information about a size of a processing block to determine the size of the at least one processing block included in the image. The size of the processing block may be a certain size of a data unit indicated by the information about a size of a processing block.

According to an embodiment, the obtainer 105 of the video decoding apparatus 100 may obtain, from the bitstream, the information about a size of a processing block according to certain data units. For example, the information about a size of a processing block may be obtained from the bitstream in data units of images, sequences, pictures, slices, and slice segments. In other words, the obtainer 105 may obtain, from the bitstream, the information about a size of a processing block according to such several data units, and the video decoding apparatus 100 may determine the size of at least one processing block splitting the picture by using the obtained information about a size of a processing block, wherein the size of the processing block may be an integer times a size of a reference coding unit.

According to an embodiment, the video decoding apparatus 100 may determine sizes of processing blocks 2302 and 2312 included in the picture 2300. For example, the video decoding apparatus 100 may determine a size of a processing block based on information about a size of a processing block, the information being obtained from a bitstream. Referring to FIG. 23, the video decoding apparatus 100 may determine horizontal sizes of the processing blocks 2302 and 2312 to be four times a horizontal size of a reference coding unit, and a vertical size thereof to be four times a vertical size of the reference coding unit, according to an embodiment. The video decoding apparatus 100 may determine a determining order of at least one reference coding unit in at least one processing block.

According to an embodiment, the video decoding apparatus 100 may determine each of the processing blocks 2302 and 2312 included in the picture 2300 based on a size of a processing block, and determine a determining order of at least one reference coding unit included in each of the processing blocks 2302 and 2312. According to an embodiment, determining of a reference coding unit may include determining a size of the reference coding unit.

According to an embodiment, the video decoding apparatus 100 may obtain, from a bitstream, information about a determining order of at least one reference coding unit included in at least one processing block, and determine the determining order of the at least one reference coding unit based on the obtained information. The information about a determining order may be defined as an order or direction of determining reference coding units in a processing block. In other words, an order of determining reference coding units may be independently determined per processing block.

According to an embodiment, the video decoding apparatus 100 may obtain, from a bitstream, information about a determining order of a reference coding unit according to certain data units. For example, the obtainer 105 may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to an embodiment, the video decoding apparatus 100 may determine at least one reference coding unit based on the determined order.

According to an embodiment, the obtainer 105 may obtain, from the bitstream, information about a determining order of a reference coding unit, as information related to the processing blocks 2302 and 2312, and the video decoding apparatus 100 may determine an order of determining at least one reference coding unit included in the processing blocks 2302 and 2312 and determine at least one reference coding unit included in the picture 2300 according to a determining order of a coding unit. Referring to FIG. 23, the video decoding apparatus 100 may determine determining orders 2304 and 2314 of at least one reference coding unit respectively related to the processing blocks 2302 and 2312. For example, when information about a determining order of a reference coding unit is obtained per processing block, determining orders of a reference coding unit related to the processing blocks 2302 and 2312 may be different from each other. When the determining order 2304 related to the processing block 2302 is a raster scan order, reference coding units included in the processing block 2302 may be determined according to the raster scan order. On the other hand, when the determining order 2314 related to the processing block 2312 is an inverse order of a raster scan order, reference coding units included in the processing block 2312 may be determined in the inverse order of the raster scan order.

The video decoding apparatus 100 may decode determined at least one reference coding unit, according to an embodiment. The video decoding apparatus 100 may decode an image based on reference coding units determined through above embodiments. Examples of a method of decoding a reference coding unit may include various methods of decoding an image.

According to an embodiment, the video decoding apparatus 100 may obtain, from a bitstream, and use block shape information indicating a shape of a current coding unit or split shape information indicating a method of splitting the current coding unit. The block shape information or the split shape information may be included in a bitstream related to various data units. For example, the video decoding apparatus 100 may use the block shape information or split shape information, which is included in a sequence parameter set, a picture parameter set, a video parameter set, a slice header, and a slice segment header. In addition, the video decoding apparatus 100 may obtain, from a bitstream, and use syntax corresponding to the block shape information or the split shape information, according to largest coding units, reference coding units, and processing blocks.

While this disclosure has been particularly shown and described with reference to embodiments thereof, it will be understood by those of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

The invention claimed is:

1. A video decoding method comprising:
obtaining, from a bitstream, information related to a first motion vector and information related to a second motion vector, wherein the first motion vector indicates a first reference block of a current block in a first reference picture, and the second motion vector indicates a second reference block of the current block in a second reference picture;
determining whether to perform optical flow based compensation by using at least one of a size of the current block, flag information related to whether to perform the optical flow based compensation, a picture order count (POC) difference, and whether the current block is bi-predicted;

if it is determined to perform the optical flow based compensation, obtaining a first displacement vector in a horizontal direction and a second displacement vector in a vertical direction for a pixel group, wherein the pixel group comprises at least one pixel;

obtaining a predicted pixel value of the current block based on a first value and a second value, wherein the first value is obtained by using a pixel value of the first reference block and a pixel value of the second reference block, and the second value is obtained by using the first displacement vector and the second displacement vector for the pixel group; and reconstructing the current block based on the predicted pixel value, wherein the flag information is obtained from the bitstream, and the POC difference is a difference between a POC of a reference picture and a POC of a current picture.

2. A video decoding apparatus comprising:

an obtainer configured to obtain, from a bitstream, information related to a first motion vector and information related to a second motion vector, wherein the first motion vector indicates a first reference block of a current block in a first reference picture, and the second motion vector indicates a second reference block of the current block in a second reference picture;

an inter predictor configured to:

determine whether to perform optical flow based compensation by using at least one of a size of the current block, flag information related to whether to perform the optical flow based compensation, a picture order count (POC) difference, and whether the current block is bi-predicted;

if it is determined to perform the optical flow based compensation, obtain a first displacement vector in a horizontal direction and a second displacement vector in a vertical direction for a pixel group, wherein the pixel group comprises at least one pixel; and obtain a predicted pixel value of the current block based on a first value and a second value, wherein the first value is obtained by using a pixel value of the first reference block and a pixel value of the second reference block, and the second value is obtained by using the first displacement vector and the second displacement vector for the pixel group; and a decoder configured to reconstruct the current block based on the predicted pixel value, wherein the flag information is obtained from the bitstream, and the POC difference is a difference between a POC of a reference picture and a POC of a current picture.

3. A video encoding method comprising:

determining whether to perform optical flow based compensation by using at least one of a size of a current block, flag information related to whether to perform the optical flow based compensation, a picture order count (POC) difference, and whether the current block is bi-predicted;

if it is determined to perform the optical flow based compensation, obtaining a first displacement vector in a horizontal direction and a second displacement vector in a vertical direction for a pixel group, wherein the pixel group comprises at least one pixel;

obtaining a predicted pixel value of the current block based on a first value and a second value, wherein the first value is obtained by using a pixel value of a first reference block and a pixel value of a second reference block, and the second value is obtained by using the first displacement vector and the second displacement vector for the pixel group; and generating a bitstream comprising information related to a first motion vector and information related to a second motion vector, wherein the first motion vector indicates the first reference block of the current block in a first reference picture, and the second motion vector indicates the second reference block of the current block in a second reference picture wherein the POC difference is a difference between a POC of a reference picture and a POC of a current picture.

4. A non-transitory computer-readable recording medium having recorded thereon a program which performs the video decoding method of claim 1.

* * * * *